(12) United States Patent
Takeuchi et al.

(10) Patent No.: US 7,230,371 B2
(45) Date of Patent: *Jun. 12, 2007

(54) LIGHT SOURCE

(75) Inventors: Yukihisa Takeuchi, Nishikamo-gun (JP); Tsutomu Nanataki, Toyoake (JP); Iwao Ohwada, Nagoya (JP); Takayoshi Akao, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 104 days.

This patent is subject to a terminal disclaimer.

(21) Appl. No.: 11/083,052

(22) Filed: Mar. 17, 2005

(65) Prior Publication Data
US 2006/0022604 A1 Feb. 2, 2006

(30) Foreign Application Priority Data
Jul. 27, 2004 (JP) ............................. 2004-219070
Feb. 21, 2005 (JP) ............................. 2005-044040

(51) Int. Cl.
*H01J 1/02* (2006.01)
(52) U.S. Cl. ...................... 313/309; 313/310; 313/496; 313/495; 313/509
(58) Field of Classification Search ................ 313/309, 313/310, 311, 495, 496, 492, 494, 506–509, 313/498, 503, 491; 315/169.3, 169.4
See application file for complete search history.

(56) References Cited

U.S. PATENT DOCUMENTS 5,453,661 A 9/1995 Auciello et al.
5,508,590 A 4/1996 Sampayan et al.
6,157,145 A 12/2000 Vollkommer et al.
6,528,925 B1 3/2003 Takeuchi et al.
2002/0047588 A1* 4/2002 Xia ..................... 315/169.4
2004/0104689 A1 6/2004 Takeuchi et al.
2004/0113561 A1 6/2004 Takeuchi et al.
2005/0022601 A1* 2/2005 Blakley ...................... 73/612

FOREIGN PATENT DOCUMENTS

DE 3833604 4/1990
EP 428853 5/1991
FR 2639151 5/1990
JP 44-26125 11/1969

(Continued)

OTHER PUBLICATIONS

Yasuoka and Ishii, "Pulsed Electron Source Using a Ferroelectric Cathode," Oyo Buturi, vol. 68, No. 5, Jan. 7, 1999, pp. 546-550.

(Continued)

*Primary Examiner*—Tuyet Thi Vo
(74) *Attorney, Agent, or Firm*—Burr & Brown

(57) ABSTRACT

A light source has a rear glass substrate and a front glass substrate having a plate surface disposed in facing relation to a principal surface of the rear glass substrate. The plate surface of the front glass substrate is coated with a phosphor. A two-dimensional array of electron emitters is disposed on the principal surface of the rear glass substrate. A space defined between the rear glass substrate and the front glass substrate is filled with a gas. The gas may be an Hg (mercury) gas or an Xe (xenon) gas.

27 Claims, 85 Drawing Sheets

FOREIGN PATENT DOCUMENTS

| | | |
|---|---|---|
| JP | 46-20944 | 6/1971 |
| JP | 1-311533 | 12/1989 |
| JP | 5-325777 | 12/1993 |
| JP | 7-147131 | 6/1995 |
| JP | 8-111166 | 4/1996 |
| JP | 11-338418 | 12/1999 |
| JP | 2000-285801 | 10/2000 |
| JP | 2001-060116 | 3/2001 |
| JP | 2004-228063 | 8/2004 |
| JP | 2004-228064 | 8/2004 |

OTHER PUBLICATIONS

Puchkarev, Victor F. and Mesyats, Gennady A., "On the Mechanism of Emission from the Ferroelectric Ceramic Cathode," Journal of Applied Physics, vol. 78, No. 9, Nov. 1, 1995, pp. 5633-5637.

Riege, H., "Electron Emission from Ferroelectrics—a Review," Nucl. Instr. and Meth. A340, 1994, pp. 80-90.

Masatoshi Miyake et al., "Electron Emission from Ferroelectric Cathodes Excited by Pulsed Voltage," Tokyo Institute of Technology, vol. 119, No. 5, 1999, pp. 622-627.

Kanemaru, Seigou, "Featuring: All About Flat Displays 2000, Leading Technological Trend of FEDs," Electronic Engineering, Nikkan Kogyo Shimbun, Ltd., Jul. 2000, pp. 38-41 (with partial translation).

Takeuchi et al., "Novel Display Panel Utilizing Field Effect—Ferroelectric Electron Emitters", Proceedings of the 11th International Display Workshops, The Institute of Image Information and Television Engineers and the Society for Information Display, Dec. 8, 2004, pp. 1193-1196.

U.S. Appl. No. 10/919,747, filed Aug. 17, 2004, Takeuchi et al.

* cited by examiner

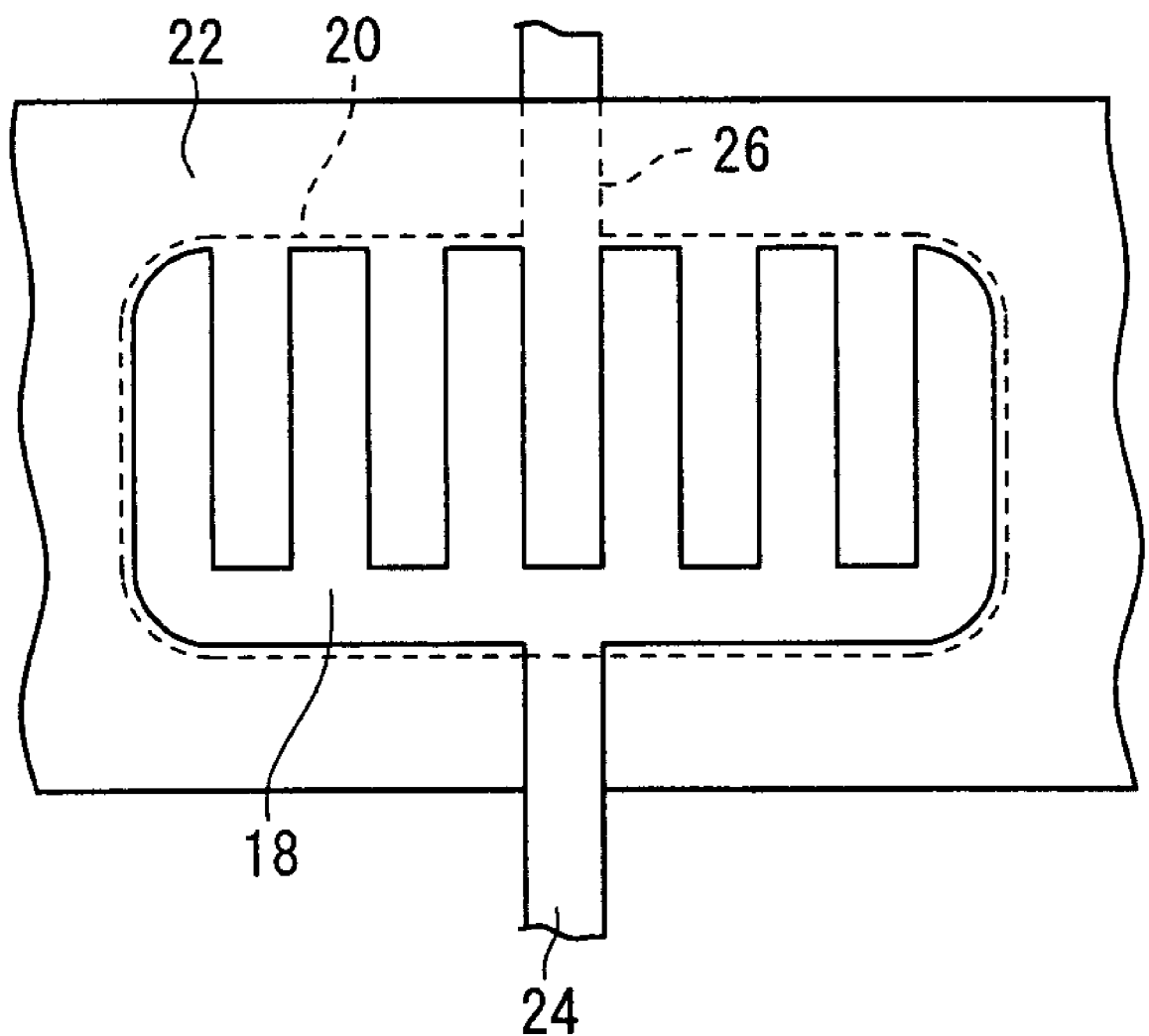

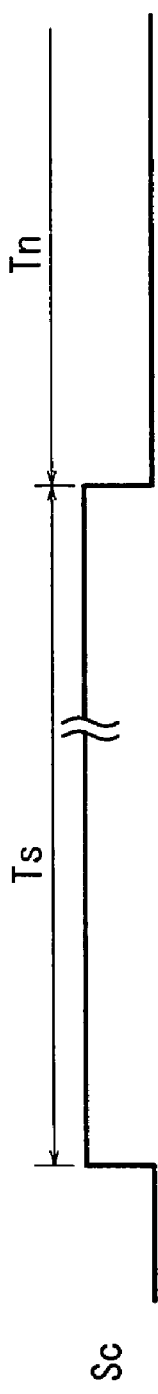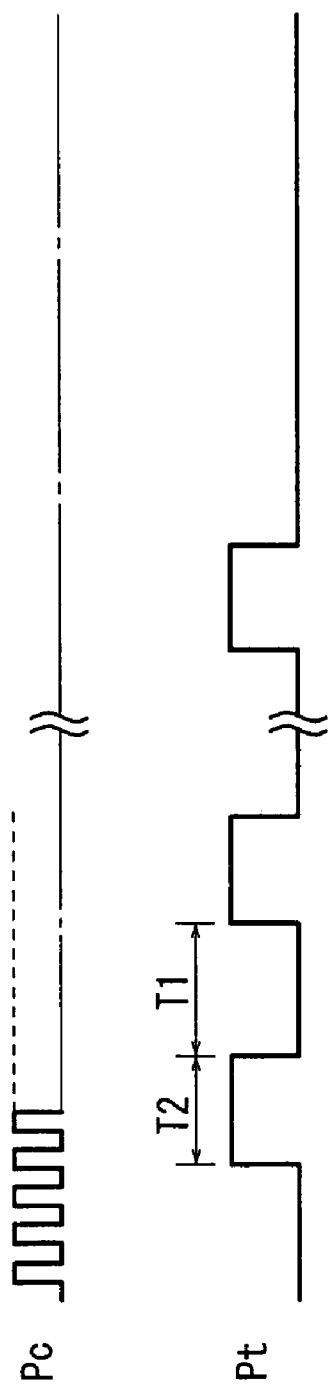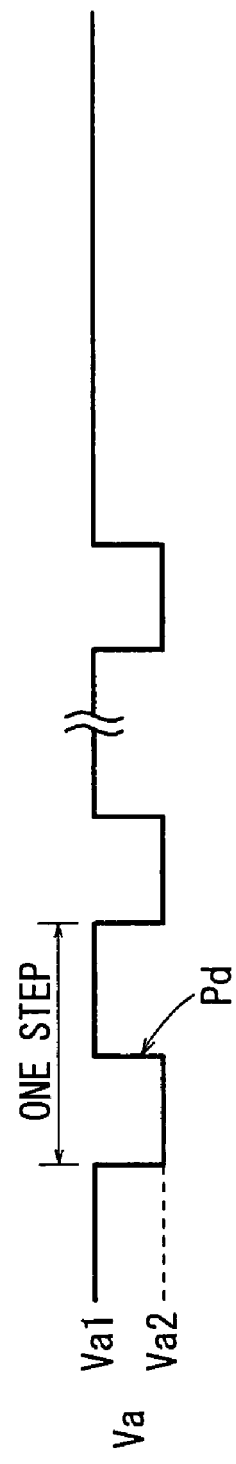

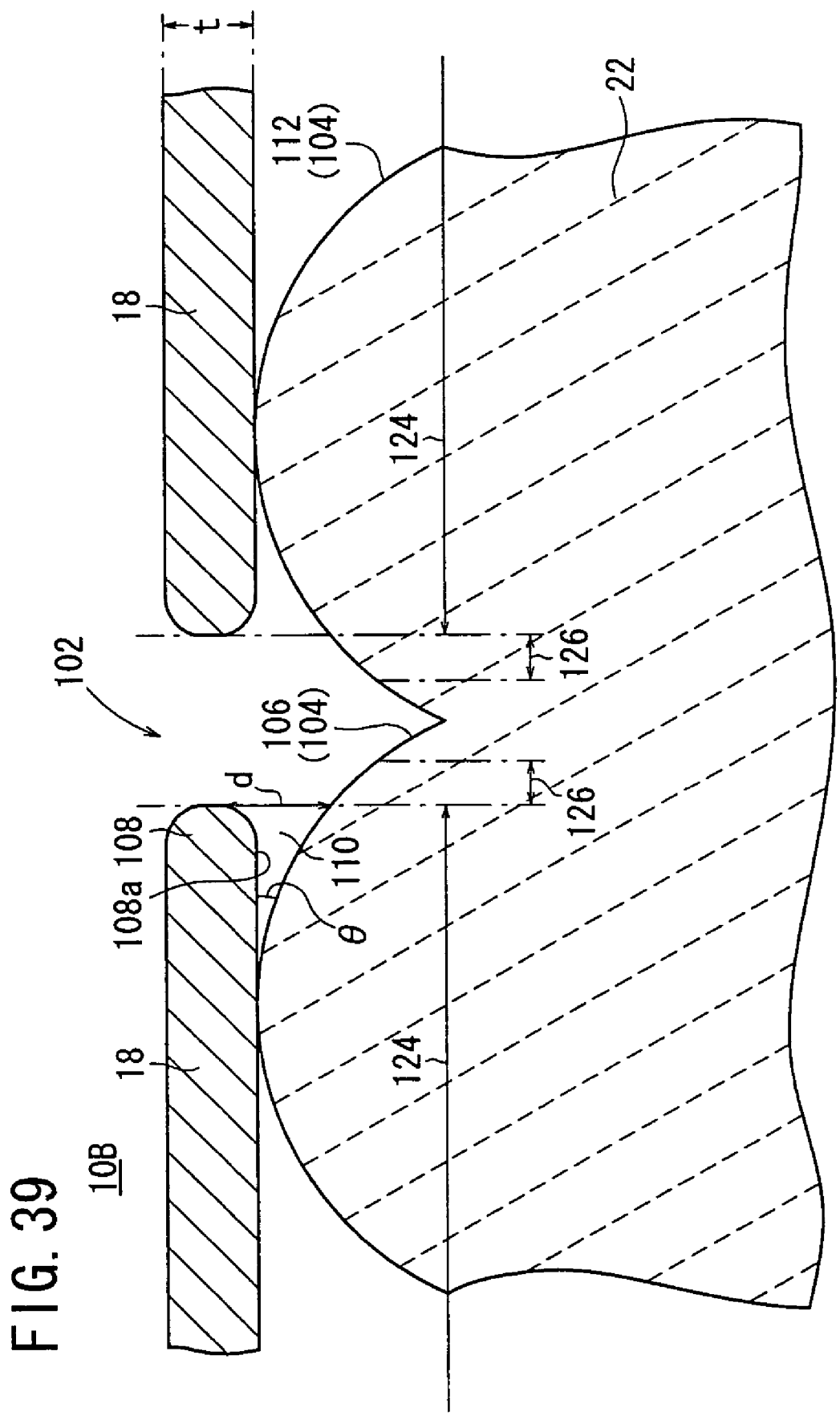

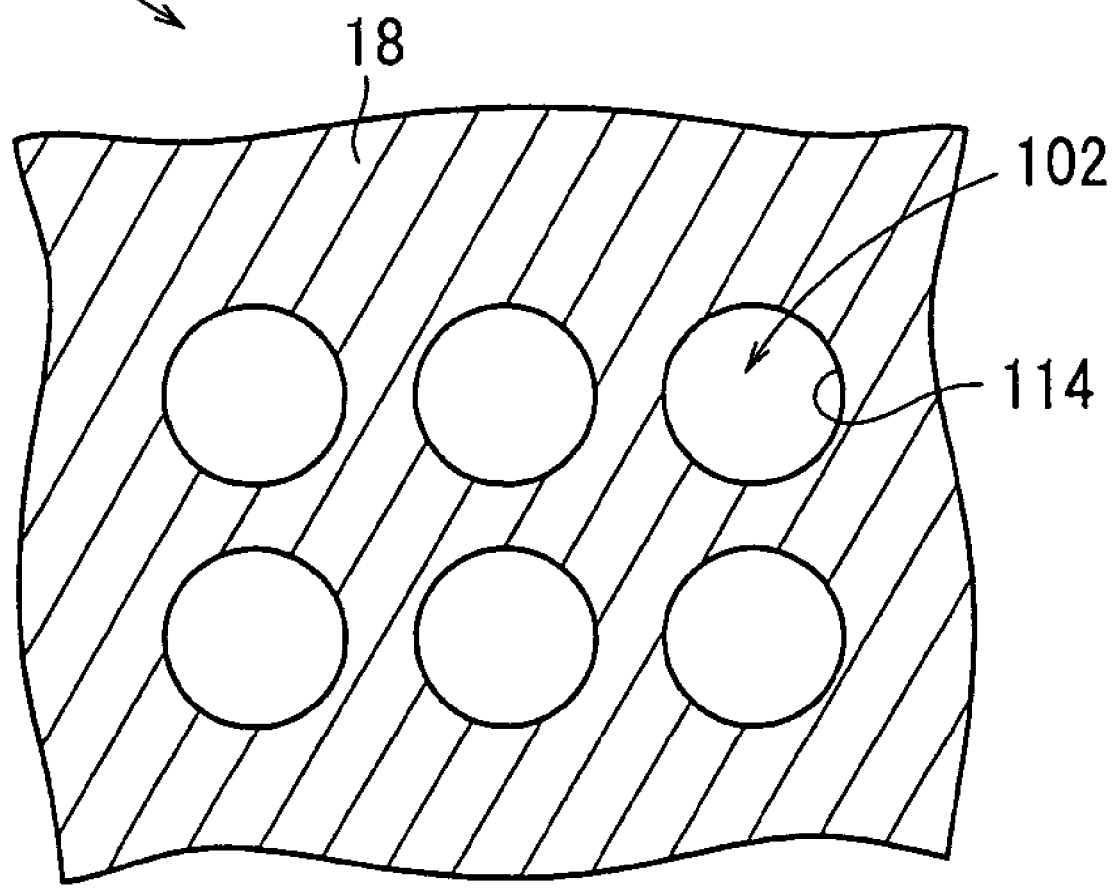

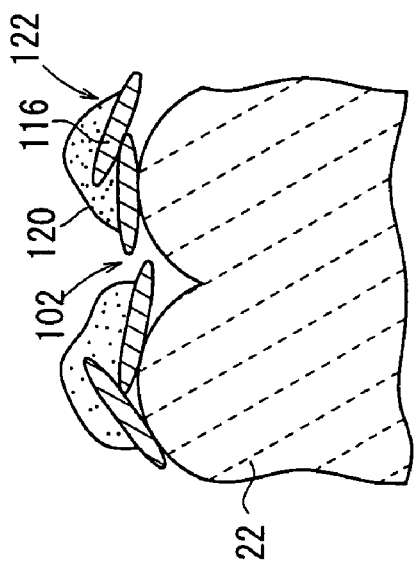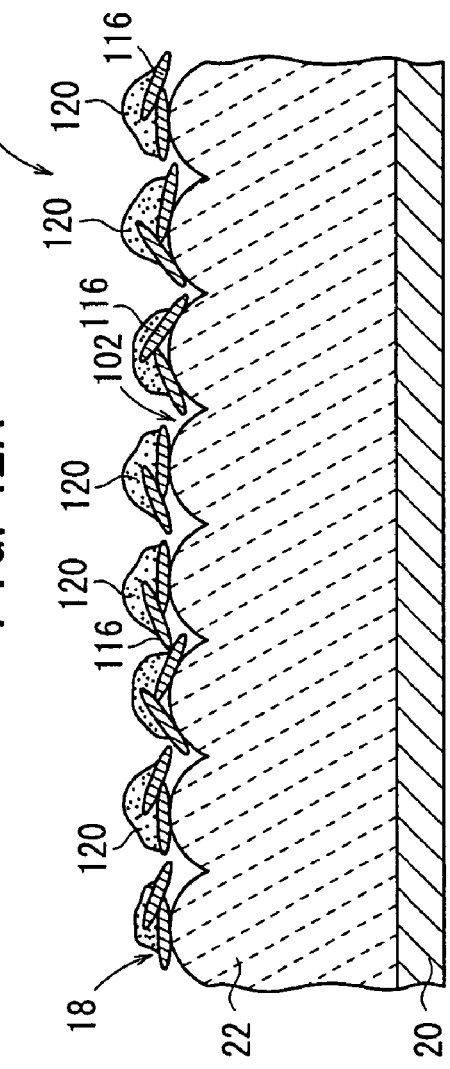

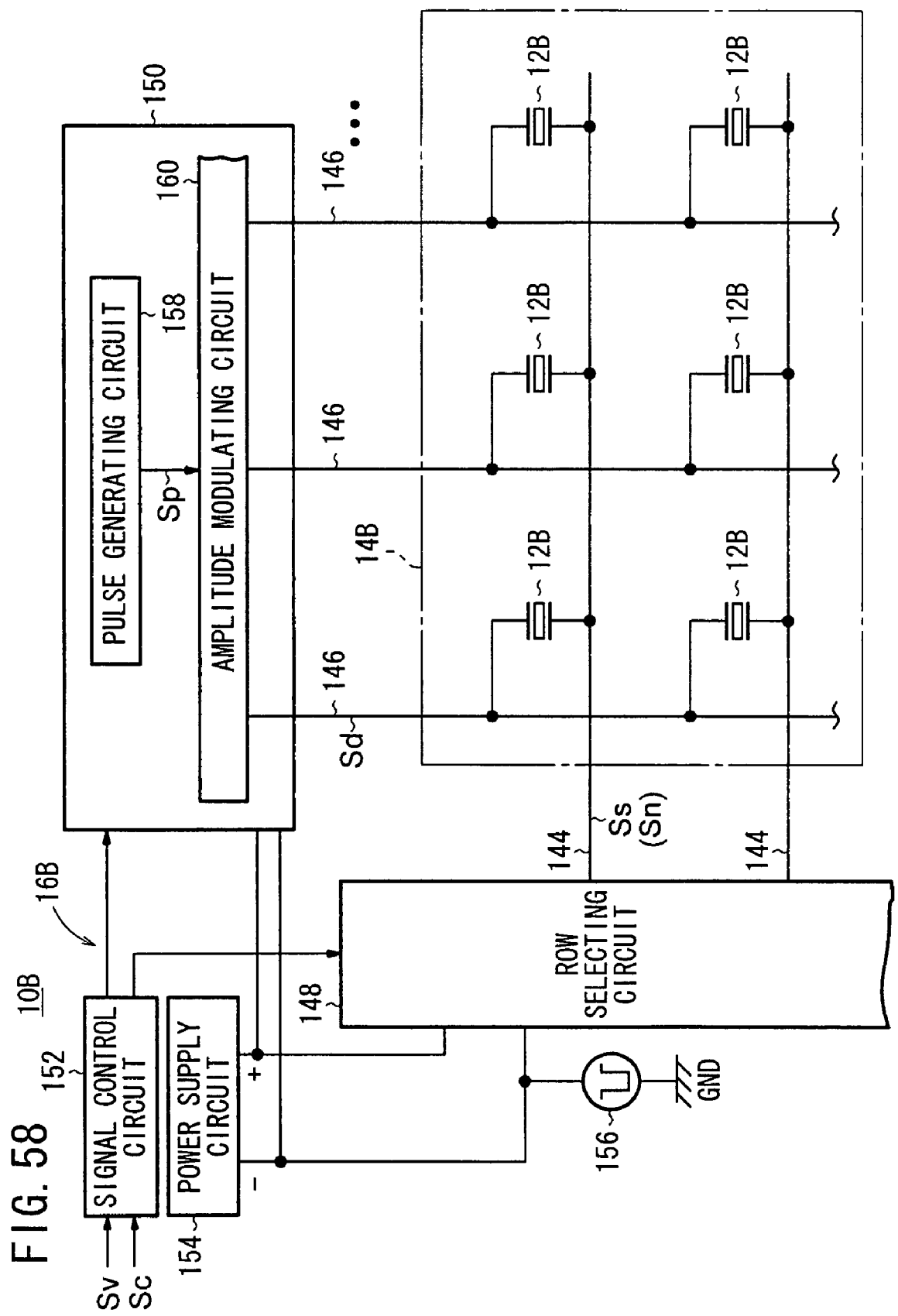

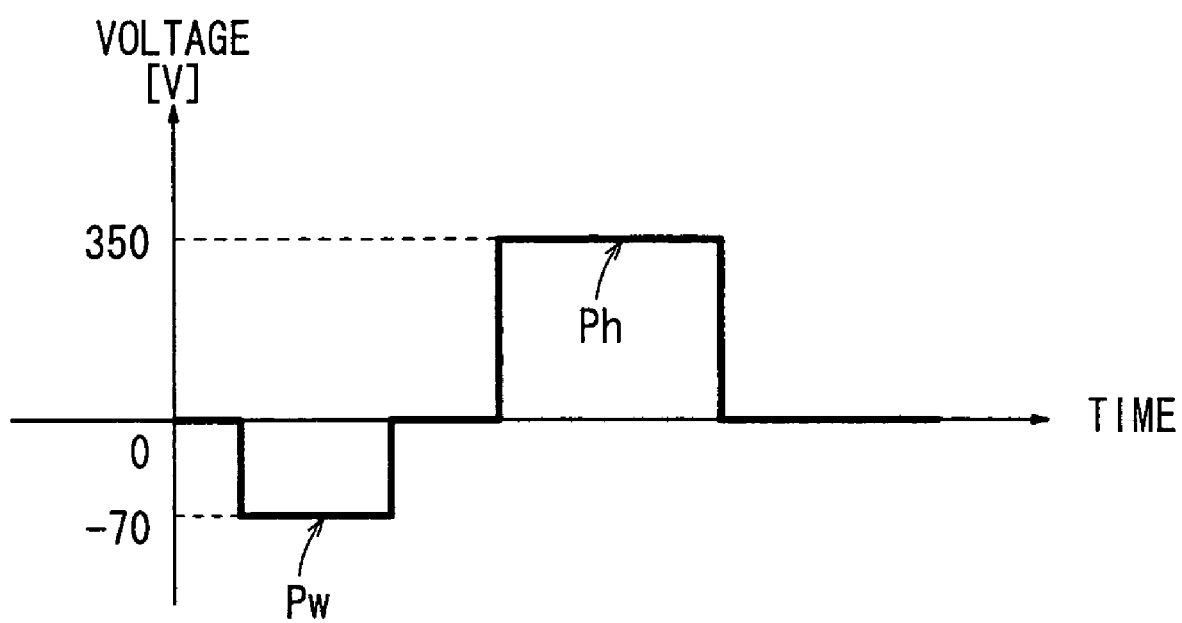

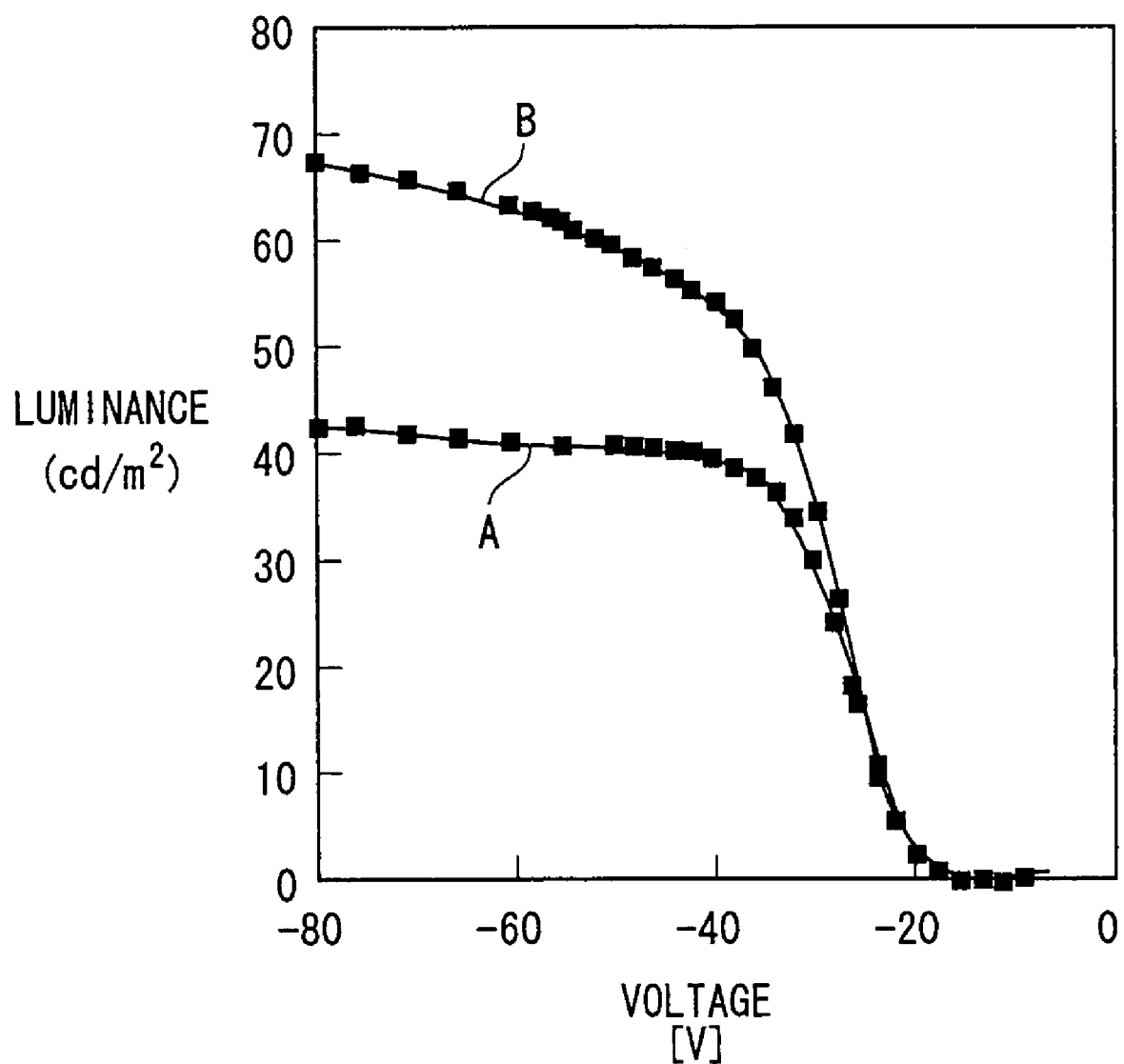

FIG. 71

|  | | CHARGE ACCUMULATION PERIOD | | LIGHT EMISSION PERIOD |
|---|---|---|---|---|
|  | | ON | OFF | |
|  | | 0~30[V] | 50[V] | 0[V] |
| SELECTED | 50[V] | -50~-20[V] | 0[V] | |
| UNSELECTED | 0[V] | 0~30[V] | 50[V] | |
| ALL SELECTED | -350[V] | | | 350[V] |

LIGHT SOURCE

BACKGROUND OF THE INVENTION

1. Field of the Invention

The present invention relates to a light source (including a planar light source) comprising electron emitters each having an upper electrode and a lower electrode that are disposed in an emitter.

2. Description of the Related Art

Recently, electron emitters having a drive electrode and a common electrode have been finding use in various applications such as field emission displays (FEDs) and backlight units. In an FED, a plurality of electron emitters are arranged in a two-dimensional array, and a plurality of phosphors are positioned in association with the respective electron emitters with a predetermined gap left therebetween.

Conventional electron emitters are disclosed in Japanese Laid-Open Patent Publication No. 1-311533, Japanese Laid-Open Patent Publication No. 7-147131, Japanese Laid-Open Patent Publication No. 2000-285801, Japanese Patent Publication No. 46-20944, and Japanese Patent Publication No. 44-26125, for example. All of these disclosed electron emitters are disadvantageous in that since no dielectric body is employed in the emitter, a forming process or a micromachining process is required between facing electrodes, a high voltage needs to be applied to emit electrons, and a panel fabrication process is complex and entails a high panel fabrication cost.

It has been considered to make an emitter of a dielectric material. However, various theories about the emission of electrons from a dielectric material have been presented in the documents: Yasuoka and Ishii, "Pulsed Electron Source Using a Ferroelectric Cathode", OYO BUTURI (A monthly publication of The Japan Society of Applied Physics), Vol. 68, No. 5, pp. 546–550 (1999), and Puchkarev, Victor F. and Mesyats, Gennady A., "On the Mechanism of Emission from the Ferroelectric Ceramic Cathode", Journal of Applied Physics, Vol. 78, No. 9, 1 November 1995, pp. 5633–5637.

In the conventional electron emitters described above, electrons that are restrained on the surface of a dielectric body, the interface between the dielectric body and an upper electrode, and the defective level in the dielectric body are discharged by an inversion of the polarization of the dielectric body. That is, if the polarization of the dielectric body is inverted, then the amount of emitted electrons is substantially constant, not dependent on the voltage level of an applied voltage pulse.

However, the conventional electron emitters are problematic in that the electron emission is not stable and can only be performed several tens of thousands times at most, and the electron emitters are not practical when used as light sources, for example.

SUMMARY OF THE INVENTION

It is an object of the present invention to provide a light source which comprises electron emitters each having an emitter made of a dielectric body, the electron emitters being prevented from emitting excessive electrons to prevent electrodes or the like from being damaged by the emission of electrons, thus allowing the light source to have a long service life and increased reliability.

Another object of the present invention is to provide a light source which is capable of easily producing a high electric field concentration and providing many electron emission spots for emitting electrons with a large output and a high efficiency.

According to a first aspect of the present invention, there is provided a light source of the discharge lamp type, wherein electrons ignite or assist in an electric discharge, a source of the electrons comprises an electron emitter, and the electron emitter comprises an emitter of a dielectric material and a first electrode and a second electrode which are disposed on the emitter, wherein when a drive voltage is applied between the first electrode and the second electrode, at least a portion of the emitter has its polarization inverted or changed to emit electrons.

According to a second aspect of the present invention, there is also provided a light source for emitting light by exciting a phosphor with an ultraviolet radiation generated from a gas sealed in a space in the light source, wherein electrons assist in generating the ultraviolet radiation from the gas, a source of the electrons comprises an electron emitter, and the electron emitter comprises an emitter of a dielectric material and a first electrode and a second electrode which are disposed on the emitter, wherein when a drive voltage is applied between the first electrode and the second electrode, at least a portion of the emitter has its polarization inverted or changed to emit electrons.

According to a third aspect of the present invention, there is also provided a light source for emitting light from a phosphor by having electrons and/or ions impinge upon the phosphor, the electrons and/or ions being produced when electrons impinge upon molecules of a gas sealed in a space in the light source and ionize the molecules of the gas, wherein a source of the electrons comprises an electron emitter, and the electron emitter comprises an emitter of a dielectric material and a first electrode and a second electrode which are disposed on the emitter, wherein when a drive voltage is applied between the first electrode and the second electrode, at least a portion of the emitter has its polarization inverted or changed to emit electrons.

The emitter may be made of a piezoelectric material, an anti-ferroelectric material, or an electrostrictive material.

Operation of the electron emitter according to the first through third aspects of the present invention will be described below. When the drive voltage is applied between the first electrode and the second electrode, at least a portion of the emitter has its polarization inverted or changed, emitting electrons from an area near the first electrode whose potential is lower than the second electrode. Specifically, as the polarization is inverted or changed, a local electric field concentration occurs on the first electrode and positive poles of dipoles near the first electrode, drawing primary electrons from the first electrode. The primary electrons drawn from the first electrode impinge upon the emitter to cause the emitter to emit secondary electrons.

If the light source has a triple point made up of the first electrode, the emitter, and a vacuum atmosphere, then the primary electrons are drawn from a portion of the first electrode near the triple point, and the primary electrons drawn from the first electrode impinge upon the emitter to cause the emitter to emit secondary electrons. The secondary electrons referred to above include all electrons in a solid state which gain energy by coulomb-attracted impingement of primary electrons and are expelled out of the emitter, auger electrons, and primary electrons (reflected electrons) scattered near the surface of the emitter. If the thickness of the first electrode is very small (up to 10 nm), then electrons are emitted from the interface between the first electrode and the emitter.

Since electrons are emitted according to the above principles, the light source according to the present invention emits electrons stably 2 billion times or more, and is highly practical. Furthermore, because the amount of emitted electrons increases substantially in proportion to the level of the drive voltage applied between the first electrode and the second electrode, the amount of emitted electrons can easily be controlled.

The electrons attracted to the second electrode ionize a gas that is present primarily near the second electrode or atoms of the second electrode into positive ions and electrons. Atoms of the second electrode that are present near the second electrode are produced when a portion of the second electrode is evaporated, and are floating near the second electrode. Since the electrons produced by the above ionization further ionize the gas and the atoms, the number of electrons is exponentially increased. When such a process goes on, electrons and positive ions are present in a neutral fashion, developing a local plasma.

The positive ions produced by the ionization may impinge upon the first electrode, thus damaging the first electrode.

If the first electrode is disposed on a first surface of the emitter and the second electrode is disposed on a second surface of the emitter, then the electrons emitted from the first electrode are attracted to positive poles of dipoles of the emitter that is present as a local anode, negatively charging the first surface of the emitter in the vicinity of the first electrode. As a result, the factor for accelerating electrons (local potential difference) is lessened, no potential is present for the emission of secondary electrons, and the first surface of the emitter is further negatively charged.

Therefore, the positive polarity of the local anode provided by the dipoles is reduced, and the intensity of the electric field between a local anode and a local cathode is reduced, stopping the emission of electrons.

According to the present invention, therefore, the electron emitter is prevented from emitting excessive electrons to prevent the first electrode from being damaged by the emission of electrons, thus allowing the light source with the electron emitter to have a long service life and increased reliability.

According to a fourth aspect of the present invention, there is further provided a light source of the discharge lamp type, wherein electrons ignite or assist in an electric discharge, a source of the electrons comprises an electron emitter, and the electron emitter comprises an emitter of a dielectric material and a first electrode and a second electrode to which a drive voltage is applicable to emit electrons from the emitter, the first electrode being disposed on a first surface of the emitter, the second electrode being disposed on a second surface of the emitter, at least the first electrode having a plurality of through regions through which the emitter is exposed, and each of the through regions has a peripheral portion having a surface facing the emitter and spaced from the emitter.

According to a fifth aspect of the present invention, there is further provided a light source for emitting light by exciting a phosphor with an ultraviolet radiation generated from a gas sealed in a space in the light source, wherein electrons assist in generating the ultraviolet radiation from the gas, a source of the electrons comprises an electron emitter, and the electron emitter comprises an emitter of a dielectric material and a first electrode and a second electrode to which a drive voltage is applicable to emit electrons from the emitter, the first electrode being disposed on a first surface of the emitter, the second electrode being disposed on a second surface of the emitter, at least the first electrode having a plurality of through regions through which the emitter is exposed, and each of the through regions has a peripheral portion having a surface facing the emitter and spaced from the emitter.

According to a sixth aspect of the present invention, there is further provided a light source for emitting light from a phosphor by having electrons and/or ions impinge upon the phosphor, the electrons and/or ions being produced when electrons impinge upon molecules of a gas sealed in a space in the light source and ionize the molecules of the gas, wherein a source of the electrons comprises an electron emitter, and the electron emitter comprises an emitter of a dielectric material and a first electrode and a second electrode to which a drive voltage is applicable to emit electrons from the emitter, the first electrode being disposed on a first surface of the emitter, the second electrode being disposed on a second surface of the emitter, at least the first electrode having a plurality of through regions through which the emitter is exposed, and each of the through regions has a peripheral portion having a surface facing the emitter and spaced from the emitter.

In the fourth through sixth aspects, the first electrode may emit electrons toward the emitter to charge the emitter in a first stage, and the emitter may emit electrons in a second stage.

Operation of the electron emitter according to the fourth through sixth aspects of the present invention will be described below. The drive voltage is applied between the first electrode and the second electrode. The drive voltage is defined as a voltage, such as a pulse voltage or an alternating-current voltage, which abruptly changes with time from a voltage level that is higher or lower than a reference voltage (e.g., 0 V) to a voltage level that is lower or higher than the reference voltage.

A triple junction is formed in a region of contact between the first surface of the emitter, the first electrode, and a medium (e.g., vacuum) around the electron emitter. The triple junction is defined as an electric field concentration region formed by a contact between the first electrode, the emitter, and the vacuum. The triple junction includes a triple point where the first electrode, the emitter, and the vacuum exist as one point. According to the present invention, the triple junction is formed in peripheral portions of a plurality of through regions and the peripheral portion of the first electrode. Therefore, when the drive voltage is applied between the first electrode and the second electrode, an electric field concentration occurs at the triple junction.

In the first stage, the voltage higher or lower than the reference voltage is applied between the first electrode and the second electrode, producing an electric field concentration in one direction, for example, at the triple junction. Electrons are emitted from the first electrode toward the emitter, and accumulated in the portions of the emitter which correspond to the through regions of the first electrode and the portion of the emitter near the peripheral portion of the first electrode. That is, the emitter is charged. At this time, the first electrode functions as an electron supply source.

In the second stage, the voltage level of the drive voltage abruptly changes, i.e., the voltage lower or higher than the reference voltage is applied between the first electrode and the second electrode. The electrons that have been accumulated in the portions corresponding to the through regions of the first electrode and the regions near the peripheral portion of the first electrode are expelled from the emitter by dipoles (whose negative poles appear on the surface of the emitter) in the emitter whose polarization has been inverted in the opposite direction. The electrons are emitted from the portions of the emitter where the electrons have been accumulated, through the through regions. The electrons are also emitted from the regions near the outer peripheral portion of the first electrode. At this time, electrons depending on the amount of charges in the emitter in the first stage are emitted from the emitter in the second stage. The amount of charges in the emitter in the first stage is maintained until electrons are emitted in the second stage.

With the electron emitter, since the first electrode has the plural through regions, electrons are uniformly emitted from each of the through regions and the regions near the outer peripheral portions of the first electrode. Thus, any variations in the overall electron emission characteristics are reduced, making it possible to facilitate the control of the electron emission and increase the electron emission efficiency.

According to the fourth through sixth aspects of the present invention, because a gap is formed between the surface of the first electrode which faces the emitter around the through regions and the emitter, when the drive voltage is applied, an electric field concentration tends to be produced in the region of the gap. This leads to a higher efficiency of the electron emission, making the drive voltage lower (emitting electrons at a lower voltage level).

As described above, according to the fourth through sixth aspects of the present invention, since the first electrode has an overhanging portion (flange) on the peripheral portion of each through region, together with the increased electric field concentration in the region of the gap, electrons are easily emitted from the overhanging portion (around the through region). This leads to a larger output and higher efficiency of the electron emission, making the drive voltage lower. As the periphery of the through region functions as a gate electrode (a control electrode, a focusing electronic lens, or the like), the straightness of emitted electrons can be increased. This is effective in reducing crosstalk if a number of electron emitters are arrayed for use as an electron source of displays.

As described above, according to the fourth through sixth aspects of the present invention, the light source is capable of easily developing a high electric field concentration, provides many electron emission regions, has a larger output and higher efficiency of the electron emission, and can be driven at a lower voltage (lower power consumption).

The light sources according to the first through sixth aspects of the present invention may have means for applying AC pulses between the first electrode and the second electrode to cause at least a portion of the emitter to have its polarization inverted or changed, wherein electrons are intermittently emitted from the emitter. Before light emitted by a first emission of electrons is extinguished, next electrons may be emitted to emit light continuously.

The light sources according to the first through sixth aspects of the present invention may have a third electrode at a position corresponding to the first electrode above the emitter, and the third electrode may be coated with a phosphor. Some of the emitted electrons are attracted to the third electrode and excite the phosphor, which emits fluorescent light.

The light sources according to the first through sixth aspects of the present invention may have a phosphor disposed around the electron emitter, and mercury particles, for example, may be sealed in the atmosphere between the electron emitter and the phosphor. Some of the emitted electrons impinge upon the mercury particles, which are excited to emit ultraviolet rays. The ultraviolet rays hit the phosphor, which is excited to emit fluorescent light.

In the above arrangement, a plurality of electron emitters may be arranged in a two-dimensional array, realizing a planar light source comprising electron emitters and having a longer service life and increased reliability.

Advantages of planar light sources will be described below in terms of their differences with displays. Unlike a display, a planar light source may emit light from its entire surface at all times, and hence does not need to be driven under complex control such as row scanning control, etc., but may be driven altogether statically. Since the diameter of a light emission spot produced by an electron emission does not need to be controlled, it is not necessary to install a control electrode, etc. functioning as a focusing lens, for example, between the electron emitters and the phosphors. This leads to a simplified mechanical arrangement and a simplified circuit arrangement.

The display needs to handle a data signal that changes at a high speed depending on the pixel signal. Therefore, the drive voltage is of a complex waveform that is modulated depending on the gradation. On the other hand, as the planar light source is not required to handle a data signal that changes at a high speed depending on the pixel signal, the drive voltage may be of a simple waveform, i.e., a waveform having a constant pulse period or pulse duration. As a result, if an electric power retrieval circuit is connected to the planar light source, not only the circuit constants, circuit switching timing, etc. of the electric power retrieval circuit can be set with high accuracy, but also almost 100% of the drive voltage can be retrieved.

The electron emitters may be divided into two groups, and when the electron emitters in one of the groups emit light, the electron emitters in the other group may retrieve electric power of the electron emitters in the one group, and when the electron emitters in the other group emit light, the electron emitters in the one group may retrieve electric power of the electron emitters in the other group.

Consequently, the electron emitters in the group other than the group which is emitting light double as a buffer capacitor for retrieving electric power. Therefore, no separate buffer capacitor is required, and hence the light source may be mounted in a reduced area and may consume reduced electric power.

In the above arrangement, the drive voltage may be modulated based on a control signal to control an amount of electrons emitted from the electron emitter for controlling emitted light.

The light sources according to the first through sixth aspects of the present invention may have at least two planar light source sections, and each of the planar light source sections may have a plurality of the electron emitters which are arranged in a two-dimensional array.

Thus, each of the planar light source sections can be controlled for energization/de-energization to perform step-wise light control (digital light control). Particularly, if the light source has means for modulating the drive voltage applied to each of the electron emitters in each of the planar light source sections based on a corresponding control signal to control the amount of electrons emitted from the electron emitter for performing light control of each of the planar light source sections, then the light emission distributions of the planar light source sections can independently be controlled. That is, the light source can perform analog light control as well as digital light control for fine light control applications.

The electron emitters of each of the planar light source sections may be divided into two groups, and when the electron emitters in one of the groups emit light, the electron emitters in the other group may retrieve electric power of the electron emitters in the one group, and when the electron emitters in the other group emit light, the electron emitters in the one group may retrieve electric power of the electron emitters in the other group.

Furthermore, at least two planar light source sections may be divided into two groups, and when the electron emitters in one of the groups emit light, the electron emitters in the other group may retrieve electric power of the electron emitters in the one group, and when the electron emitters in the other group emit light, the electron emitters in the one group may retrieve electric power of the electron emitters in the other group.

With the light sources according to the present invention, the electron emitter having the emitter made of a dielectric material is prevented from emitting excessive electrons to prevent the electrode from being damaged by the emission of electrons, thus allowing the light source to have a long service life and increased reliability.

Moreover, the light sources are capable of easily developing a high electric field concentration, provide many electron emission regions, have a larger output and higher efficiency of the electron emission, and can be driven at a lower voltage.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a plan view of electrodes according to a second modification;

FIG. 13A is a waveform diagram showing a control signal representative of turn-on/turn-off;

FIG. 13B is a waveform diagram showing a clock signal;

FIG. 13C is a waveform diagram showing timing pulses;

FIG. 13D is a waveform diagram showing a drive voltage generated by a drive voltage generating circuit;

FIG. 39 is an enlarged fragmentary cross-sectional view of an electron emitter;

FIG. 40 is a plan view showing an example of the shape of through regions defined in an upper electrode;

FIG. 42A is a cross-sectional view of still another example of the upper electrode;

FIG. 42B is an enlarged fragmentary cross-sectional view of the upper electrode;

FIG. 58 is a block diagram of a display area and a drive circuit that are used in the light source according to the second embodiment;

FIG. 66 is a diagram showing the waveform of a write pulse and a turn-on pulse that are used in second through fourth experimental examples;

FIG. 67 is a characteristic diagram showing the results of a second experimental example (an experiment for observing how the amount of electrons emitted from the electron emitter changes depending on the amplitude of a write pulse);

FIG. 71 is a diagram showing the relationship of applied voltages according to the drive method shown in FIG. 70;

DESCRIPTION OF THE PREFERRED EMBODIMENTS

Light sources according to embodiments of the present invention will be described below with reference to FIGS. 1 through 85.

Figure 1:
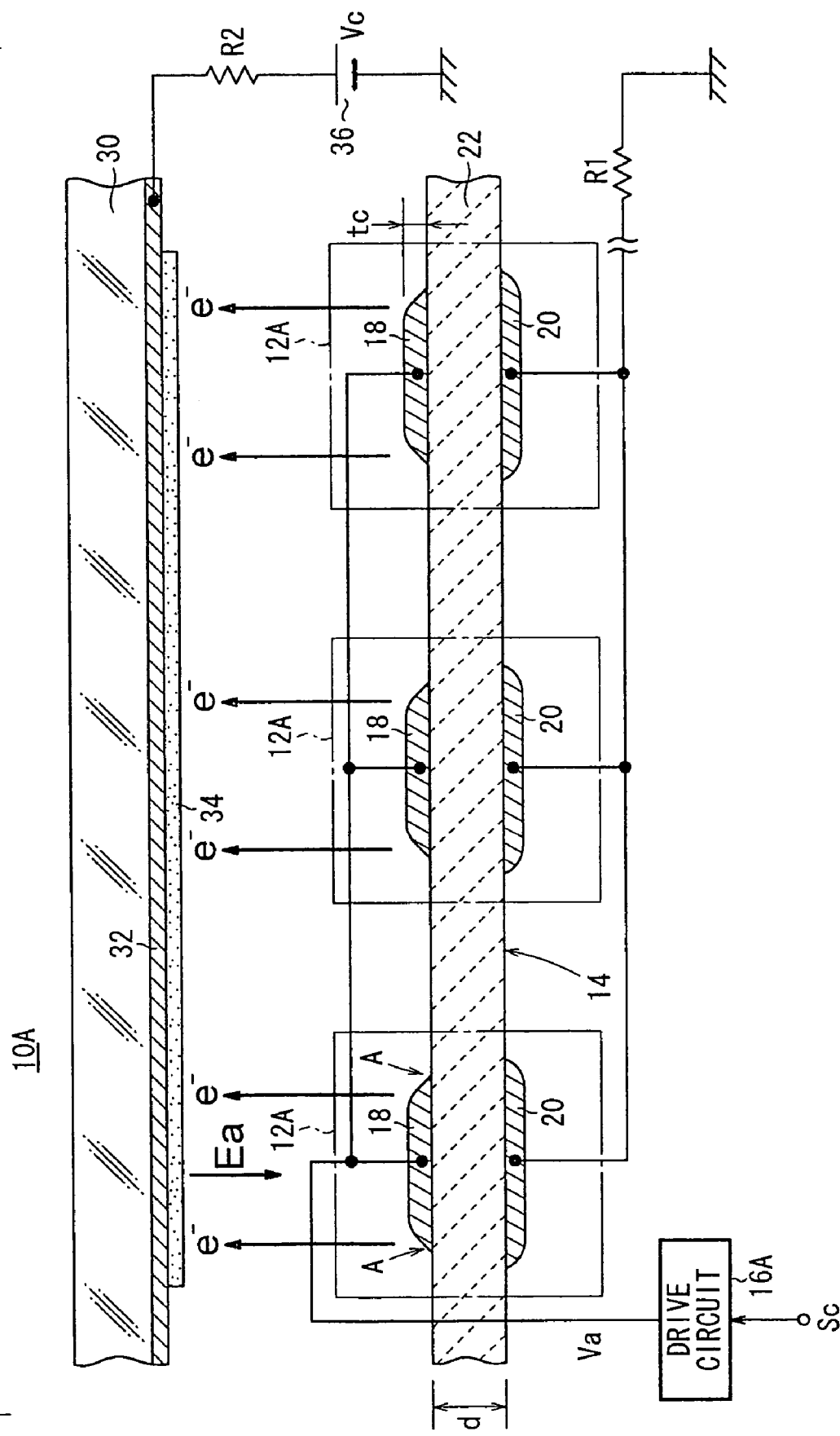
FIG. 1 is a fragmentary cross-sectional view, partly in block form, of a light source according to a first embodiment of the present invention.

As shown in FIG. 1, a light source 10A according to a first embodiment of the present invention has a light emitting section 14A comprising a two-dimensional array of electron emitters 12A, and a drive circuit 16A for applying a drive voltage Va to each of the electron emitters 12A of the light emitting section 14A.

The drive circuit 16A applies a drive voltage Va between a first electrode (e.g., an upper electrode) 18 and a second electrode (e.g., a lower electrode) 20 of each of the electron emitters 12A to control each of the electron emitters 12A based on a control signal Sc representative of turn-on/turn-off from an external source (a turn-on/turn-off switch or the like). Preferred examples of the drive circuit 16A will be described later on.

As shown in FIG. 1, each of the electron emitters 12A has a plate-like emitter 22, the upper electrode 18 disposed on a face side of the emitter 22, and the lower electrode 20 disposed on a reverse side of the emitter 22. Since the electron emitter 12A is of a structure in which the emitter 22 is sandwiched between the upper electrode 18 and the lower electrode 20, it provides a capacitive load. Therefore, the electron emitter 12A may be regarded as a capacitor C (see FIG. 12).

Figure 2A:
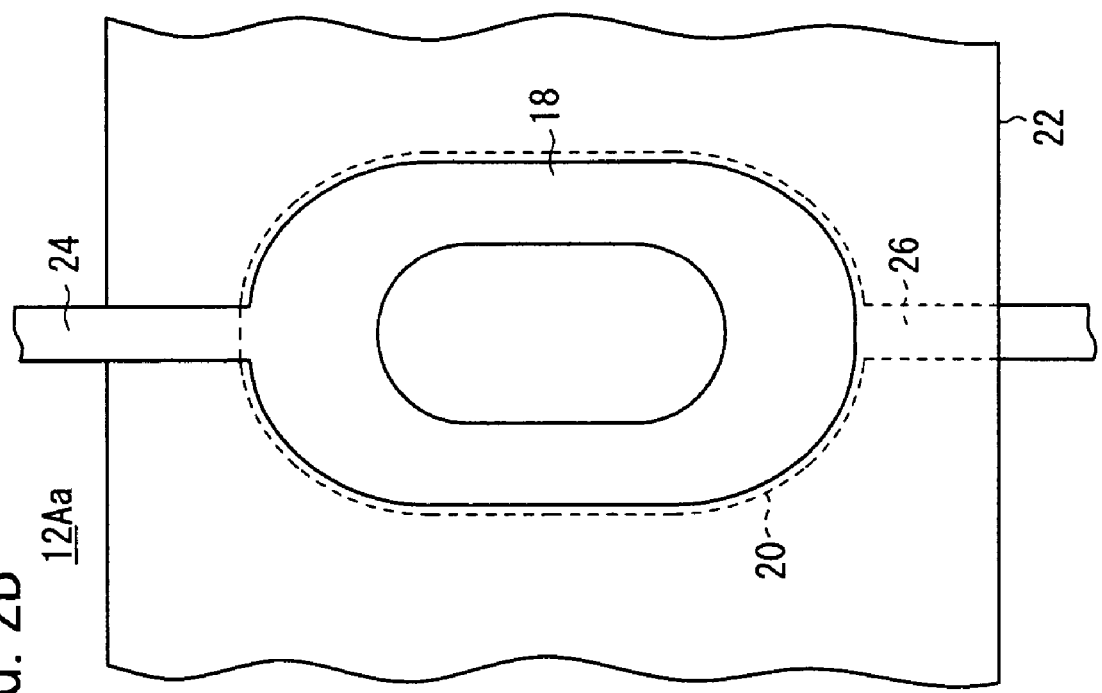
FIG. 2A is a plan view of electrodes of an electron emitter.
Figure 2B:
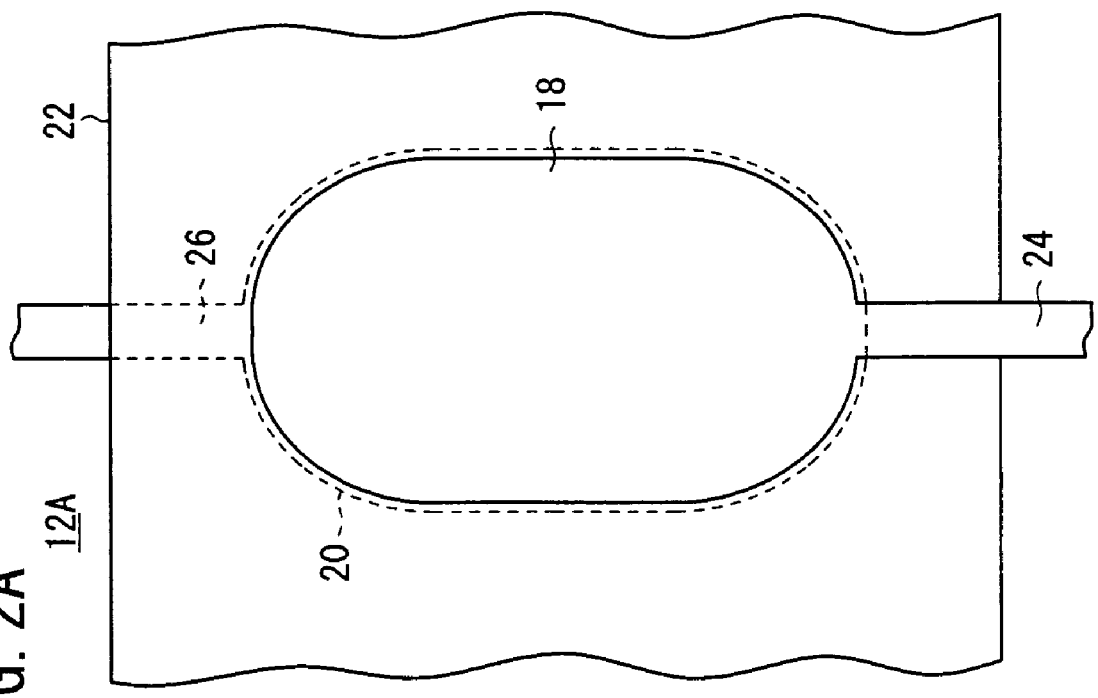
FIG. 2B is a plan view of electrodes according to a first modification.

A drive voltage Va from the drive circuit 16A is applied between the upper electrode 18 and the lower electrode 20. In FIG. 1, the lower electrode 20 is connected to GND (ground) through a resistor R1, and hence is kept at the zero potential. However, the lower electrode 20 may be held at a potential other than the zero potential. As shown in FIGS. 2A and 2B, for example, the drive voltage Va is applied between the upper electrode 18 and the lower electrode 20 through a lead electrode 24 connected to the upper electrode 18 and a lead electrode 26 connected to the lower electrode 20.

As shown in FIG. 1, if the electron emitters 12A are used as a light source, then a transparent panel 30 of glass or acrylic resin is placed over the upper electrodes 18, and a collector electrode 32 comprising a transparent electrode, for example, is mounted on the reverse side of the transparent panel 30, i.e., the surface of the transparent panel 30 which faces the upper electrodes 18. The collector electrode 32 is coated with a phosphor 34. A bias power supply 36 having a bias voltage Vc is connected to the collector electrode 32 through a resistor R2.

The electron emitters 12A are placed in a vacuum. As shown in FIG. 1, electric field concentration points A are present in each of the electron emitters 12A. Each of the electric field concentration points A may be defined as a point including a triple point where the upper electrode 18, the emitter 22, the vacuum exist.

The vacuum level in the atmosphere should preferably in the range from $10^2$ to $10^{-6}$ Pa and more preferably in the range from $10^{-3}$ to $10^{-5}$ Pa.

The reason for the above range is that in a lower vacuum, (1) many gas molecules would be present in the space, and a plasma can easily be generated and, if too an intensive plasma were generated, many positive ions thereof would impinge upon the upper electrode 18 and damage the same, and (2) emitted electrons would tend to impinge upon gas molecules prior to arrival at the collector electrode 32, failing to sufficiently excite the phosphor 34 with electrons that are sufficiently accelerated under the collector voltage Vc.

In a higher vacuum, though electrons would be liable to be emitted from an electric field concentration point A, structural body supports and vacuum seals would be large in size, posing disadvantages on efforts to make the electron emitter smaller in size.

The emitter 22 is made of a dielectric material. The dielectric material may preferably be a dielectric material having a relatively high dielectric constant, e.g., a dielectric constant of 1000 or higher. Dielectric materials of such a nature may be ceramics including barium titanate, lead zirconate, lead magnesium niobate, lead nickel niobate, lead zinc niobate, lead manganese niobate, lead magnesium tantalate, lead nickel tantalate, lead antimony tinate, lead titanate, lead magnesium tungstenate, lead cobalt niobate, etc. or a combination of any of these materials, a material which chiefly contains 50 weight % or more of any of these materials, or such ceramics to which there is added an oxide of such as lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger specific dielectric constant at room temperature if the molar ratio of PMN is increased.

Particularly, a dielectric material where n=0.85–1.0 and m=1.0–n is preferable because its specific dielectric constant is 3000 or higher. For example, a dielectric material where n=0.91 and m=0.09 has a specific dielectric constant of 15000 at room temperature, and a dielectric material where n=0.95 and m=0.05 has a specific dielectric constant of 20000 at room temperature.

For increasing the specific dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT PZ=0.375:0.375:0.25 has a specific dielectric constant of 5500, and a dielectric material where PMN:PT:PZ=0.5: 0.375:0.125 has a specific dielectric constant of 4500, which is particularly preferable. Furthermore, it is preferable to increase the dielectric constant by introducing a metal such as platinum into these dielectric materials within a range to keep them insulative. For example, a dielectric material may be mixed with 20 weight % of platinum.

The emitter 22 may be in the form of a piezoelectric/ electrostrictive layer or an anti-ferroelectric layer. If the emitter 22 comprises a piezoelectric/electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony tinate, lead titanate, barium titanate, lead magnesium tungstenate, lead cobalt niobate, or the like, or a combination of any of these materials.

The emitter 22 may be made of chief components including 50 wt % or more of any of the above compounds. Of the above ceramics, the ceramics including lead zirconate is mostly frequently used as a constituent of the piezoelectric/ electrostrictive layer of the emitter 22.

If the piezoelectric/electrostrictive layer is made of ceramics, then lanthanum, calcium, strontium, molybdenum, tungsten, barium, niobium, zinc, nickel, manganese, or the like, or a combination of these materials, or any of other compounds may be added to the ceramics. Alternatively, ceramics produced by adding $SiO_2$, $CeO_2$, $Pb_5Ge_3O_{11}$, or a combination of any of these compounds to the above ceramics may be used. Specifically, a material produced by adding 0.2 wt % of $SiO_2$, 0.1 wt % of $CeO_2$, or 1 to 2 wt % of $Pb_5Ge_3O_{11}$ to a PT-PZ-PMN piezoelectric material is preferable.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 40% or less.

If the emitter 22 is in the form of an anti-ferroelectric layer, then the anti-ferroelectric layer may be made of lead zirconate as a chief component, lead zirconate and lead tin as chief components, lead zirconate with lanthanum oxide added thereto, or lead zirconate and lead tin as components with lead zirconate and lead niobate added thereto.

The anti-ferroelectric layer may be porous. If the anti-ferroelectric layer is porous, then it should preferably have a porosity of 30% or less.

If the emitter 22 is made of strontium tantalate bismuthate ($SrBi_2Ta_2O_9$), then its polarization inversion fatigue is small. Materials whose polarization inversion fatigue is small are laminar ferroelectric compounds and expressed by the general formula of $(BiO_2)^{2+} (A_{m-1}B_mO_{3m+1})^{2-}$. Ions of the metal A are $Ca^{2+}$, $Sr^{2+}$, $Ba^{2+}$, $Pb^{2+}$, $Bi^{3+}$, $La^{3+}$, etc., and ions of the metal B are $Ti^{4+}$, $Ta^{5+}$, $Nb^{5+}$, etc. An additive may be added to piezoelectric ceramics of barium titanate, lead zirconate, and PZT to convert them into a semiconductor. In this case, it is possible to provide an irregular electric field distribution in the emitter 22 to concentrate an electric field in the vicinity of the interface with the upper electrode 18 which contributes to the emission of electrons.

The baking temperature can be lowered by adding glass such as lead borosilicate glass or the like or other compounds of low melting point (e.g., bismuth oxide or the like) to the piezoelectric/electrostrictive/anti-ferroelectric ceramics.

If the emitter 22 is made of piezoelectric/electrostrictive/ anti-ferroelectric ceramics, then it may be a sheet-like molded body, a sheet-like laminated body, or either one of such bodies stacked or bonded to another support substrate.

If the emitter 22 is made of a non-lead-based material, then it may be a material having a high melting point or a high evaporation temperature so as to be less liable to be damaged by the impingement of electrons or ions.

The emitter 22 may be made by any of various thick-film forming processes including screen printing, dipping, coating, electrophoresis, aerosol deposition, etc., or any of various thin-film forming processes including an ion beam process, sputtering, vacuum evaporation, ion plating, chemical vapor deposition (CVD), plating, etc. Particularly, it is preferable to form a powdery piezoelectric/electrostrictive material as the emitter 22 and impregnate the emitter 22 thus formed with glass of a low melting point or sol particles. According to this process, it is possible to form a film at a low temperature of 700° C. or lower or 600° C. or lower.

The magnitude of the thickness d (see FIG. 1) of the emitter 22 between the upper electrode 18 and the lower electrode 20 will be described below. If the voltage between the upper electrode 18 and the lower electrode 20, i.e., the voltage that appears between the upper electrode 18 and the lower electrode 20 when the drive voltage Va output from the drive circuit 16A is applied between the upper electrode 18 and the lower electrode 20, is represented by Vak, then it is preferable to establish the thickness d such that a polarization inversion or a polarization change occurs with an electric field E expressed by E=Vak/d. That is, as the thickness d is smaller, a polarization reversal or a polarization change can occur at a lower voltage, enabling the electron emitter to emit electrons when driven by a lower voltage, e.g., less than 100 V.

The upper electrode 18 should preferably be made of a conductor having a small sputtering yield and a high evaporation temperature in vacuum. For example, materials having a sputtering yield of 2.0 or less at 600 V in $Ar^+$ and an evaporation pressure of $1.3 \times 10^{-3}$ Pa at a temperature of 1800 K or higher are preferable. Such materials include platinum, molybdenum, tungsten, etc. The upper electrode 18 may be made of a conductor which is resistant to a high-temperature oxidizing atmosphere, e.g., a metal, an alloy, a mixture of insulative ceramics and a metal, or a mixture of insulative ceramics and an alloy. Preferably, the upper electrode 18 should be chiefly composed of a precious metal having a high melting point, e.g., platinum, iridium, palladium, rhodium, molybdenum, or the like, or an alloy of silver and palladium, silver and platinum, platinum and palladium, or the like, or a cermet of platinum and ceramics. Further preferably, the upper electrode 18 should be made of platinum only or a material chiefly composed of a platinum-base alloy. The electrodes should preferably be made of carbon or a graphite-base material, e.g., diamond thin film, diamond-like carbon, or carbon nanotube. Ceramics to be added to the electrode material should preferably have a proportion ranging from 5 to 30 volume %.

Furthermore, the upper electrode 18 should preferably be made of an organic metal paste which can produce a thin film after being baked. For example, a platinum resinate paste or the like, should preferably be used. An oxide electrode for suppressing a polarization inversion fatigue, which is made of ruthenium oxide, iridium oxide, strontium ruthenate, $La_{1-x}Sr_xCoO_3$ (e.g., x=0.3 or 0.5), $La_{1-x}Ca_xMnO_3$, $La_{1-x}Ca_xMn_{1-y}CO_yO_3$ (e.g., x=0.2, y=0.05), or a mixture of any one of these compounds and a platinum resinate paste, for example, is preferable.

The upper electrode 18 may be made of any of the above materials by any of thick-film forming processes including screen printing, spray coating, coating, dipping, electrophoresis, etc., or any of various thin-film forming processes including sputtering, an ion beam process, vacuum evaporation, ion plating, chemical vapor deposition (CVD), plating, etc. Preferably, the upper electrode 18 is made by any of the above thick-film forming processes.

The shape in plan of the upper electrode 18 may be an elliptical shape as shown in FIG. 2A, or a ring shape as with an electron emitter 12Aa according to a first modification shown in FIG. 2B. Alternatively, the shape in plan of the upper electrode 18 may be a comb-toothed shape as with an electron emitter 12Ab according to a second modification shown in FIG. 3.

The ring-shaped or comb-toothed upper electrode 18 is effective to increase the number of triple points of the upper electrode 18, the emitter 22, and the vacuum as electric field concentration points A for increased electron emission efficiency.

The upper electrode 18 should preferably have a thickness tc (see FIG. 1) of 20 μm or less or preferably of 5 μm or less. Therefore, the thickness tc of the upper electrode 18 may be 100 nm or less. If the thickness tc of the upper electrode 18 is extremely small (10 nm or less), then electrons are emitted from the interface between the upper electrode 18 and the emitter 22 for further increased electron emission efficiency.

The lower electrode 20 is made of the same material according to the same process as the upper electrode 18. Preferably, the lower electrode 20 is made according to one of the above thick-film forming processes. The lower electrode 20 should preferably have a thickness of 20 μm or less or preferably of 5 μm or less.

Each time the emitter 22, the upper electrode 18, or the lower electrode 20 is formed, the assembly is heated (sintered) into an integral structure. Depending on how the upper electrode 18 and the lower electrode 20 are formed, however, the heating (sintering) process for producing an integral structure may not be required.

The sintering process for integrally combining the emitter 22, the upper electrode 18, and the lower electrode 20 may be carried out at a temperature ranging from 500° to 1400° C., preferably from 1000° to 1400° C. For heating the emitter 22 which is in the form of a film, the emitter 22 should preferably be sintered together with its evaporation source while their atmosphere is being controlled, so that the composition of the emitter 22 will not become unstable at high temperatures.

The emitter 22 may be covered with a suitable member, and then sintered such that the surface of the emitter 22 will not be exposed directly to the sintering atmosphere.

Figure 4:
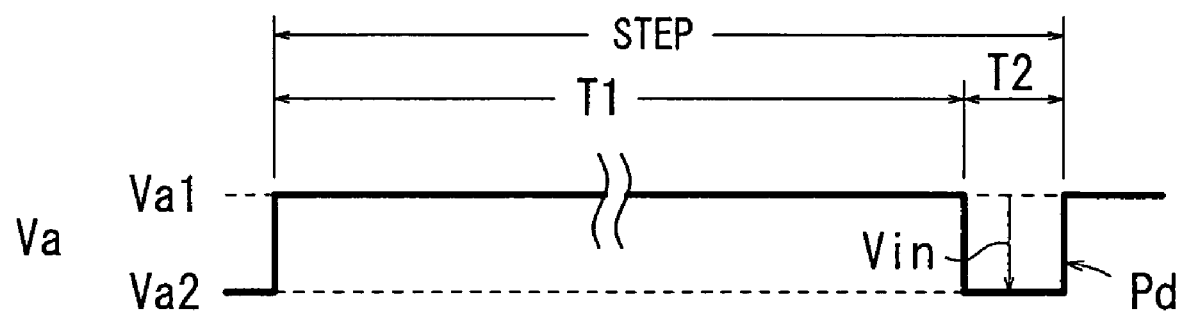
FIG. 4 is a waveform diagram showing a drive voltage output from a drive circuit.

The principles of electron emission of the electron emitter 12A will be described below with reference to FIGS. 1, 4 through 9B. First, as shown in FIG. 4, a drive voltage Va output from the drive circuit 16A has repeated steps each including a period T1, in which a voltage Va1 making the potential of the upper electrode 18 higher than the potential of the lower electrode 20, is output and a period T2, in which a voltage Va2 making the potential of the upper electrode 18 lower than the potential of the lower electrode 20, is output. The voltage Va2 which is output in the period T2 is referred to as a drive pulse Pd.

The drive pulse Pd has an amplitude Vin that is defined as a value produced by subtracting the voltage Va2 from the voltage Va1(=Va1−Va2).

Figure 5:
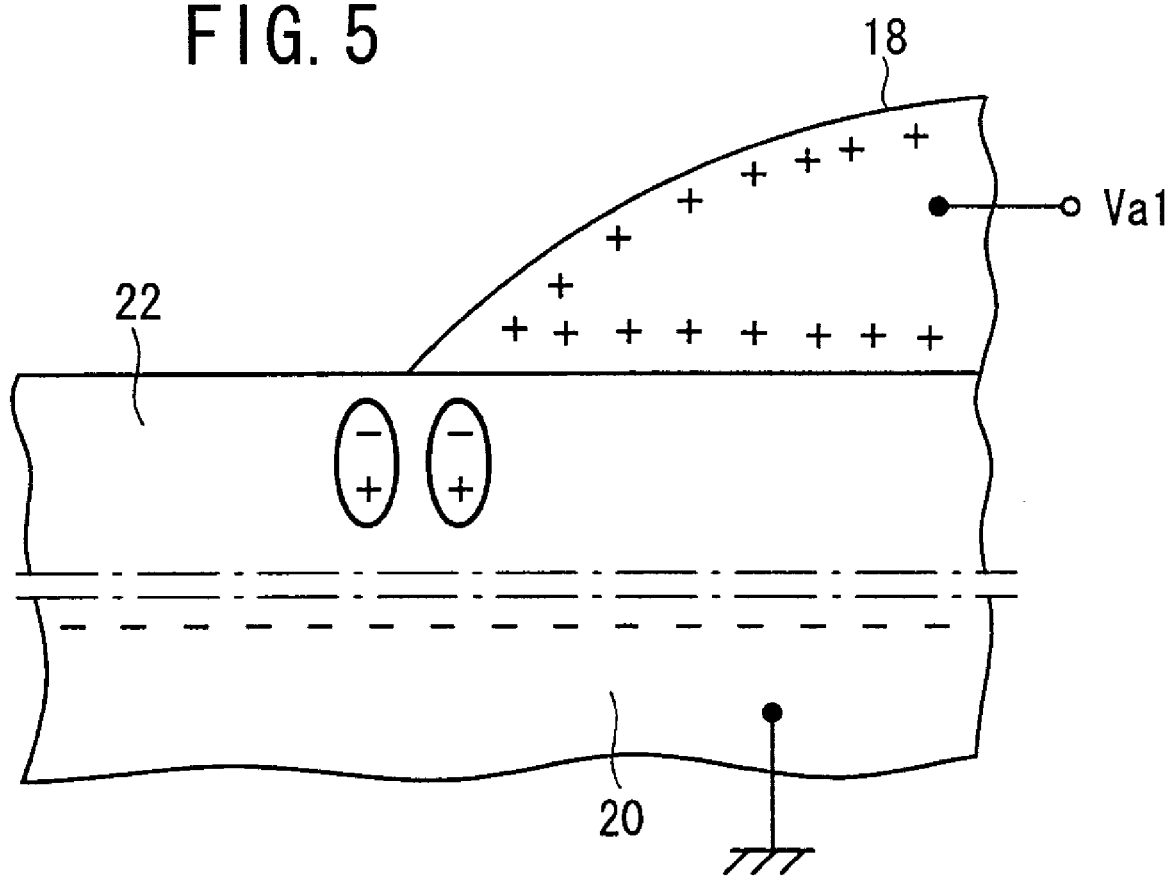
FIG. 5 is a fragmentary cross-sectional view illustrative of the manner in which a voltage Va1 is applied between an upper electrode and a lower electrode in the first embodiment.

The period T1 is a period in which the voltage Va1 is applied between the upper electrode 18 and the lower electrode 20 to polarize the emitter 22, as shown in FIG. 5. The voltage Va1 may be a DC voltage, as shown in FIG. 4, but may be a single pulse voltage or a succession of pulse voltages. The period T1 should preferably be longer than the period T2 for sufficient polarization. For example, the period T1 should preferably be of 100 μsec. or longer. This is because the absolute value of the voltage Va1 for polarization is set so as to be smaller than the absolute value of the voltage Va2 for the purpose of lowering the power consumption at the time the voltage Va1 is applied and preventing damage to the upper electrode 18.

The voltages Va1, Va2 should preferably be of such voltage levels as to be able to polarize the emitter 22 reliably into positive and negative poles. For example, if the dielectric material of the emitter 22 has a coercive voltage, then the absolute values of the voltages Va1, Va2 should preferably be equal to or higher than the coercive voltage.

Figure 6:
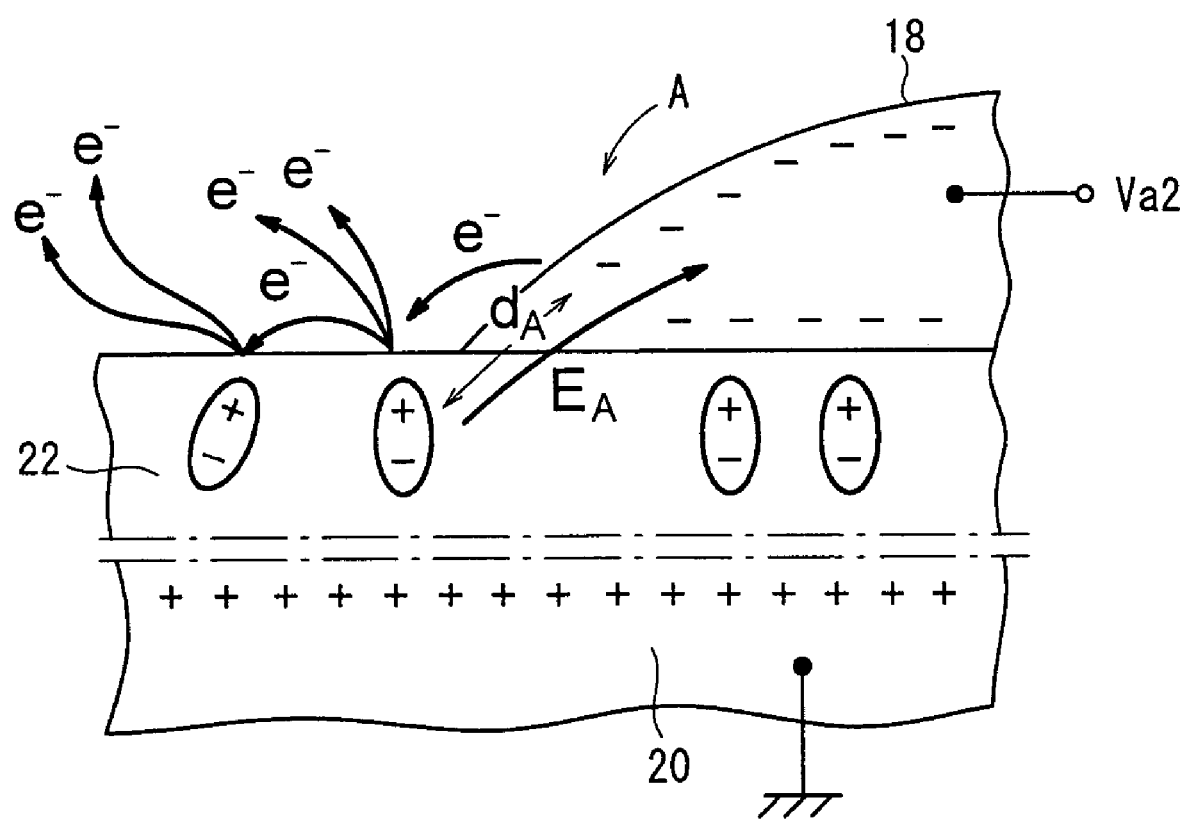
FIG. 6 is a fragmentary cross-sectional view illustrative of an electron emission when a voltage Va2 is applied between the upper electrode and the lower electrode.

When the drive pulse Pd, having an amplitude of a predetermined level, is applied between the upper electrode 18 and the lower electrode 20, the polarization is inverted or changed in at least a portion of the emitter 22, as shown in FIG. 6. The portion of the emitter 22 where the polarization is inverted or changed includes a portion directly below the upper electrode 18 and a portion whose surface is exposed in the vicinity of the upper electrode 18, because the polarization seeps in the portion of the emitter 22 whose surface is exposed in the vicinity of the upper electrode 18. When the polarization is inverted or changed, a local electric field concentration occurs at the upper electrode 18 and the positive poles of the dipole moments near the upper electrode 18, drawing primary electrons from the upper electrode 18. The primary electrons from the upper electrode 18 impinge upon the emitter 22, causing the emitter 22 to emit secondary electrons.

If the electron emitter 12A has a triple point A of the upper electrode 18, the emitter 22, and the vacuum in the present embodiment, primary electrons are drawn from the portion of the upper electrode 18 near the triple point A, and the primary electrons drawn from the triple point A impinge upon the emitter 22, which emits secondary electrons. If the thickness of the upper electrode 18 is very small (up to 10 nm), then electrons are emitted from the interface between the upper electrode 18 and the emitter 22.

Operation of the electron emitter 12A at the time a drive pulse Pd having an amplitude of a predetermined level is applied will be described in greater detail below.

When a drive pulse Pd, having an amplitude of a predetermined level, is applied between the upper electrode 18 and the lower electrode 20, secondary electrons are emitted from the emitter 22, as described above. That is, those dipole moments which, are charged in the emitter 22 in the vicinity of the upper electrode 18, have their positive poles serving as a local anode, drawing electrons from the upper electrode 18. Some of the drawn electrons are attracted to the collector electrode 32 (see FIG. 1) and excite the phosphor 34, which emits fluorescent light. Some of the drawn electrons impinge upon the emitter 22, which emit secondary electrons that are attracted to the collector electrode 32 and excite the phosphor 34.

Figure 8:
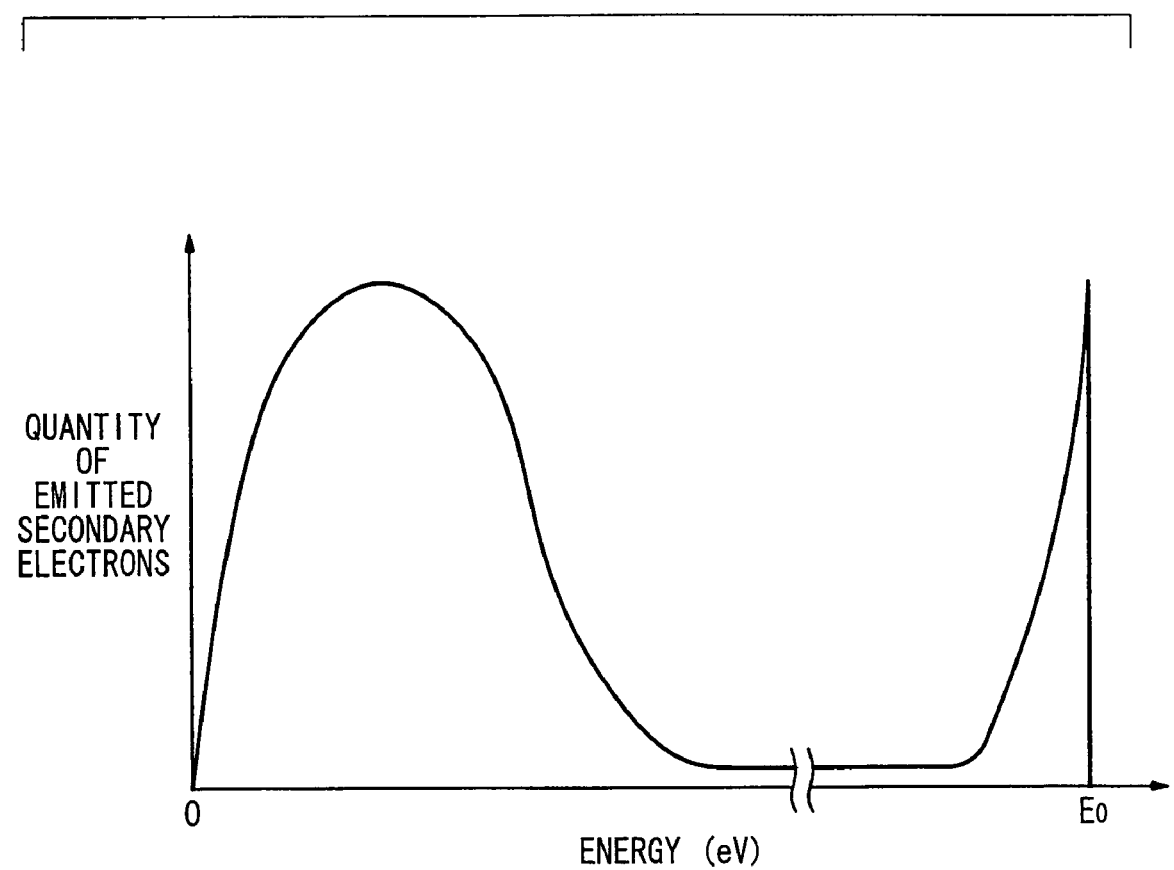
FIG. 8 is a characteristic diagram showing the relationship between the energy of emitted secondary electrons and the quantity of emitted secondary electrons.

A distribution of the emitted secondary electrons will be described below with reference to FIG. 8. As shown in FIG. 8, most of the secondary electrons have an energy level which is nearly zero. When they are emitted from the surface of the emitter 22 into the vacuum, they move according to a surrounding electric field distribution only. Specifically, the secondary electrons are accelerated from an initial velocity of almost 0 (m/sec.) according to the surrounding electric field distribution. Therefore, as shown in FIG. 1, if an electric field Ea occurs between the emitter 22 and the collector electrode 32, then the secondary electrons have their trajectory determined along the electric field Ea. That is, an electron source, which emits electrons straightly, is realized. The secondary electrons with the low initial velocity are electrons in solid state which gain energy by coulomb-attracted impingement of primary electrons and are expelled out of the emitter 22.

As can be seen from FIG. 8, secondary electrons having an energy level corresponding to the energy $E_0$ of primary electrons are emitted. These secondary electrons are primary electrons emitted from the upper electrode 18 and scattered in the vicinity of the surface of the emitter 22 (reflected electrons). The secondary electrons referred to in the present specification are defined as including such reflected electrons and Auger electrons.

If the thickness of the upper electrode 18 is very small (up to 10 nm), then primary electrons emitted from the upper electrode 18 are reflected by the interface between the upper electrode 18 and the emitter 22 and directed toward the collector electrode 32.

As shown in FIG. 6, the intensity $E_A$ of the electric field at the electric field concentration point A is expressed by $E_A = V(1a, 1k)/d_A$ where $V(1a, 1k)$ represents the potential difference between a local anode and a local cathode and $d_A$ the distance between a local anode and a local cathode. Since the distance $d_A$ between a local anode and a local cathode is very small, the intensity $E_A$ of the electric field which is required to emit electrons can easily be achieved (in FIG. 6, an increase in the intensity $E_A$ of the electric field is indicated by the solid-line arrow). This leads to a reduction in a voltage Vak.

As the emission of electrons from the upper electrode 18 progresses, atoms of the emitter 22 which are evaporated and floating due to the Joule heat are ionized into positive ions and electrons by the emitted electrons, and the electrons produced by the ionization ionize atoms of the emitter 22. Therefore, the number of electrons is exponentially increased. When such a process goes on, electrons and positive ions are present in a neutral fashion, developing a local plasma. Secondary electrons are also considered as promoting the ionization. The positive ions produced by the ionization may impinge upon the upper electrode 18, thus damaging the upper electrode 18.

Figure 7:
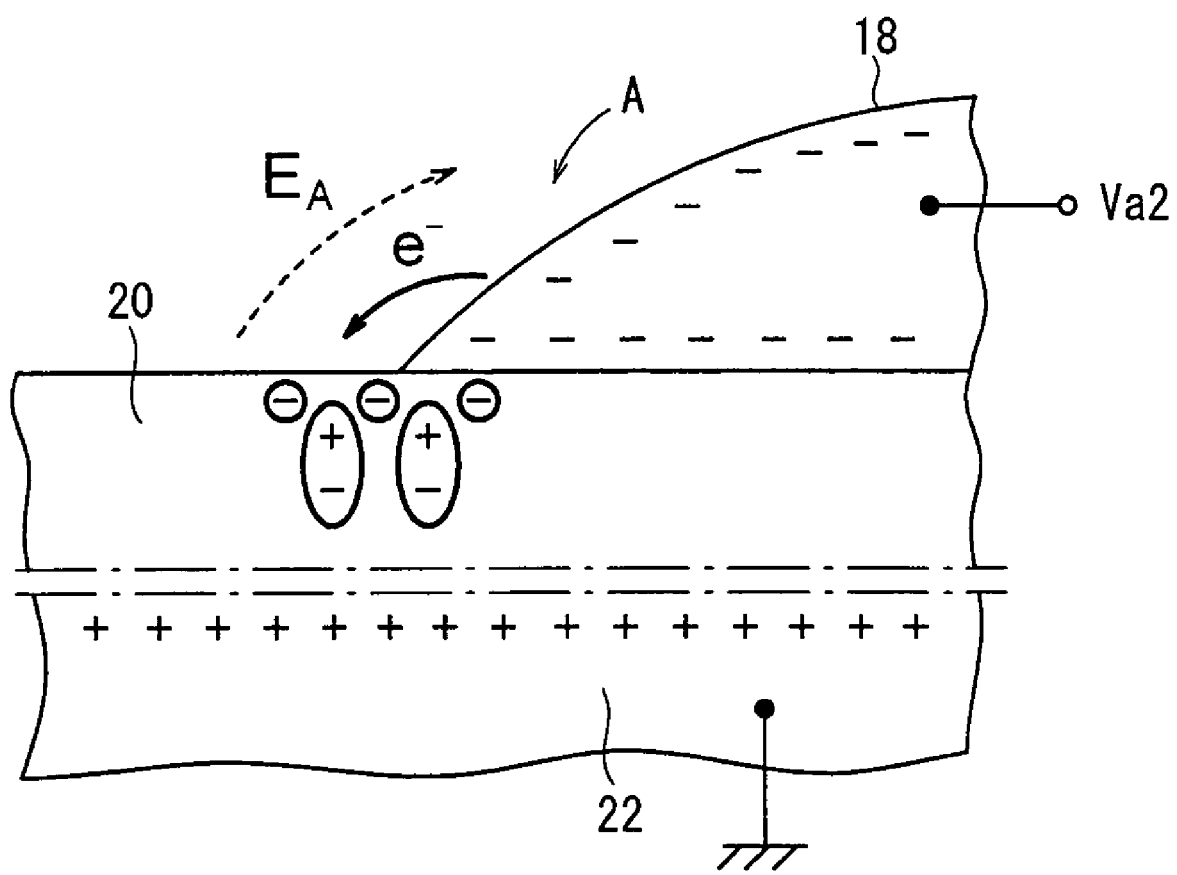
FIG. 7 is a fragmentary cross-sectional view illustrative of a self-inactivation of an electron emission due to a negative charge on the surface of an emitter.

As shown in FIG. 7, electrons drawn from the upper electrode 18 are attracted to the positive poles of dipole moments of the emitter 22 which are present as a local anode, negatively charging the surface of the emitter 22 in the vicinity of the upper electrode 18. As a result, the factor for accelerating electrons (local potential difference) is lessened, no potential is present for the emission of secondary electrons, and the surface of the emitter 22 is further negatively charged.

Therefore, the positive polarity of the local anode provided by the dipole moments is reduced, and the intensity $E_A$ of the electric field between a local anode and a local cathode is reduced (in FIG. 7, a reduction in the intensity $E_A$ of the electric field is indicated by the broken-line arrow), stopping the emission of electrons.

Figure 9A:
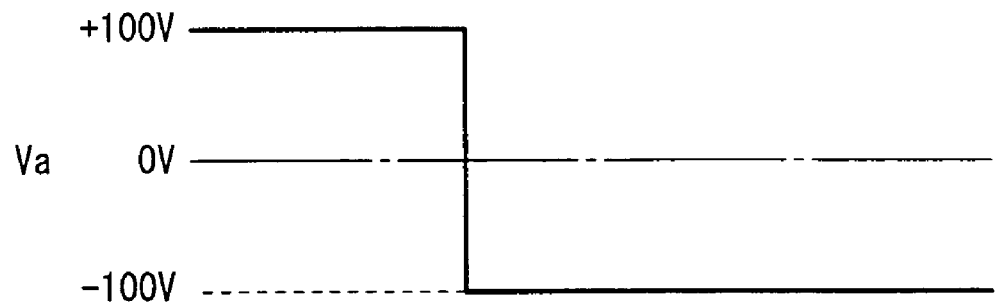
FIG. 9A is a waveform diagram of a drive voltage.
Figure 9B:
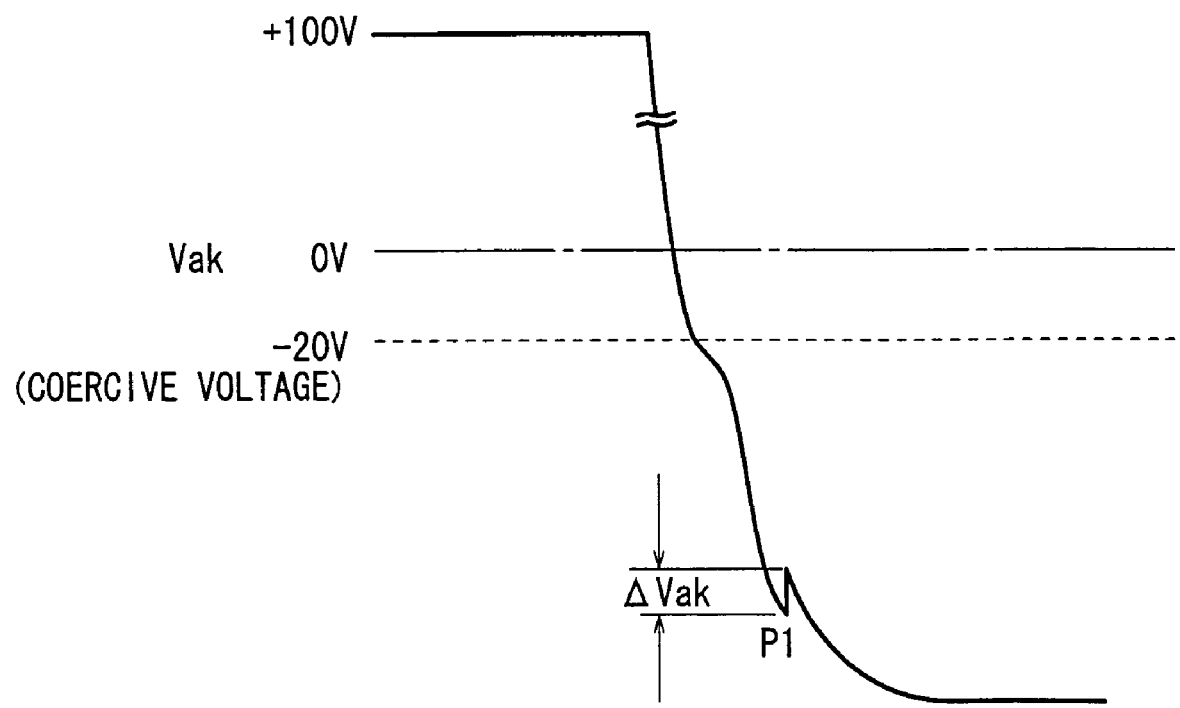
FIG. 9B is a waveform diagram showing a change in the voltage between the upper electrode and the lower electrode of the electron emitter according to the first embodiment.

Specifically, as shown in FIG. 9A, when the drive voltage Va is applied between the upper electrode 18 and the lower electrode 20 such that the voltage Va1 is +100 V and the voltage Va2 is –100 V, for example, a voltage change ΔVak that occurs between the upper electrode 18 and the lower electrode 20 at a peak time point P1 when electrons are emitted is within 20 V (about 10 V in FIG. 9B), and hence the voltage Va is substantially free of changes. Therefore, almost no positive ions are produced, and the upper electrode 18 is prevented from being damaged by positive ions, resulting in a longer service life of the electron emitter 12A.

The dielectric breakdown voltage of the emitter 22 should preferably be at least 10 kV/mm. In the present embodiment, if the thickness d of the emitter 22 is of 20 μm, for example, the emitter 22 will not suffer dielectric breakdown even when a drive voltage of –100 V is applied between the upper electrode 18 and the lower electrode 20.

When electrons emitted from the emitter 22 impinge again upon the emitter 22 or atoms are ionized in the vicinity of the surface of the emitter 22, the emitter 22 may possibly be damaged, inducing crystal defects and resulting in a fragile structure.

The emitter 22 should preferably be made of a dielectric material having a high evaporation temperature in vacuum, e.g., $BaTiO_3$ containing no Pb or the like. The atoms of the emitter 22 thus formed are less likely to evaporate due to the Joule heat, and are prevented from being ionized by electrons. This approach is effective in protecting the surface of the emitter 22.

The pattern shape and potential of the collector electrode 32 may appropriately be changed and unillustrated control electrodes or the like may be disposed between the emitter 22 and the collector electrode 32 to establish a desired electric field distribution between the emitter 22 and the collector electrode 32, thereby controlling the trajectory of emitted secondary electrons and converging, enlarging, and modifying the electron beam diameter with ease.

Since the electron emitters 12A output secondary electrons emitted from the emitter 22, the service life and reliability thereof for electron emission can be increased. Furthermore, as the electron emitters 12A are arranged in a two-dimensional array in the first embodiment, there is realized a planar light source which can be of a longer service life and of increased reliability.

Advantages of planar light sources will be described below in terms of their differences with displays. Unlike a display, a planar light source may emit light from its entire surface at all times, and hence does not need to be driven under complex control such as row scanning control, etc., but may be driven altogether statically. Since the diameter of a light emission spot produced by an electron emission does not need to be controlled, it is not necessary to install a control electrode, etc. functioning as a focusing lens, for example, between the electron emitters and the phosphors. This leads to a simplified mechanical arrangement and a simplified circuit arrangement.

The display needs to handle a data signal that changes at a high speed depending on the pixel signal. Therefore, the drive voltage is of a complex waveform that is modulated depending on the gradation. On the other hand, as the planar light source is not required to handle a data signal that changes at a high speed depending on the pixel signal, the drive voltage may be of a simple waveform, i.e., a waveform having a constant pulse period or pulse duration. As a result, if an electric power retrieval circuit, to be described later, is connected to the planar light source, not only the circuit constants, circuit switching timing, etc. of the electric power retrieval circuit can be set with high accuracy, but also almost 100% of the drive voltage can be retrieved.

Figure 10:
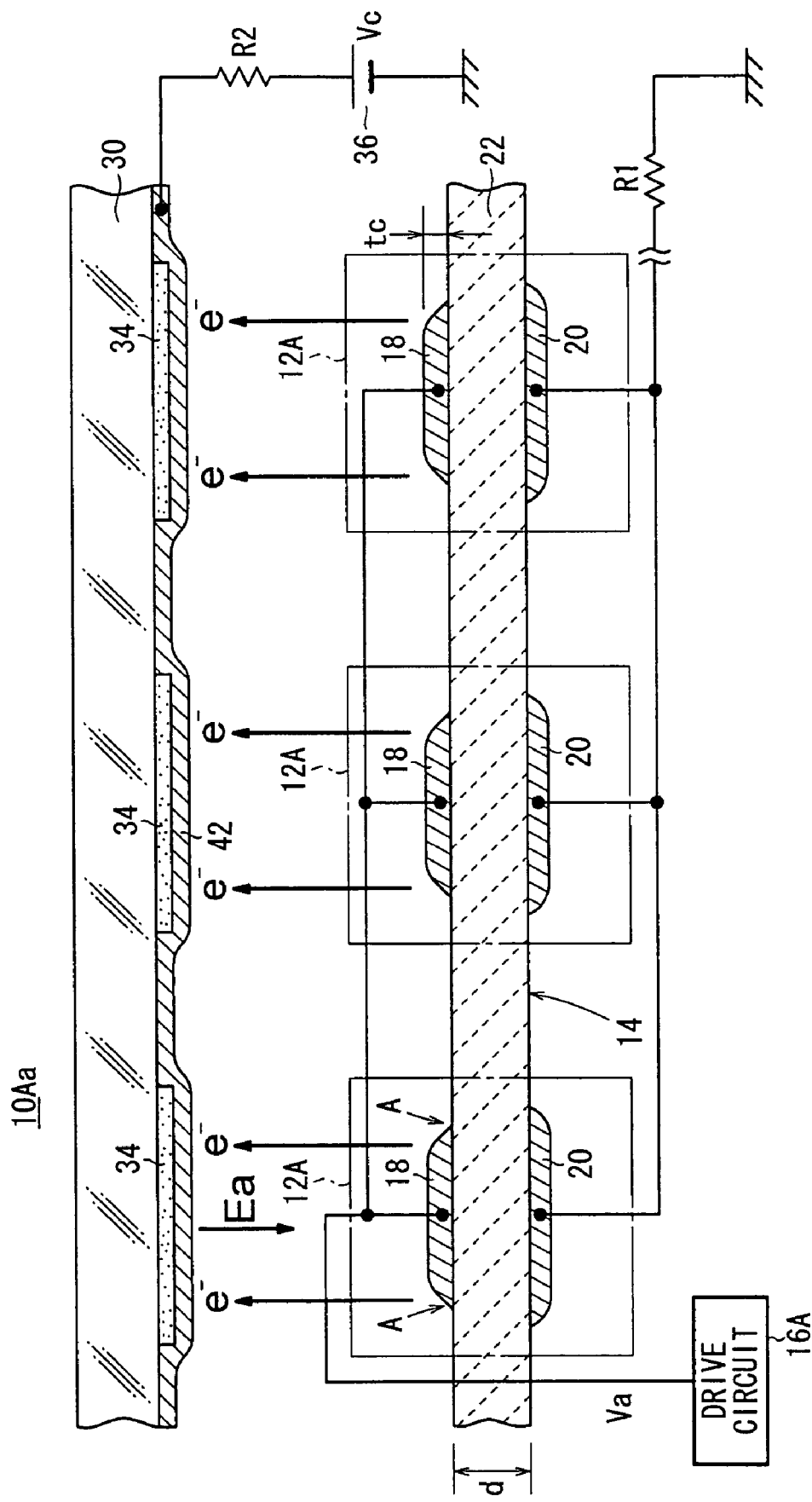
FIG. 10 is a fragmentary cross-sectional view, partly in block form, of a first modification of the light source according to the first embodiment of the present invention.

In the above embodiment, the collector electrode 32 is disposed on the reverse side of the transparent panel 30, and the phosphor 34 is disposed on the surface of the collector electrode 32 which faces the upper electrode 18. In a light source 10Aa according to a first modification shown in FIG. 10, phosphors 34 are disposed on the reverse side of the transparent panel 30, and the collector electrode 32 is disposed in covering relation to the phosphors 34. In this case, the collector electrode 32 functions as a metal back. Secondary electrons emitted from the emitter 22 pass through the collector electrode 32 into the phosphors 34, exciting the phosphors 34. Therefore, the collector electrode 32 is of a thickness which allows electrons to pass therethrough, preferably 100 nm or less. As the kinetic energy of the secondary electrons is larger, the thickness of the collector electrode 32 may be increased.

This arrangement offers the following advantages:

(1) If the phosphor 34 is not electrically conductive, then the phosphor 34 is prevented from being charged (negatively), and an electric field for accelerating electrons can be maintained.

(2) The collector electrode 32 reflects light emitted from the phosphor 34, and discharges the light emitted from the phosphor 34 efficiently toward the transparent panel 30 (light emission surface).

(3) Secondary electrons are prevented from impinging excessively upon the phosphor 34, thus preventing the phosphor 34 from being deteriorated and from producing a gas.

Figure 11:
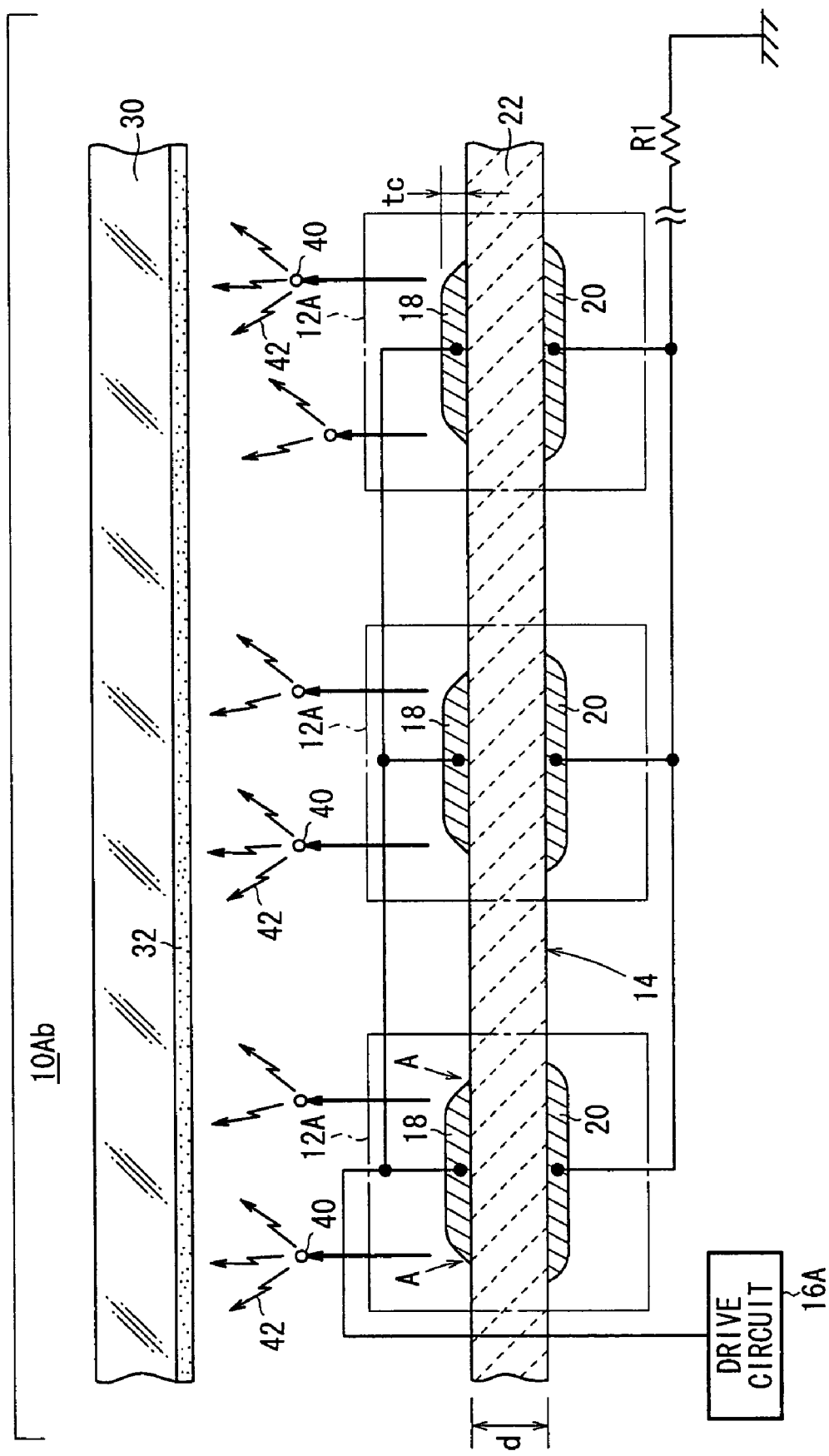
FIG. 11 is a fragmentary cross-sectional view, partly in block form, of a second modification of the light source according to the first embodiment of the present invention.

FIG. 11 shows a light source 10Ab according to a second modification. In the light source 10Ab, the phosphor 34 is formed on the transparent panel 30, and mercury particles 40, for example, are sealed in the atmosphere between the light emitting section 14A having the electron emitters 12A and the phosphor 34. In this case, some of secondary electrons emitted from the electron emitters 12A impinge upon the mercury particles 40, which are excited to emit ultraviolet rays 42. The ultraviolet rays 42 hit the phosphor 34, which is excited to emit fluorescent light.

Figure 12:
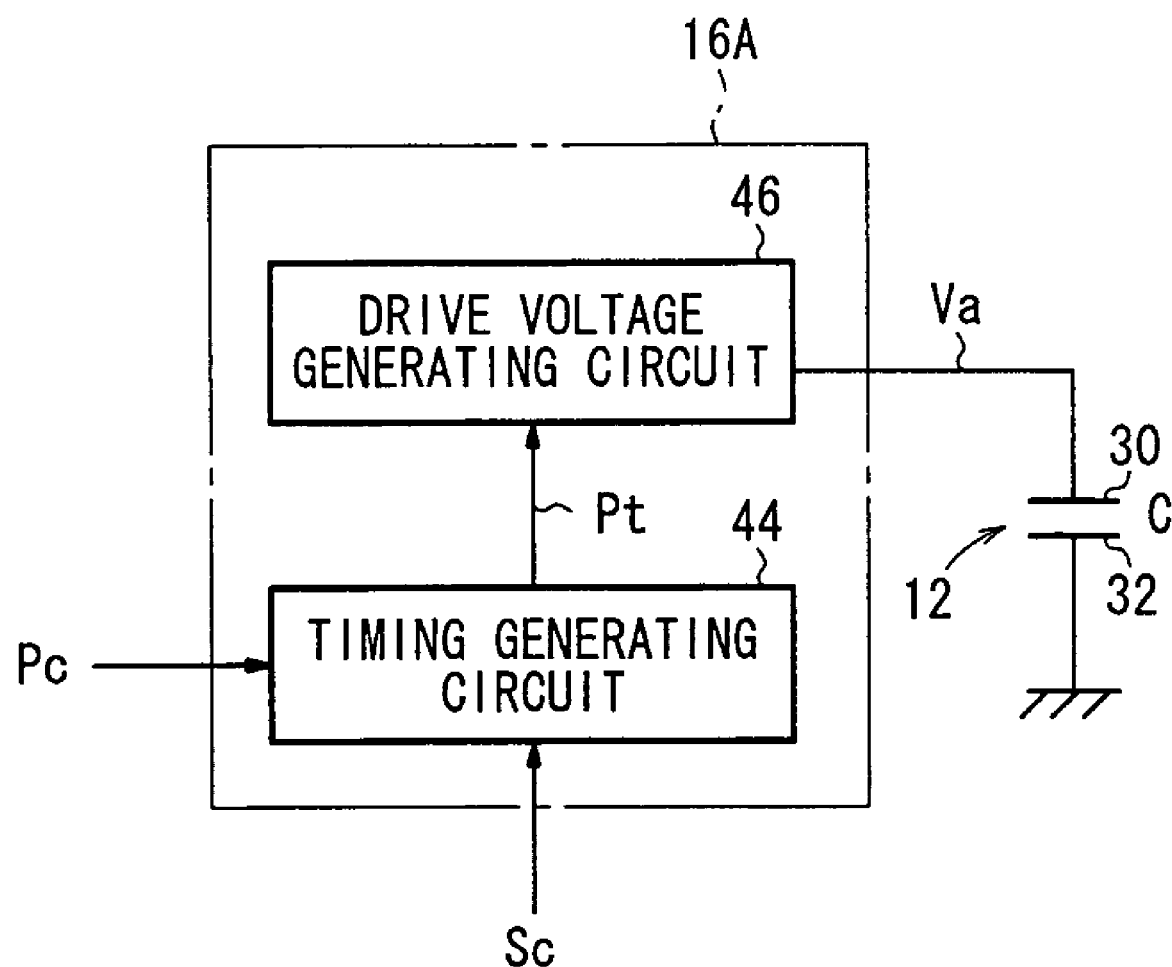
FIG. 12 is a block diagram of a drive circuit.

As shown in FIG. 12, the drive circuit 16A comprises a timing generating circuit 44 and a drive voltage generating circuit 46.

The timing generating circuit 44 generates and outputs a timing pulse Pt for determining the output timing of the drive pulse Pd based on the control signal Sc representative of turn-on/turn-off and a clock signal Pc. Specifically, as shown in FIG. 13A, the timing generating circuit 44 starts counting the clock signal Pc (see FIG. 13B) from the time when the control signal Sc goes high (a level representative of turn-on). As shown in FIG. 13C, the timing generating circuit 44 repeatedly generates and outputs a high-level timing pulse Pt during a period T2 corresponding to m clock pulses and a low-level timing pulse Pt during a period T2 corresponding to n clock pulses. The timing pulses Pt are successively output only during a period (turn-on period Ts) in which the control signal Sc represents turn-on. During a period in which the control signal Sc is of a low level (a level representative of turn-off), i.e., during a turn-off period Tn, the timing generating circuit 44 outputs only a low-level signal.

The drive voltage generating circuit 46 generates and outputs a drive voltage Va to be applied between the upper electrode 18 and the lower electrode 20 of each of the electron emitters 12A based on the timing pulses Pt from the timing generating circuit 44. Specifically, as shown in FIG. 13D, the drive voltage generating circuit 46 outputs a voltage Va1 during the period T1, in which the output level of the timing generating circuit 44 is low, and outputs a voltage Va2 during the period T2, in which the output level of the timing generating circuit 44 is high. Therefore, the drive voltage Va output from the drive voltage generating circuit 46 has a waveform representing a succession of drive pulses Pd in synchronism with the timing pulses Pt from the timing generating circuit 44.

During the turn-on period Ts, each of the electron emitters 12A continuously emits electrons to excite the phosphor 34 in response to the application of drive pulses Pd between the upper electrode 18 and the lower electrode 20 of the electron emitter 12A. As a result, the fluorescent light emission is sustained during the turn-on period Ts. During the turn-off period Tn, since no drive pulses Pd are applied between the upper electrode 18 and the lower electrode 20 of each of the electron emitters 12A, the emission of electrons from the electron emitter 12A are stopped, keeping the light source turned off until a next turn-on instruction.

Figure 14:
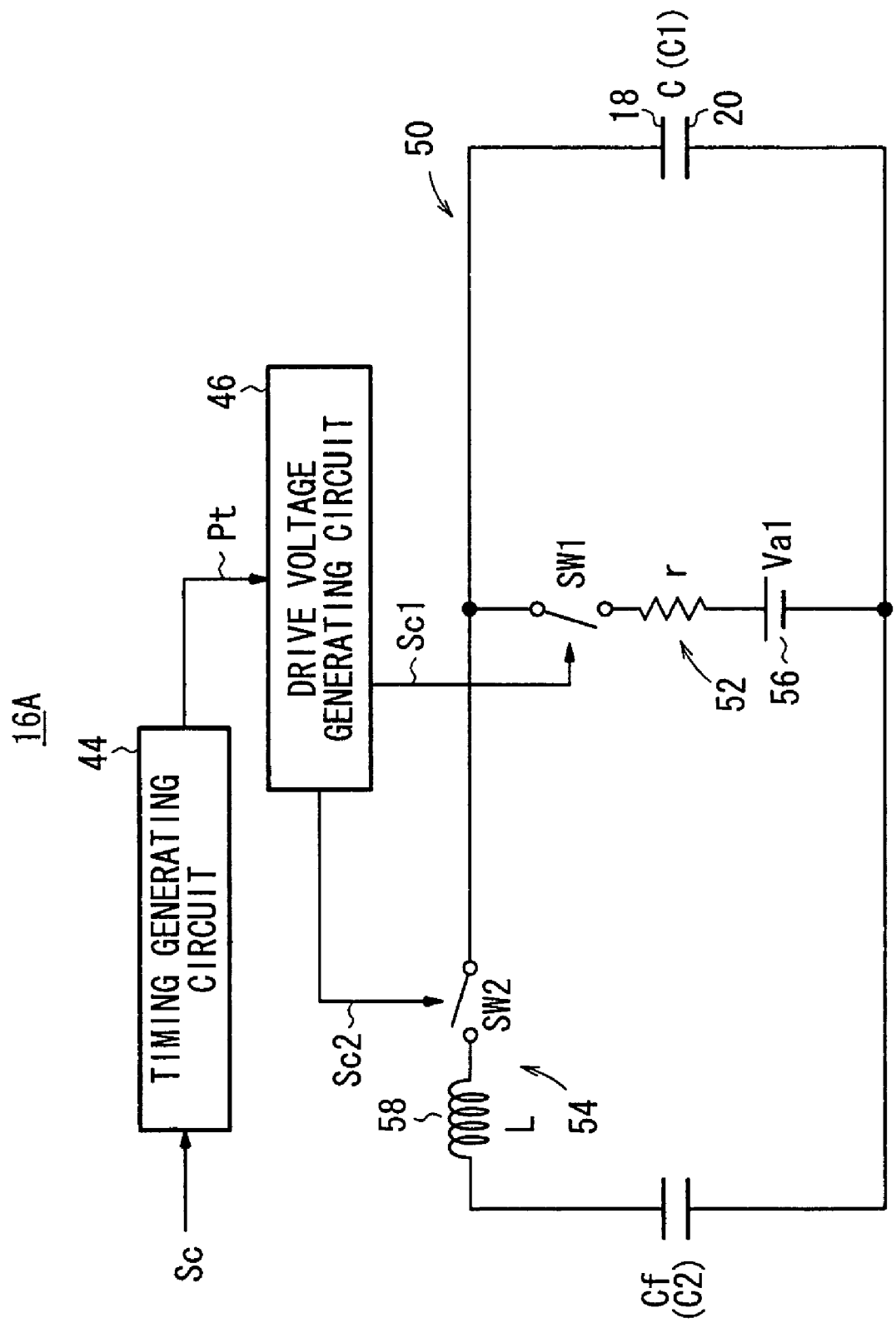
FIG. 14 is a circuit diagram, partly in block form, showing a conceptual representation of a drive circuit according to a preferred embodiment of the present invention.
Figure 15:
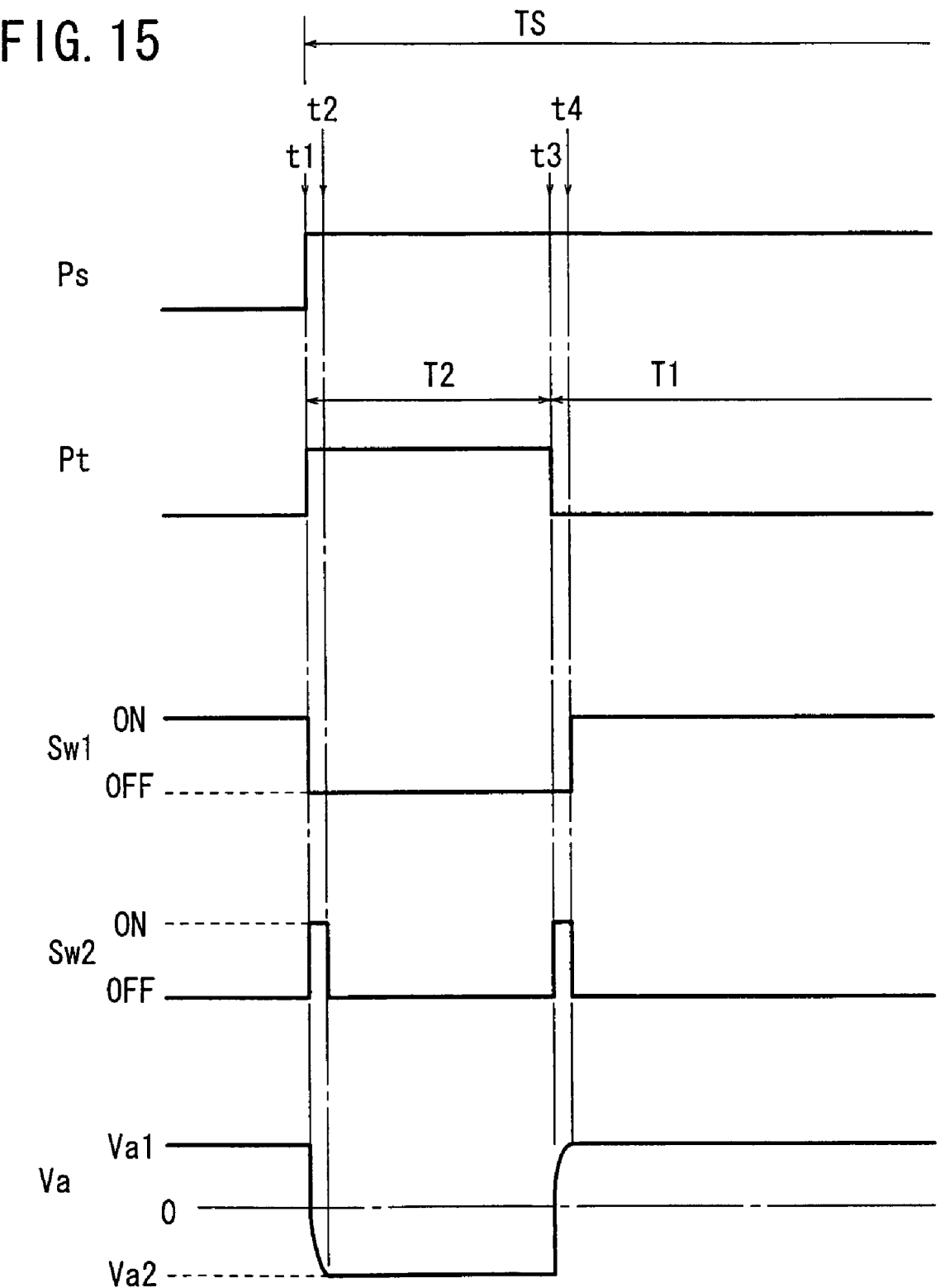
FIG. 15 is a waveform diagram illustrative of operation of the drive circuit.

A preferred embodiment of the drive circuit 16A will be described below with reference to FIGS. 14 and 15. The drive circuit 16A according to the present embodiment has, as shown in FIG. 14, the timing generating circuit 44 and the drive voltage generating circuit 46 as described above, and an electric power retrieval circuit 50. In FIG. 14, all the electron emitters 12A in the light emitting section 14A are represented as a single capacitor C. One of the electrodes of the capacitor C represents the upper electrodes 18 of all the electron emitters 12A, and the other of the electrodes of the capacitor C represents the lower electrodes 20 of all the electron emitters 12A.

A conceptual arrangement of the electric power retrieval circuit 50 will be described below. A buffer capacitor Cf and a first series-connected circuit 52 are connected parallel to each other between both electrodes (the upper electrode 18 and the lower electrode 20) of the capacitor C. A second series-connected circuit 54 is also connected between the capacitor C and the buffer capacitor Cf.

In the embodiment shown in FIG. 14, one buffer capacitor Cf is connected to one capacitor C. However, two or more buffer capacitors Cf may be connected to one capacitor C, and the number of buffer capacitors Cf is arbitrary.

The first series-connected circuit 52 comprises a first switching circuit SW1, a current-suppressing first resistor r, and a positive power supply 56 (voltage Va1) which are connected in series to each other. The second series-connected circuit 54 comprises a second switching circuit SW2 and an inductor 58 (inductance L) which are connected in series to each other.

The drive voltage generating circuit 46 generates and outputs control signals Sc1, Sc2 for controlling the first switching circuit SW1 and the second switching circuit SW2 based on timing pulses Pt from the timing generating circuit 44.

Operation of the drive circuit 16A according to the present embodiment will be described with reference to FIG. 15.

Prior to the start of the turn-on period Ts, the first switching circuit SW1 is turned on and the second switching circuit SW2 is turned off. The voltage across the capacitor C is substantially the same as the voltage Va1 of the positive power supply 56.

In the turn-on period Ts, at time t1 when the period T2 starts, the first switching circuit SW1 is turned off and the second switching circuit SW2 is turned on by the drive voltage generating circuit 46. The inductor 58 and the capacitor C start oscillating sinusoidally, whereupon the voltage across the capacitor C starts being attenuated resonantly. At this time, electric charges stored in the capacitor C are retrieved by the buffer capacitor Cf.

At time t2, i.e., at the time when the oscillating waveform (voltage waveform) of the capacitor C is of the lowest level (voltage:—Va1=Va2), the second switching circuit SW2 is turned off by the drive voltage generating circuit 46, placing the system of the capacitor C and the buffer capacitor Cf in a high impedance state. From time t2 on, the voltage Va2 is maintained until time t3 when the period T2 ends. As described above, when the voltage Va1 drops to the voltage Va2, the emitters 22 of the electron emitters 12A emit secondary electrons to emit light through the entire surface of the transparent panel 30.

Thereafter, at time t3 when the period T2 ends, the second switching circuit SW2 is turned on by the drive voltage generating circuit 46. The inductor 62 and the capacitor C start oscillating sinusoidally, whereupon the voltage across the capacitor C starts being amplified resonantly. At this time, electric charges stored in the buffer capacitor Cf are charged in the capacitor C.

At time t4, i.e., at the time when the oscillating waveform (voltage waveform) of the capacitor C is of the highest level (voltage: Va1), the second switching circuit SW2 is turned off and the first switching circuit SW1 is turned on by the drive voltage generating circuit 46. From time t4 on, the voltage Va1 is maintained until time t2 when the next period T2 starts.

As shown in FIGS. 13A through 13D, one step of successive periods T2, T1 is repeated during the turn-on period Ts. Even when the electron emitter 12A self-inactivates the emission of electrons, since a next period T2 comes to emit electrons, the emission of light is apparently maintained through the entire surface of the transparent panel 30 throughout the period Ts. Specifically, before the light emitted by a single emission of electrons is extinguished, a next emission of electrons occurs, causing the light source to emit light continuously.

In the turn-off period Tn, as shown in FIGS. 13A through 13D, since the voltage Va1 is continuously applied to each of the electron emitters 12A, no electrons are emitted from the electron emitters 12A, keeping the light source turned off throughout the turn-off period Tn.

The electric power retrieval circuit 50 connected to the drive circuit 16A makes it possible to retrieve almost 100% of the drive voltage Va, resulting in an advantage for the reduction of electric power consumption. In this embodiment, the first series-connected circuit 52 is included to forcibly change the voltage across the capacitor C to the voltage Va1 at a predetermined time. Therefore, an attenuation of the drive voltage due to the electric power consumption by the inductor 58 can be avoided. At the time of starting to use the light source 10A, the voltage across the capacitor C may be set to the voltage Va1, and thereafter the capacitor C and the buffer capacitor Cf may alternately be charged and discharged only by turning on and off the second switching circuit SW2.

With the light source 10A according to the first embodiment, the drive voltage Va is applied to the upper and lower electrodes 18, 20 of all the electron emitters 12A to cause the light emitting section 14A to emit light through the entire surface of the transparent panel 30. With a light source 10Ac according to a third modification shown in FIG. 16, the light emitting section 14A is divided into two groups (first and second groups G1, G2). When the electron emitters 12A in the group G1 emit light, the electron emitters 12A in the group G2 retrieve electric power of the electron emitters 12A in the group G1, and when the electron emitters 12A in the group G2 emit light, the electron emitters 12A in the group G1 retrieve electric power of the electron emitters 12A in the group G2.

If the electron emitters 12A in the group G1 are represented as a capacitor C1 and the electron emitters 12A in the group G2 by a capacitor C2, then the drive circuit 16A may include the capacitor C1 instead of the capacitor C and the capacitor C2 instead of the buffer capacitor Cf as indicated by the parentheses in FIG. 14.

Figure 17:
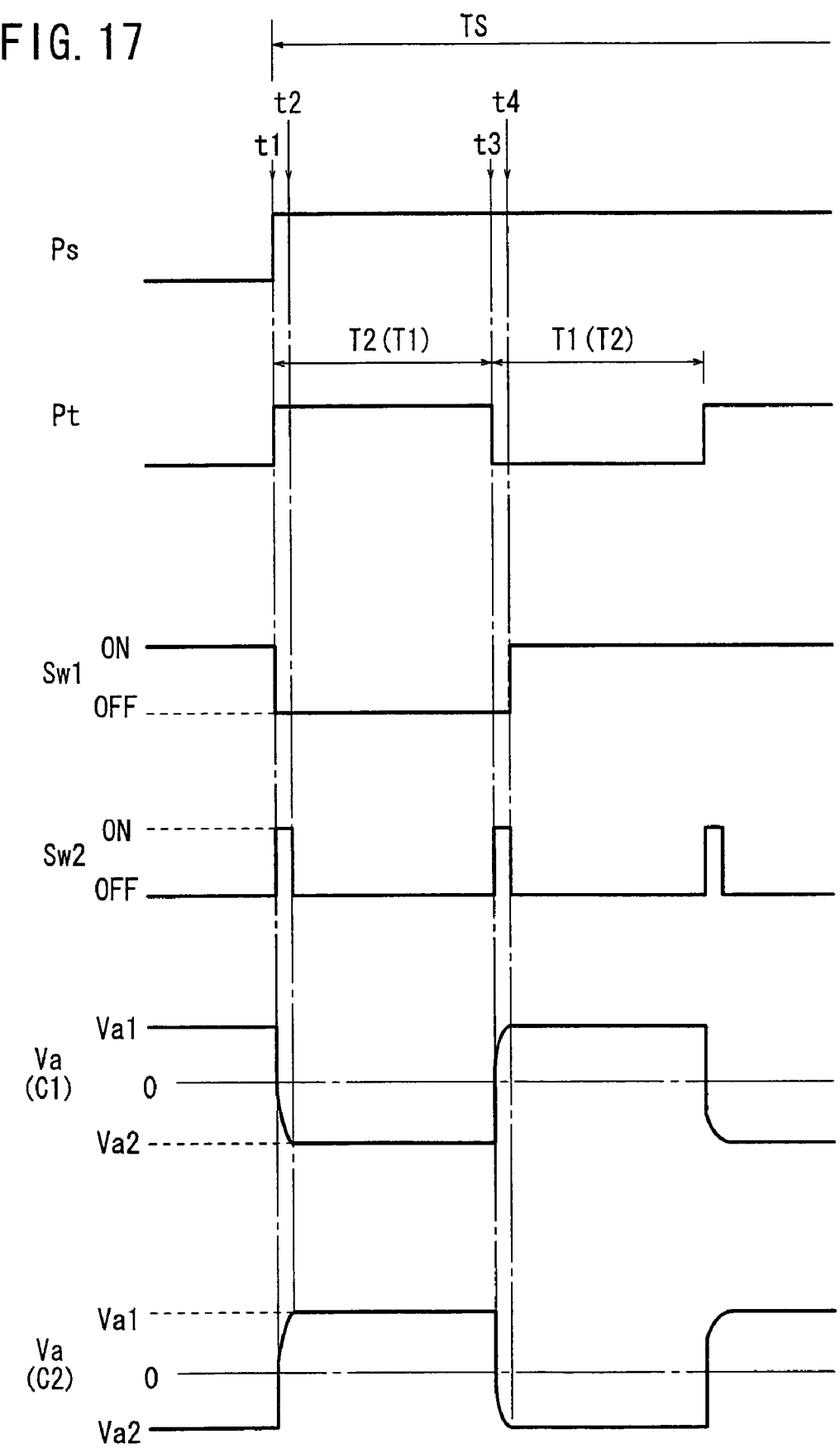
FIG. 17 is a waveform diagram illustrative of operation of a drive circuit for the light source according to the third modification.

Operation of the drive circuit 16A as applied to the light source 10Ac will be described below with reference to FIG. 17. Prior to the start of the turn-on period Ts, the first switching circuit SW1 is turned on and the second switching circuit SW2 is turned off. The voltage across the capacitor C is substantially the same as the voltage Va1 of the positive power supply 56.

In the turn-on period Ts, at time t1 when the period T2 starts, the first switching circuit SW1 is turned off and the second switching circuit SW2 is turned on by the drive voltage generating circuit 46. The inductor 58 and the capacitor C1 start oscillating sinusoidally, whereupon the voltage across the capacitor C1 starts being attenuated resonantly. At this time, electric charges stored in the capacitor C1 are retrieved by the buffer capacitor Cf.

Specifically, as viewed from the capacitor C2, the inductor 58 and the capacitor C1 start oscillating sinusoidally at time t1, and the voltage across the capacitor C2 starts being amplified resonantly. At this time, electric charges stored in the capacitor C1 are retrieved by the capacitor C2.

At time t2, i.e., at the time when the oscillating waveform (voltage waveform) of the capacitor C1 is of the lowest level (voltage:—Va1=Va2), the second switching circuit SW2 is turned off by the drive voltage generating circuit 46, placing the system of the capacitor C1 and the capacitor C2 in a high impedance state. From time t2 on, the capacitor C1 maintains the voltage Va2 and the capacitor C2 maintains the voltage Va1 until time t3 when the period T2 ends.

Figure 16:
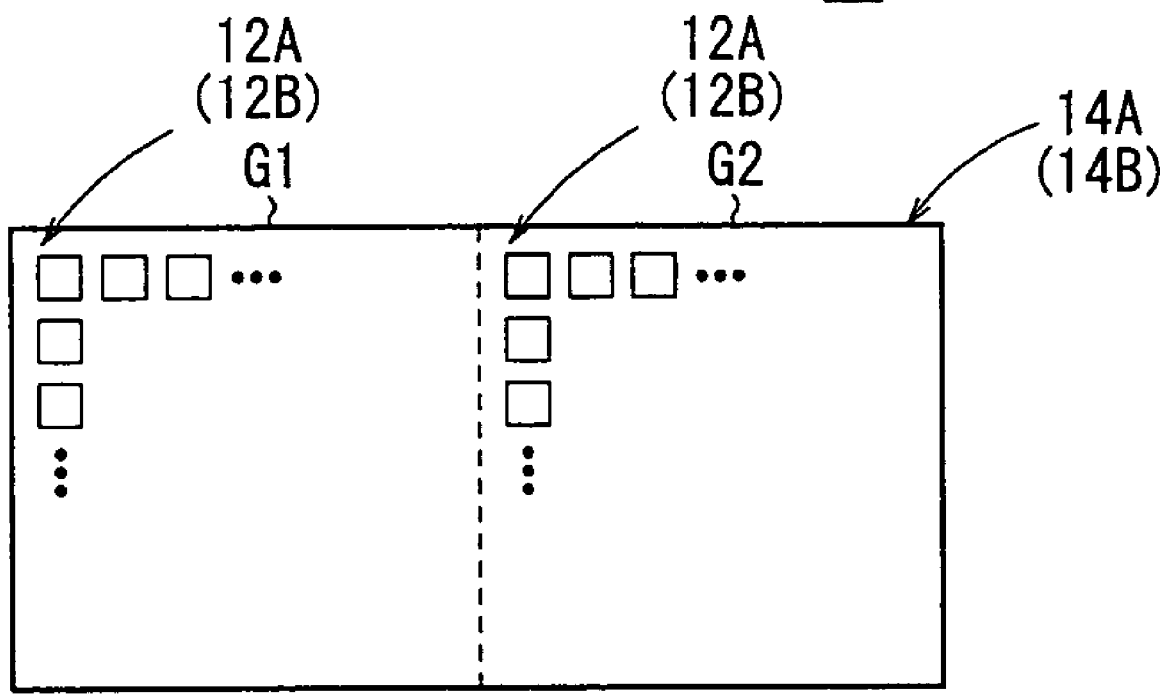
FIG. 16 is a view of a third modification of the light source according to the first embodiment of the present invention.

Particularly, since the voltage across the capacitor C1 quickly drops from the voltage Va1 to the voltage Va2 from time t1 to time t2, the emitters 22 of the electron emitters 12A in the group G1 as shown in FIG. 16 emit secondary electrons. Because of the emission of the secondary electrons, the light source 10Ac emits light through the region of the transparent panel 30 which corresponds to the first group G1.

The period T2 is a period for emitting electrons from the capacitor C1, and is also a preparatory period T1 until the emission of electrons as viewed from the capacitor C2. Therefore, the period T1 should preferably be equal to the period T2.

Thereafter, at time t3 when the period T2 ends, the second switching circuit SW2 is turned on by the drive voltage generating circuit 46. The inductor 62 and the capacitor C1 start oscillating sinusoidally, whereupon the voltage across the capacitor C starts being amplified resonantly. At this time, electric charges stored in the capacitor C2 are charged in the capacitor C1.

Specifically, as viewed from the capacitor C2, the inductor 58 and the capacitor C2 start oscillating sinusoidally at time t3, and the voltage across the capacitor C2 starts being attenuated resonantly. At this time, electric charges stored in the capacitor C2 are retrieved by the capacitor C1.

At time t4, i.e., at the time when the oscillating waveform (voltage waveform) of the capacitor C1 is of the highest level (voltage: Va1), the second switching circuit SW2 is turned off and the first switching circuit SW1 is turned on by the drive voltage generating circuit 46. From time t4 on, the capacitor C1 maintains the voltage Va1 and the capacitor C2 maintains the voltage Va2 until time t2 when the next period T2 starts.

Since the voltage across the capacitor C2 quickly drops from the voltage Va1 to the voltage Va2 from time t3 to time t4, the emitters 22 of the electron emitters 12A in the group G2 as shown in FIG. 16 emit secondary electrons. Because of the emission of the secondary electrons, the light source 10Ac emits light through the region of the transparent panel 30 which corresponds to the second group G2.

The period T1 starts from time t3. The period T1 is a period for emitting electrons from the capacitor C1, and is also the period T2 for emitting electrons as viewed from the capacitor C2.

A succession of periods T2, T1 (one step) is repeated during the turn-on period Ts to emit electrons alternately from the electron emitters 12A in the group G1 and the electron emitters 12A in the group G2. Therefore, by appropriately setting the period T1 or T2, the light source 10Ac apparently maintains light emission through the entire surface of the transparent panel 30 throughout the turn-on period Ts. It is also possible to intentionally increase the period T1 or the period T2 to allow human eyes to distinguish the emission of light from the first group G1 from the emission of light from the second group G2.

With the light source 10Ac according to the third modification, the electron emitters 12A in the group other than the group which is emitting light double as a buffer capacitor Cf for retrieving electric power. Therefore, no separate buffer capacitor Cf is required, and hence the light source 10Ac may be mounted in a reduced area and may consume reduced electric power. The electron emitter 12A in the first group G1 and the electron emitter 12A in the second group G2 may be positioned in scattered units for achieving apparent uniform planar light emission at all times.

Figure 18:
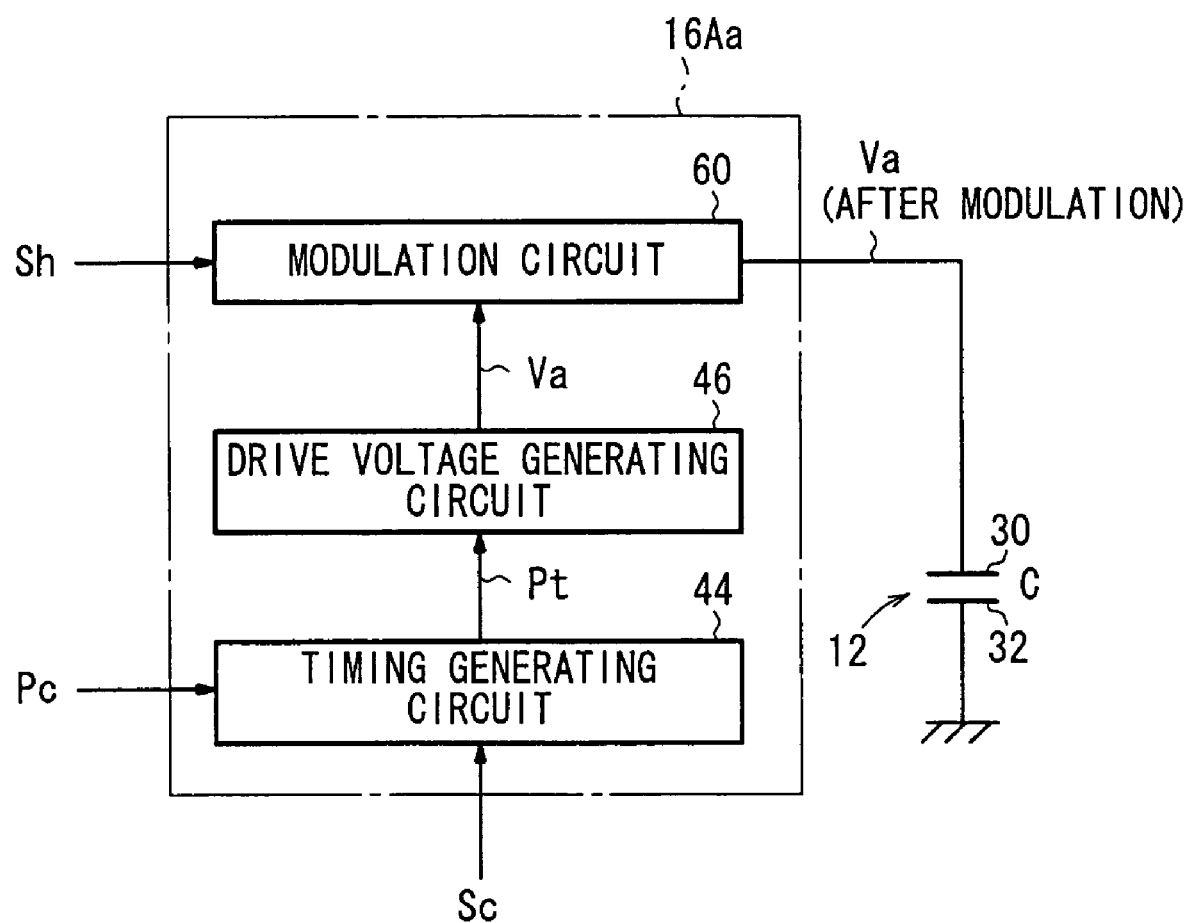
FIG. 18 is a block diagram of a drive circuit according to a modification.

In the above embodiments, each of the electron emitters 12A emits a constant quantity of electrons. FIG. 18 shows a drive circuit 16Aa according to a modification, which comprises the timing generating circuit 44, the drive voltage generating circuit 46, and a modulation circuit 60. The modulation circuit 60 is a circuit for controlling the quantity of electrons emitted from each of the electron emitters 12A depending on a light control signal Sh from a light control volume (not shown) disposed outside of the drive circuit 16Aa.

Figure 19A:
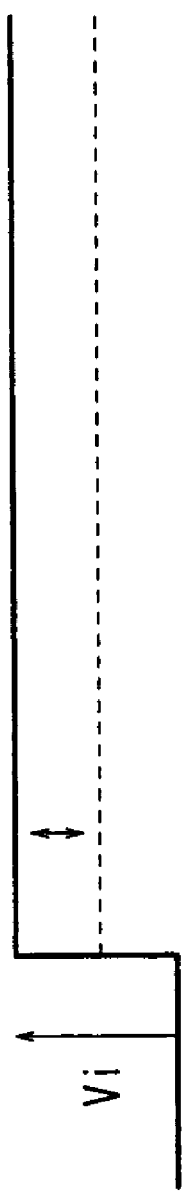
FIG. 19A is a waveform diagram showing a light control signal.
Figure 19B:
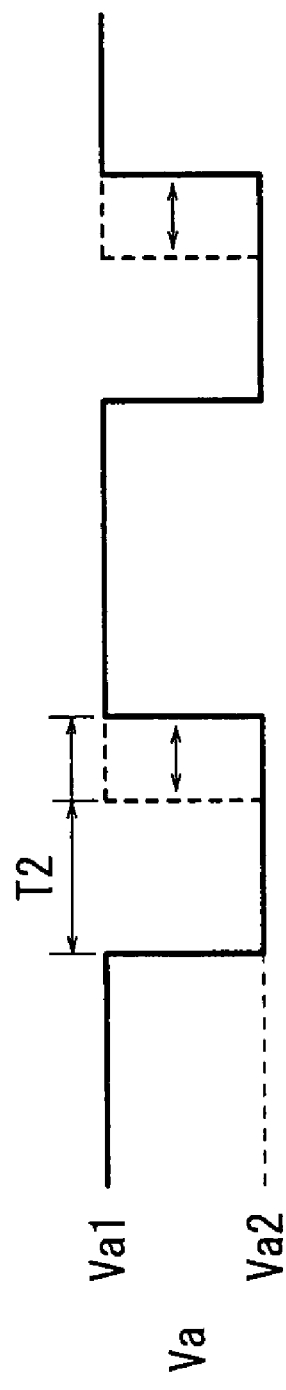
FIG. 19B is a diagram illustrative of a process of modulating a period T2 depending on the voltage level of the light control signal.
Figure 19C:
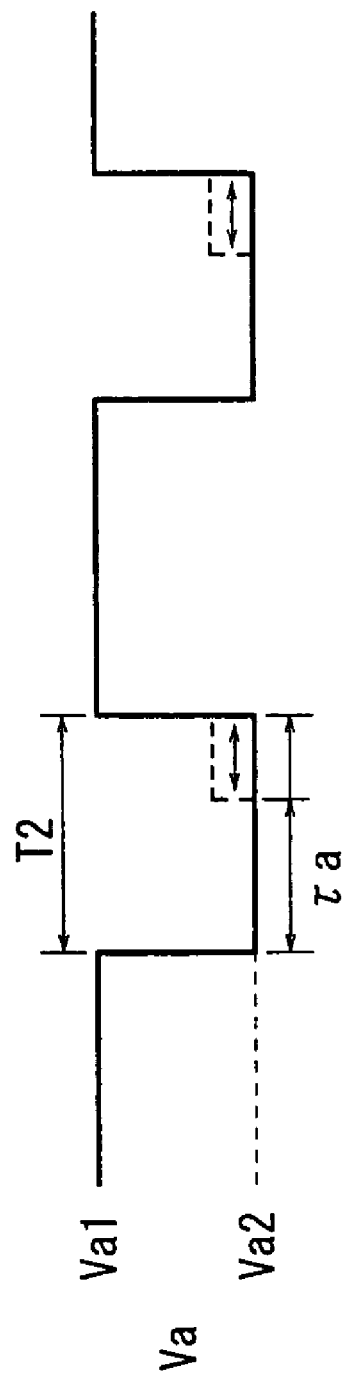
FIG. 19C is a diagram illustrative of a process of modulating a period in which to apply the voltage Va2 (pulse duration) depending on the voltage level of the light control signal.
Figure 20:
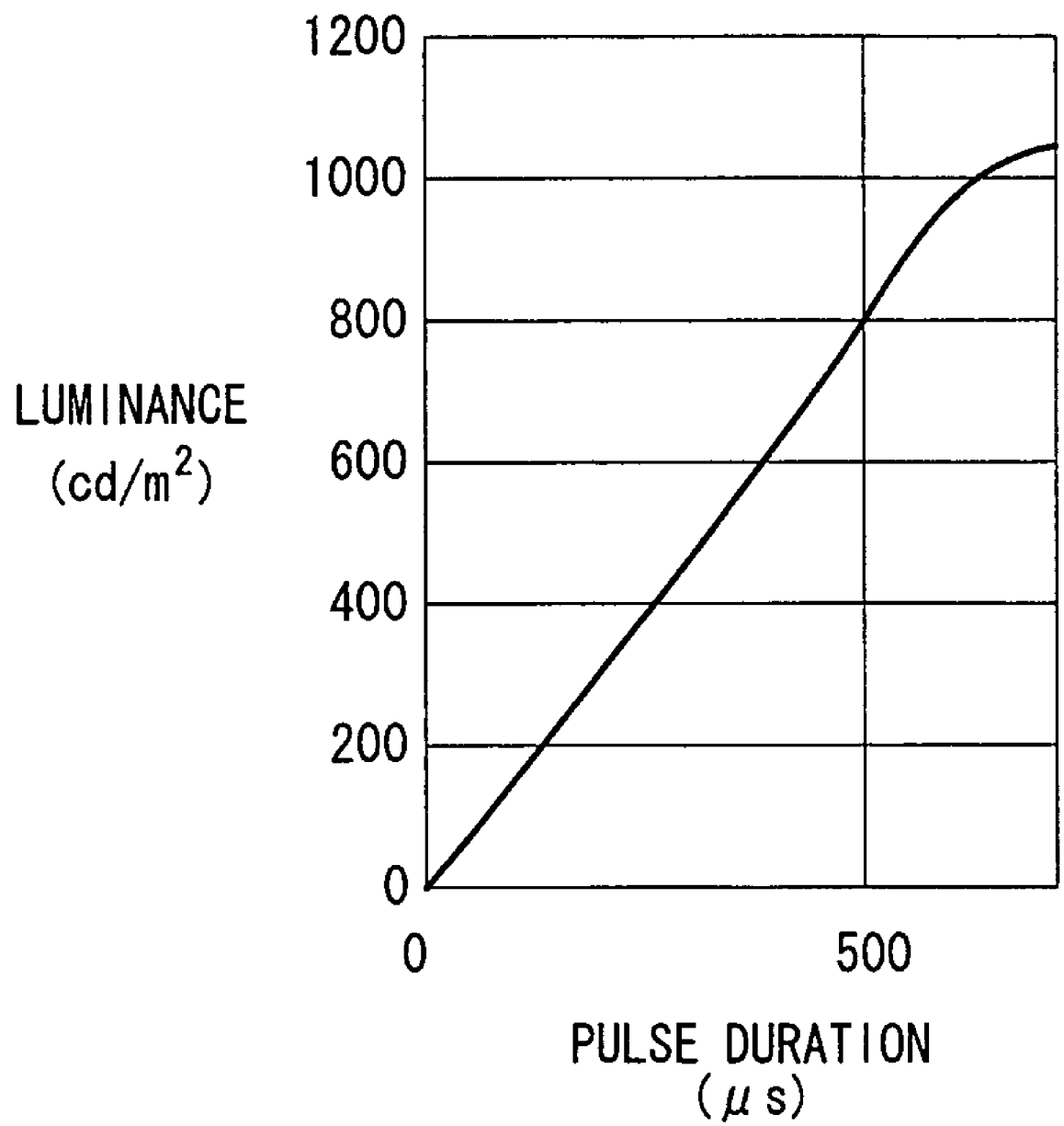
FIG. 20 is a characteristic diagram showing the relationship between the pulse duration of the voltage Va2 and luminance.

The modulation circuit 60 may operate according to four modulation processes. The first modulation process modulates the pulse duration of the voltage Va2, as shown in FIG. 19B or 19C, based on the level (voltage level or the like) of the light control signal Sh, as shown in FIG. 19A. As shown in FIG. 19B, the period T2 itself may be modulated, or as shown in FIG. 19C, the period T2 may be constant, and the period Ta in which to apply the voltage Va2 may be modulated. The modulation process shown in FIG. 19C is based on the fact that the pulse duration of the voltage Va2 and luminance are linearly related to each other as shown in FIG. 20. For example, the luminance can be changed from 0 to about 1020 ($cd/m^2$) by varying the pulse duration from 0 to about 600 µsec. Since the pulse duration of the voltage Va2 may be controlled, highly fine gradation representations can be achieved by performing an inexpensive digital control process.

Figure 21:
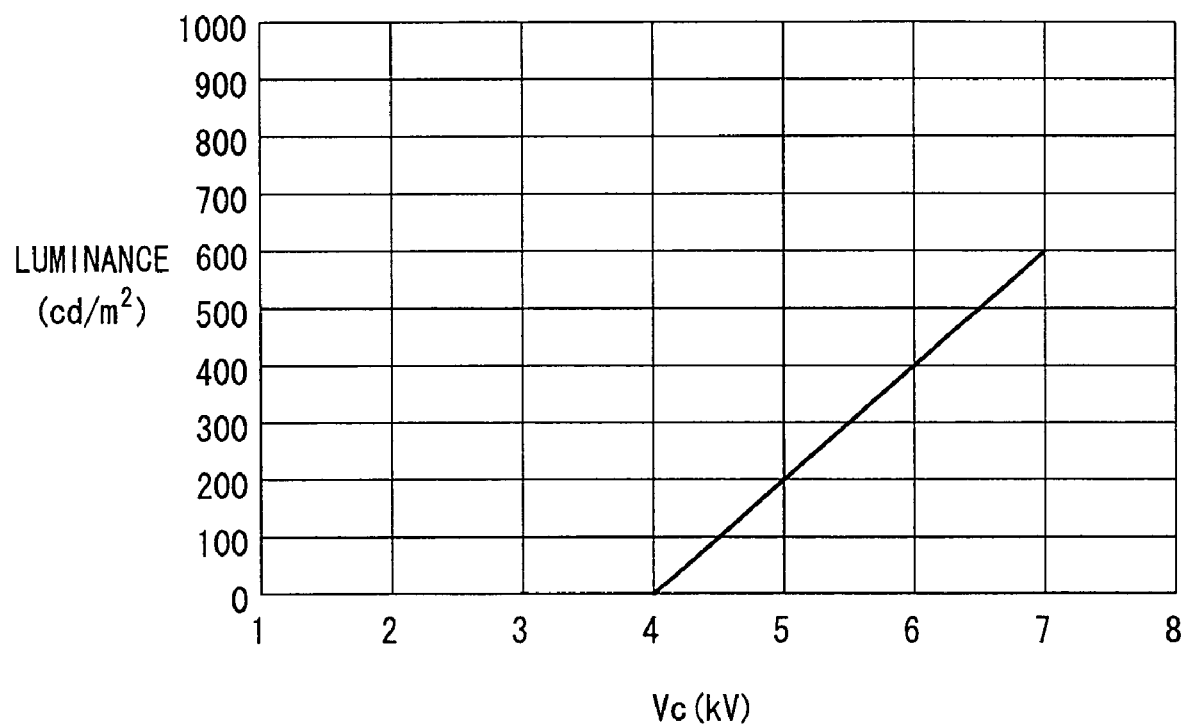
FIG. 21 is a characteristic diagram showing the relationship between a collector voltage and luminance.

The second modulation process is a process of controlling the collector voltage Vc, and is based on the fact that the collector voltage Vc and luminance are linearly related to each other as shown in FIG. 21. For example, if the collector voltage Vc is varied from 4 kV to 7 kV, then the luminance can be changed from 0 to 600 ($cd/m^2$).

Figure 22:
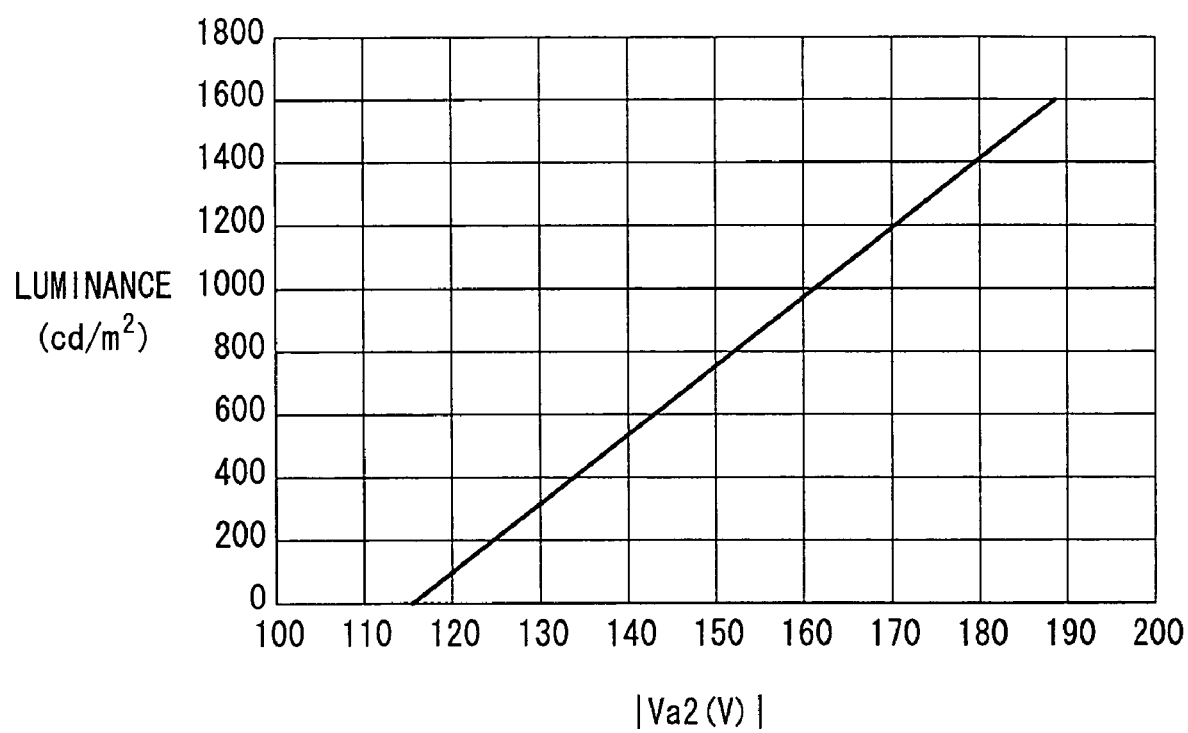
FIG. 22 is a characteristic diagram showing the relationship between the voltage Va2 (voltage level) applied between the upper electrode and the lower electrode and luminance.

The third modulation process is a process of controlling the voltage Va2 (voltage level) of the drive voltage V1, and is based on the fact that the voltage Va2 and luminance are linearly related to each other as shown in FIG. 22. For example, the luminance can be changed from 0 to 1600 ($cd/m^2$) by varying the voltage Va2 from about 118 V to 188 V.

Figure 23:
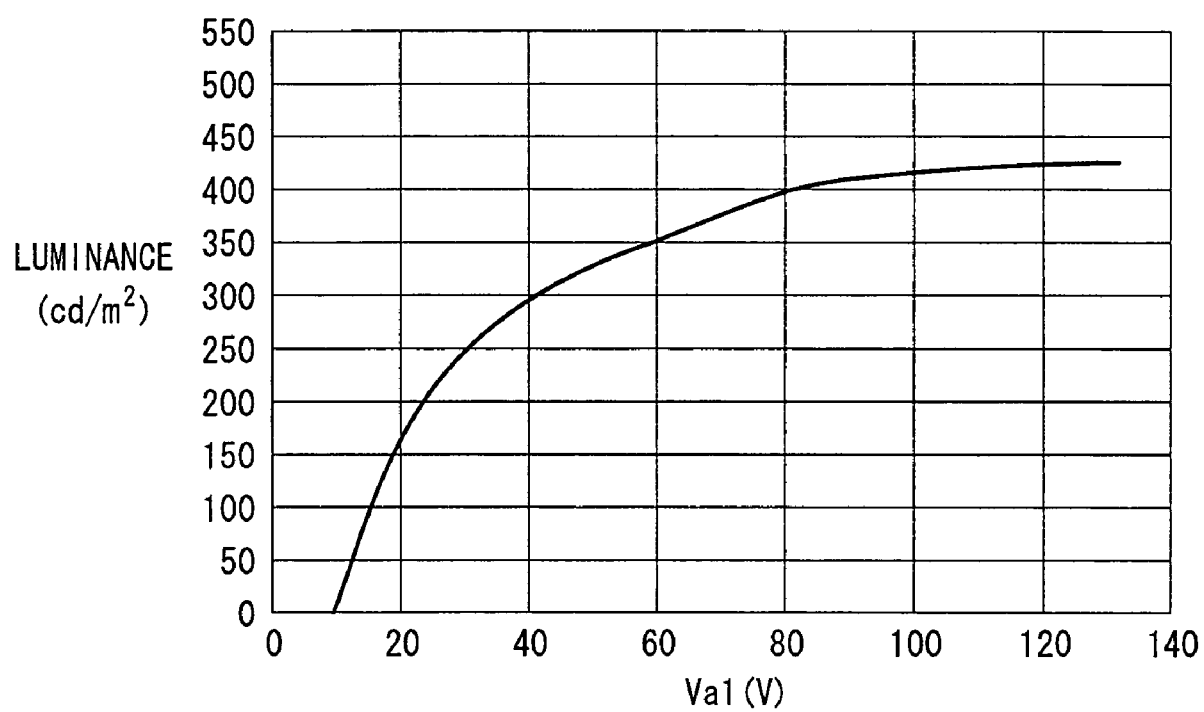
FIG. 23 is a characteristic diagram showing the relationship between the voltage Va1 applied between the upper electrode and the lower electrode and luminance.

The fourth modulation process is a process of controlling the voltage Va1 of the drive voltage Va. Since the voltage Va1 and luminance are nonlinearly related to each other as shown in FIG. 23. Therefore, it is difficult to control the voltage Va1, and some circuit refinement is needed as analog voltage control over the voltage Va1 is necessary.

Of the first through fourth modulation processes, therefore, it is preferable to adopt the first modulation process for modulating the pulse duration of the voltage Va2.

Figure 24:
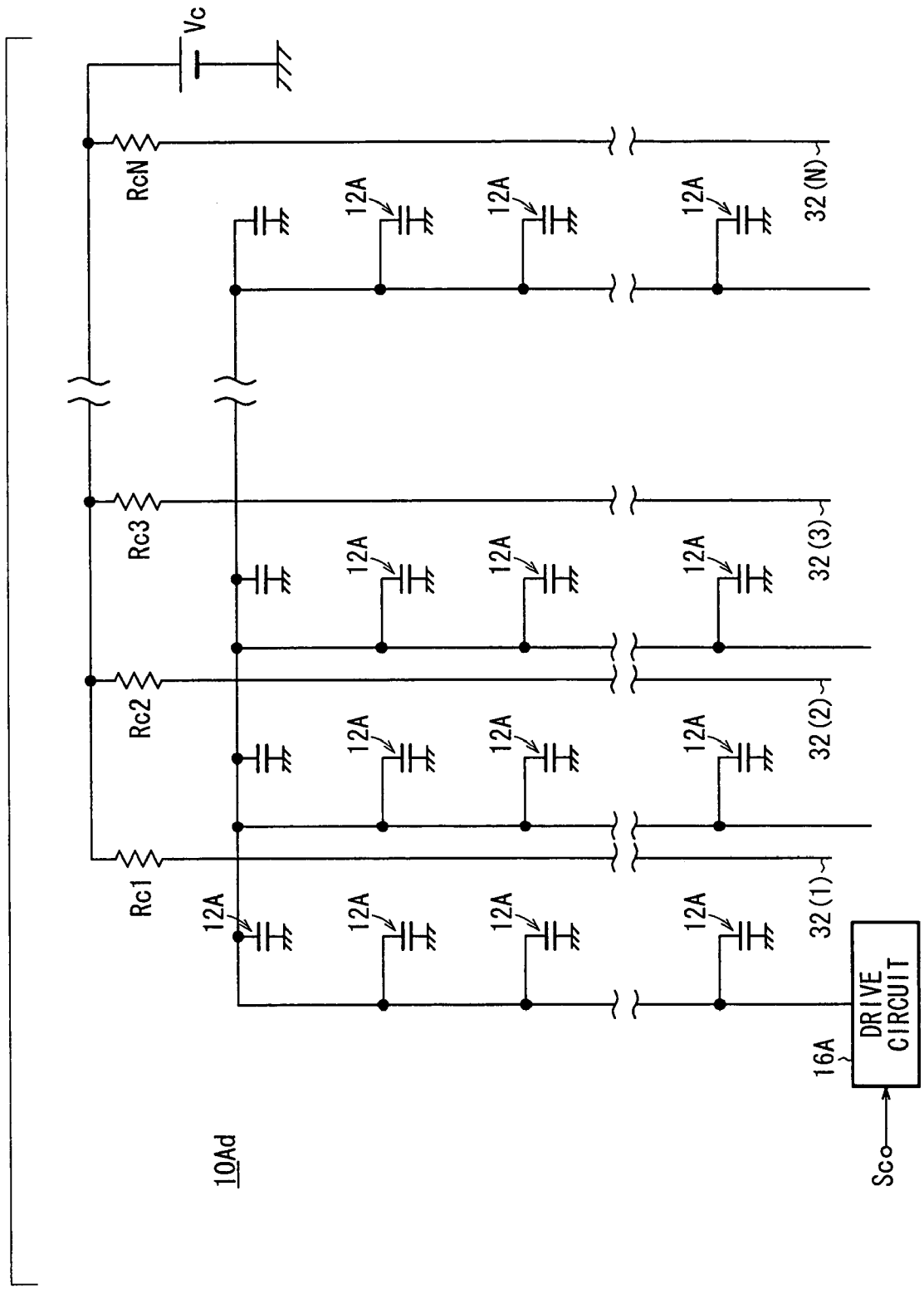
FIG. 24 is a circuit diagram of a fourth modification of the light source according to the first embodiment of the present invention.

As shown in FIG. 1, the light source 10A according to the first embodiment has one collector electrode 32 associated with a plurality of electron emitters 12A, and a bias voltage Vc is applied to the collector electrode 32 through the resistor R2. However, a light source 10Ad according to a fourth modification shown in FIG. 24 has as many collector electrodes 32(1), 32(2), . . . , 32(N) as the number of columns of the light source 10Ad, and resistors Rc1, Rc2, . . . , RcN connected respectively to the collector electrodes 32(1), 32(2), . . . , 32(N). With this arrangement, variations introduced in the manufacturing process, e.g., luminance variations of the electron emitters 12A, may be adjusted by the resistors Rc1, Rc2, . . . , RcN connected respectively to the collector electrodes 32(1), 32(2), . . . , 32(N).

Adjustment of luminance variations will be described below with reference to FIGS. 25 through 28.

According to a conventional process of lowering variations, as described in the document: Kanemaru, Seigou, "Featuring: All About Flat Displays 2000, Leading Technological Trend of FEDs," Electronic Engineering, Nikkan Kogyo Shimbun, Ltd., July 2000, pp. 38–41, for example, current-suppressing resistors are connected to emitters for lowering variations.

The conventional process is based on the relationship between the current flowing through the emitter and the gate voltage, and requires a number of simulations to be performed until optimum resistances for lowering luminance variations are obtained.

According to the present embodiment, there is employed a process of adjusting the electric field between the collector electrode 32 that is actually reached by emitted electrons and the upper electrode 18, for directly adjusting luminance variations to lower the luminance variations quickly with accuracy.

Figure 25:
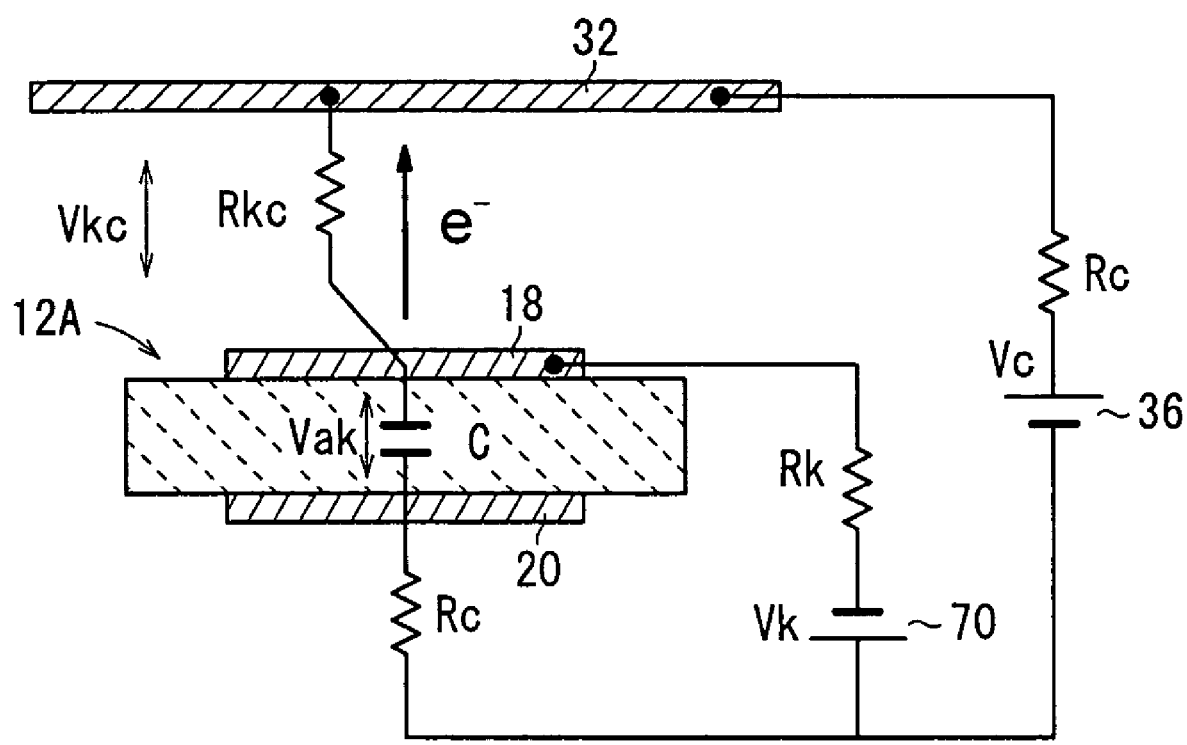
FIG. 25 is a cross-sectional view of an electron emitter of the light source according to the fourth modification.

The process of lowering luminance variations according to the present embodiment will specifically be described below. As shown in FIG. 25, a resistor Rk connected between the upper electrode 18 and a negative power supply 70 which applies a negative voltage Vk (e.g., a voltage which is the same as the voltage Va2 described above) between the upper electrode 18 and the lower electrode 20, and a resistor Rc connected between the collector electrode 32 and a bias power supply 36 (bias voltage Vc) are adjusted. As shown in FIG. 25, Rkc represents a resistor across the gap between the upper electrode 18 and the collector electrode 32, Vkc a voltage across the gap, C a capacitance between the upper electrode 18 and the lower electrode 20, and Vak a voltage between the upper electrode 18 and the lower electrode 20.

Figure 27:
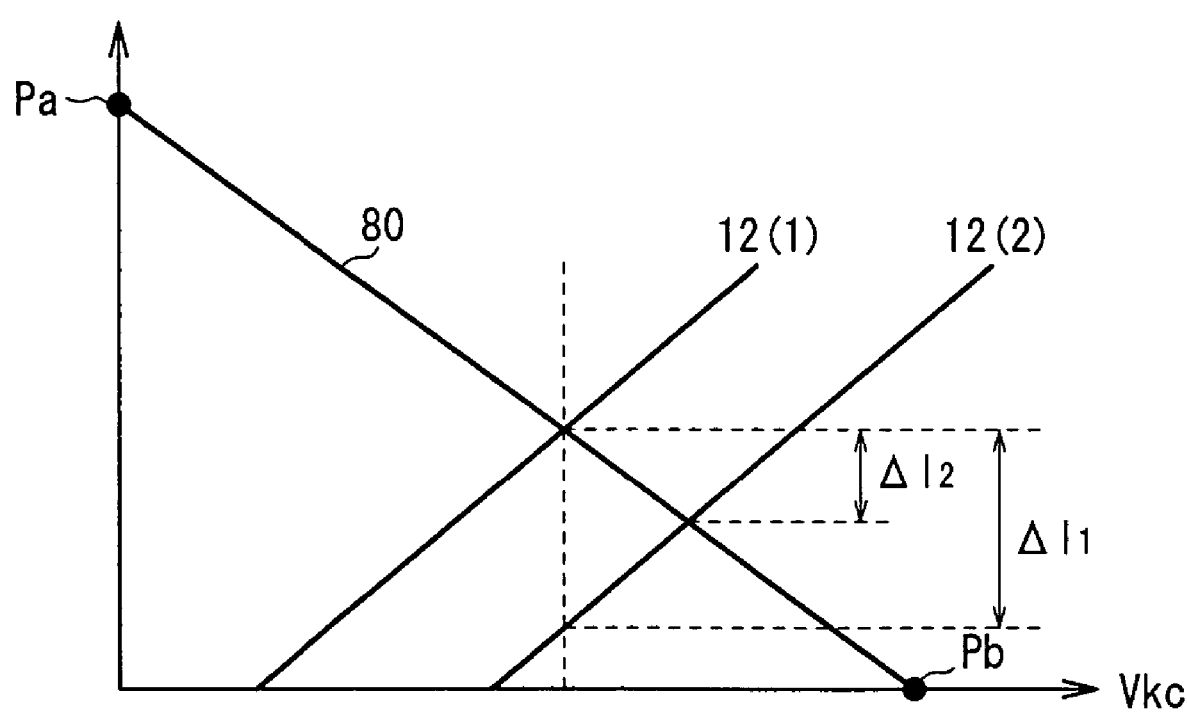
FIG. 27 is a diagram showing the output characteristics (Vkc-Ikc characteristics) of the electron emitter shown in FIG. 25.

It is assumed that there are two electron emitters 12A(1), 12A(2). When these electron emitters 12A(1), 12A(2) have different output characteristics (Vkc vs. Ikc characteristics) as shown in FIG. 27, if it were not for the resistors Rk, Rc, a current change in the electron emitters 12A(1), 12A(2) is represented by $\Delta I_1$.

The current change $\Delta I_1$ can be reduced to a current change $\Delta I_2$ on a load line 80 by connecting the resistors Rk, Rc.

Figure 26:
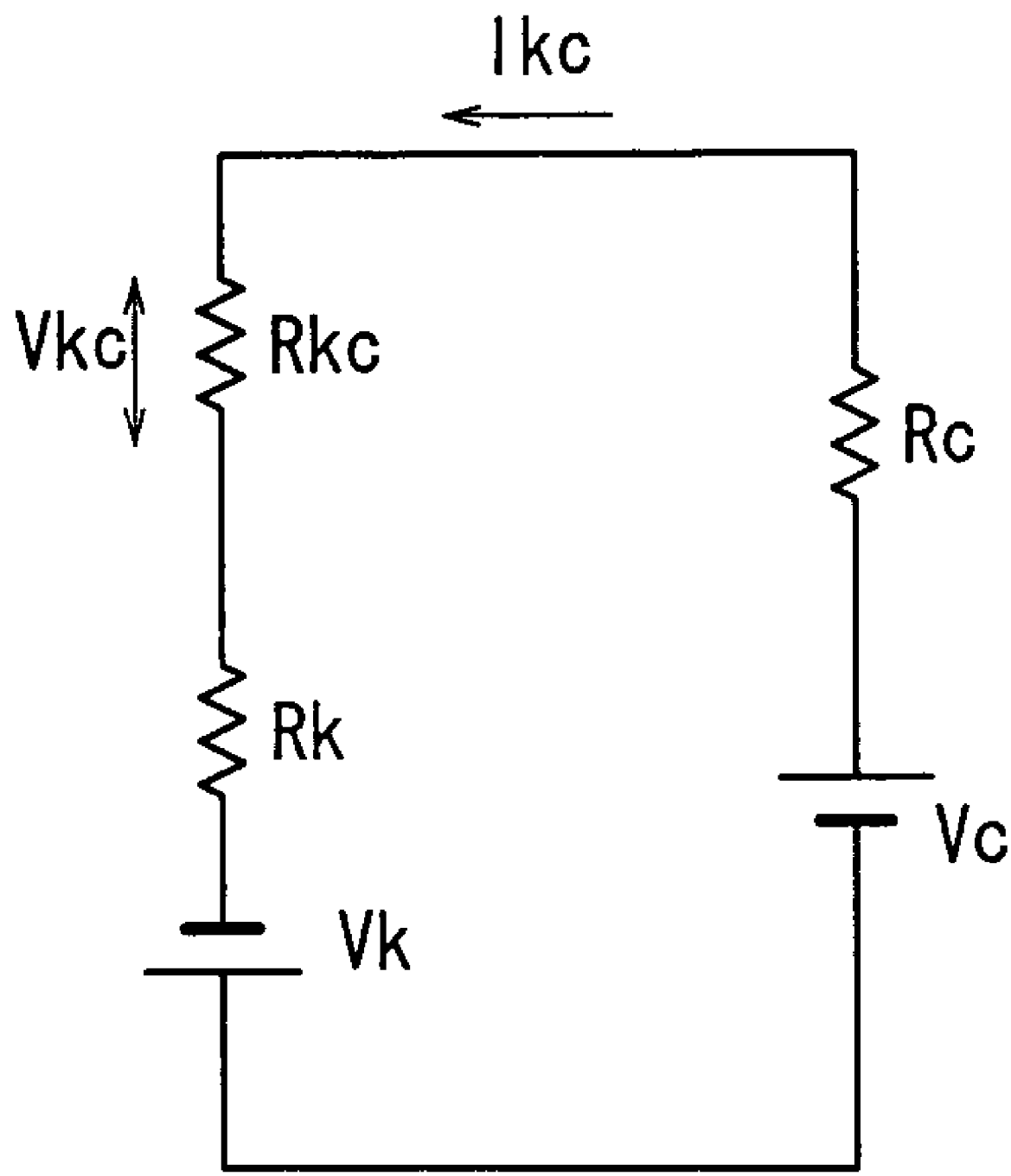
FIG. 26 is a circuit diagram showing an equivalent circuit of the electron emitter shown in FIG. 25, primarily in terms of a current flowing between the upper electrode and the collector electrode.

The load line 80 can be drawn as follows: Based on the structure shown in FIG. 25, an equivalent circuit primarily in terms of a current Ikc flowing between the upper electrode 18 and the lower electrode 20 is plotted as shown in FIG. 26.

From the equivalent circuit, there is derived the following equation:

$$Ikc=(Vk+Vc)/(Rc+Rkc+Rk)$$

Since the current Ikc is maximum when Rkc=0, the load line 80 is drawn as a line interconnecting a point Pa on the vertical axis shown in FIG. 27 which represents Ikc=(Vk+Vc)/(Rc+Rk) and a point Pb on the horizontal axis which represents Vkc=Vk+Vc.

As Rc+Rk is greater, the current Ikc becomes smaller, reducing luminance variations between the electron emitters 12A(1), 12A(2).

Figure 28:
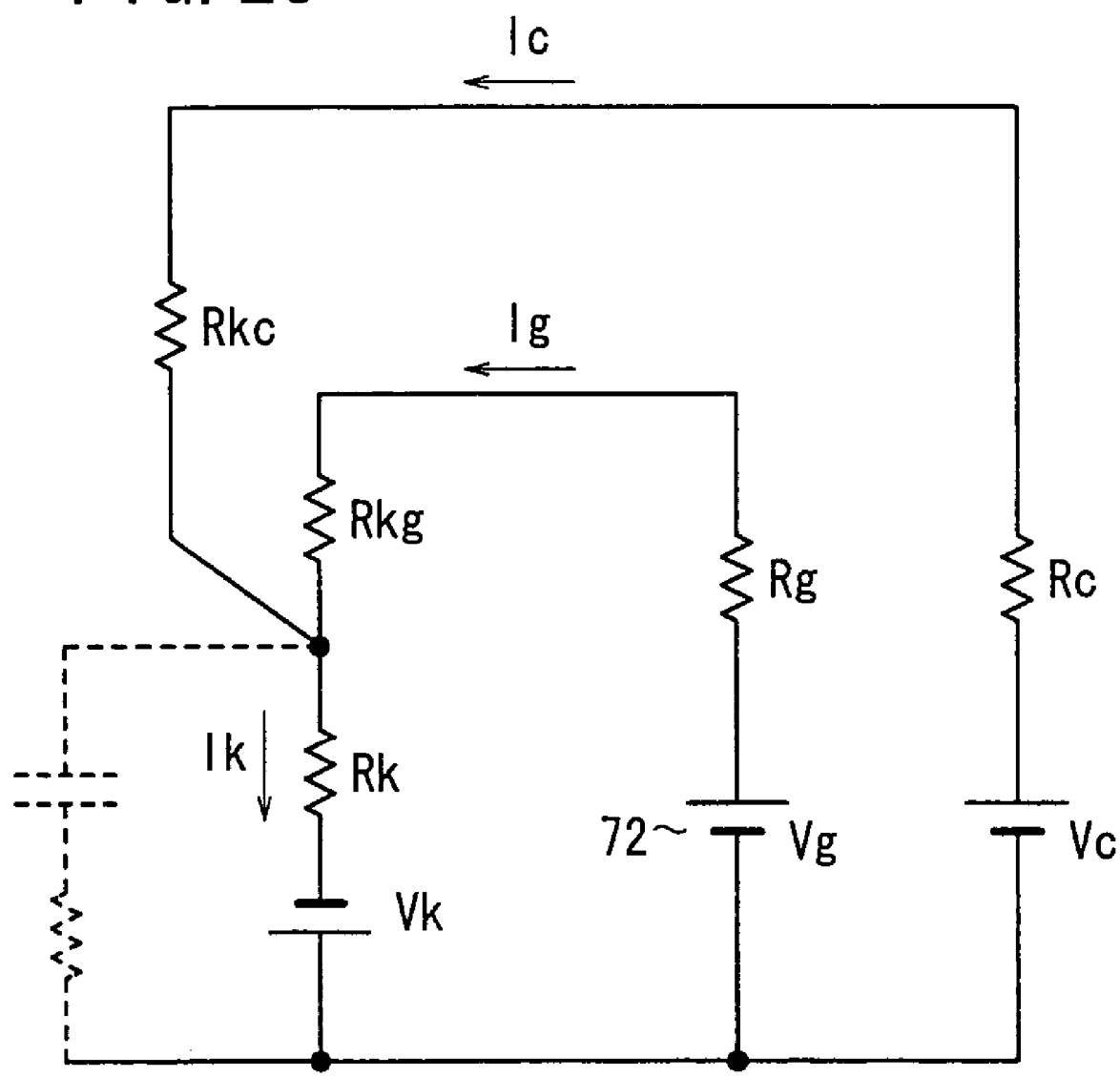
FIG. 28 is a circuit diagram showing an equivalent circuit of an arrangement in which a control electrode is disposed between the upper electrode and the collector electrode, in terms of a collector current flowing through the collector electrode and a control current flowing through the control electrode.

If a control electrode (not shown) is connected between the upper electrode 18 and the collector electrode 32, then an equivalent circuit primarily in terms of a collector current Ic flowing through the collector electrode 32 and a control current Ig flowing through the control electrode is plotted as shown in FIG. 28. A resistor Rg is connected between the control electrode and a negative power supply 72 which applies a negative voltage Vg between the control electrode and the lower electrode 20. In FIG. 28, Rkg represents a resistor across the gap between the upper electrode 18 and the control electrode. The collector current Ic is 60% of a cathode current Ik, and the control current Ig is 40% of the cathode current Ik.

From the equivalent circuit shown in FIG. 28, there is derived the following equation:

$$Ig=(Vg+Vk)/(Rg+Rkg+Rk)$$

Based on the above equation, a load line is drawn, and the voltage Vg and the resistor Rg for minimizing luminance variations are determined. With the voltage Vg and the resistor Rg determined, the control current Ig and the cathode current Ik are determined, and so is the collector current Ic of necessity.

As shown in FIG. 1, the light source 10A according to the first embodiment has a single light emitting section 14A including all the electron emitters 12A, and a single drive circuit 16A connected to the light emitting section 14A. A light source 10Ae according to a fifth modification shown in FIG. 29 has two or more planar light source sections Z1 through Z6. In the fifth modification shown in FIG. 29, the light source 10Ae has six planar light source sections Z1 through Z6. Each of the planar light source sections Z1 through Z6 has a two-dimensional array of electron emitters 12A, and drive circuits 16A are independently connected to the respective planar light source sections Z1 through Z6.

Each of the planar light source sections Z1 through Z6 can be controlled for energization/de-energization. Particularly, if the drive circuits 16A independently connected respectively to the planar light source sections Z1 through Z6 have modulation circuits 60 (see FIG. 18), then the light emission distributions of the planar light source sections Z1 through Z6 can independently be controlled. That is, the light source 10Ae can perform analog light control as well as digital light control for fine light control applications.

Figure 29:
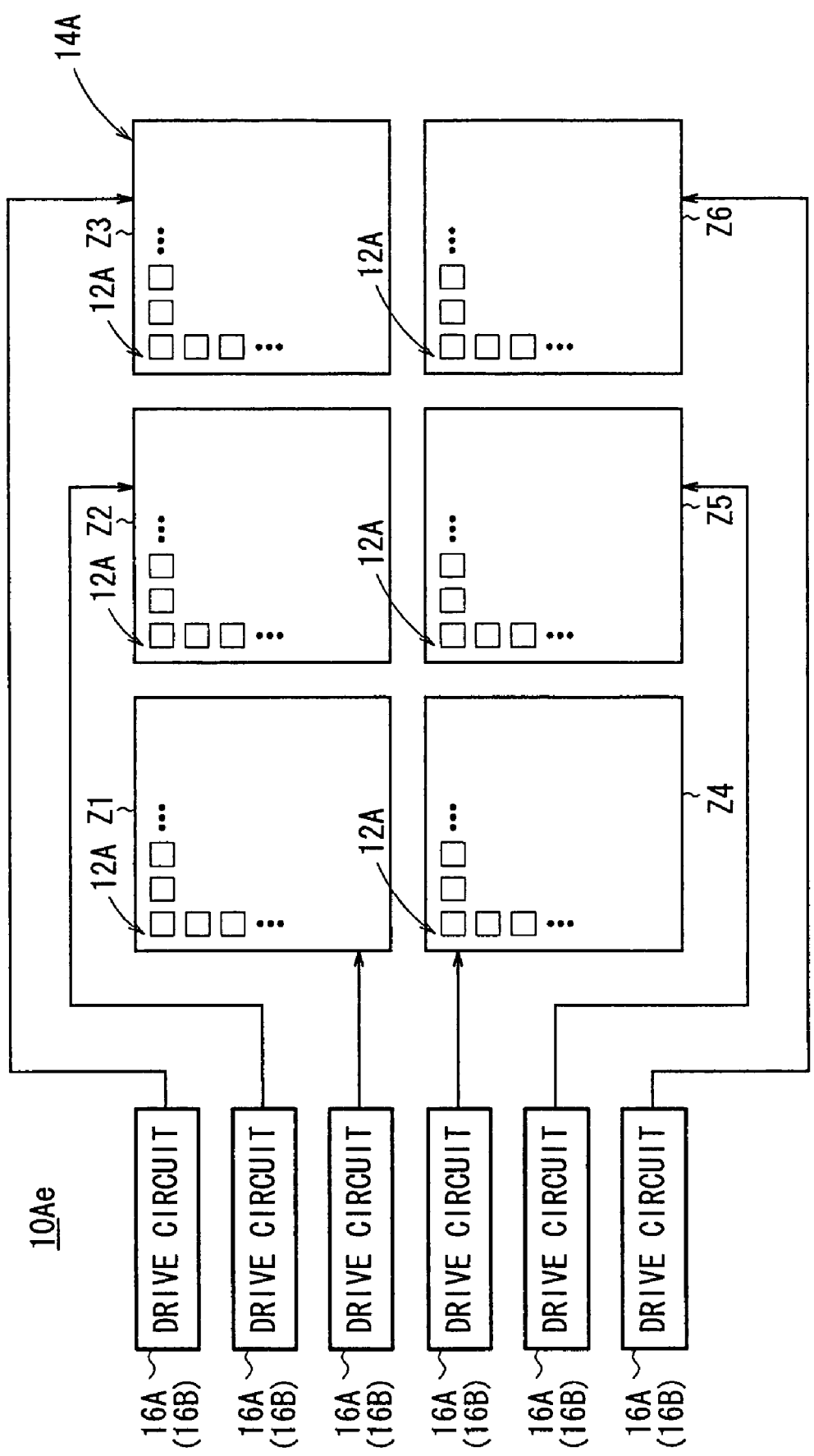
FIG. 29 is a view, partly in block form, of a fifth modification of the light source according to the first embodiment.
Figure 30:
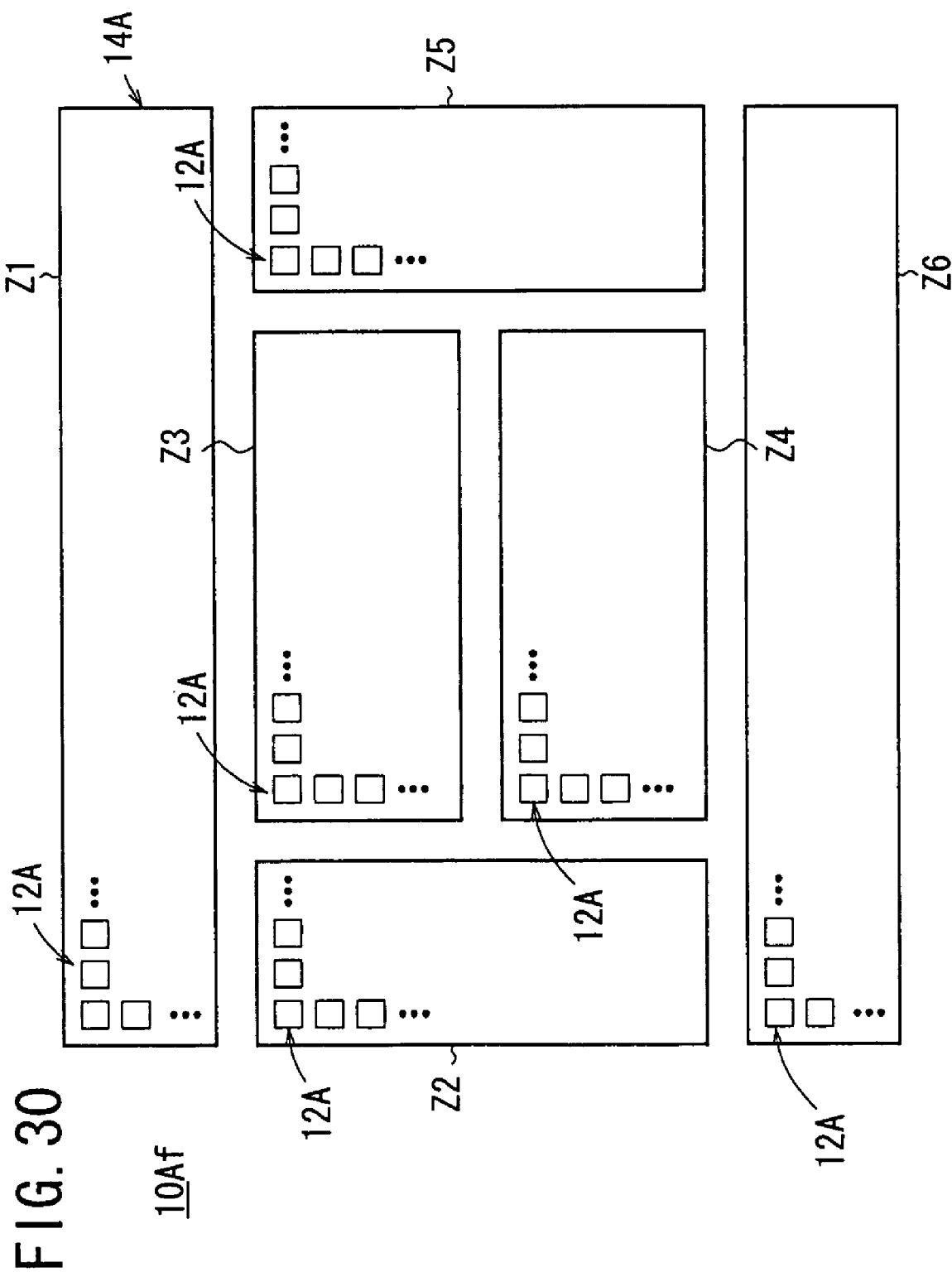
FIG. 30 is a view of a sixth modification of the light source according to the first embodiment.

In the modification shown in FIG. 29, the planar light source sections Z1 through Z6 have equal areas. However, the planar light source sections Z1 through Z6 may have different areas. For example, FIG. 30 shows a light source 10Af according to a sixth modification which includes first and sixth planar light source sections Z1, Z6 which are of a horizontally long rectangular shape with long sides, second and fifth planar light source sections Z2, Z5 which are of a vertically long rectangular shape with long sides shorter than the long sides of the first and sixth planar light source sections Z1, Z6, and third and fourth planar light source sections Z3, Z4 which are of a horizontally long rectangular shape with long sides shorter than the long sides of the first and sixth planar light source sections Z1, Z6.

Figure 31:
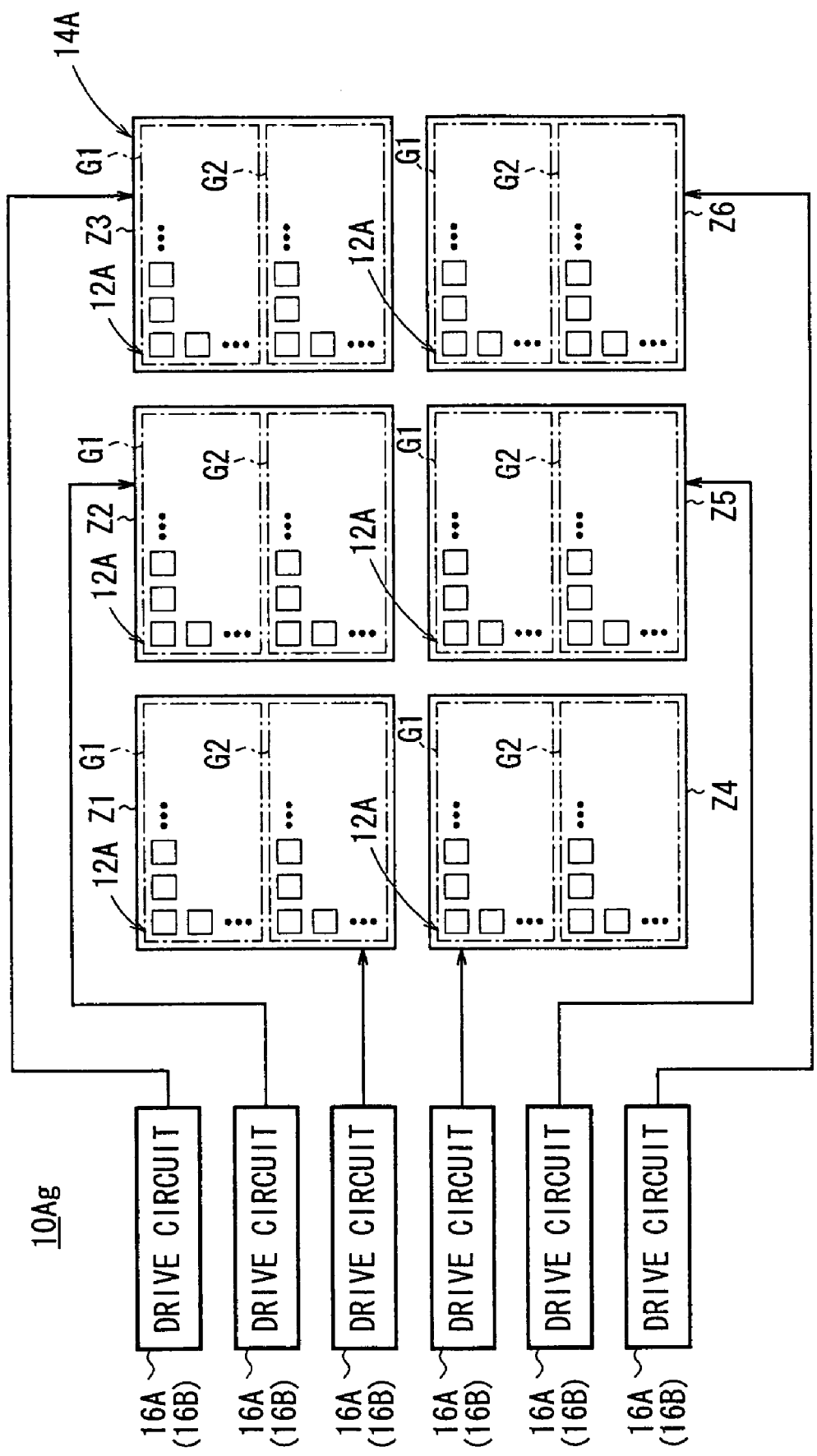
FIG. 31 is a view, partly in block form, of a seventh modification of the light source according to the first embodiment.

FIG. 31 shows a light source 10Ag according to a seventh modification. The light source 10Ag has first through sixth light source sections Z1 through Z6. The electron emitters 12A in each of the first through sixth light source sections Z1 through Z6 are divided into two groups (first and second groups G1, G2). In each of the first through sixth light source sections Z1 through Z6, when the electron emitters 12A in the group G1 emit light, the electron emitters 12A in the group G2 retrieve electric power of the electron emitters 12A in the group G1, and when the electron emitters 12A in the group G2 emit light, the electron emitters 12A in the group G1 retrieve electric power of the electron emitters 12A in the group G2.

Figure 32:
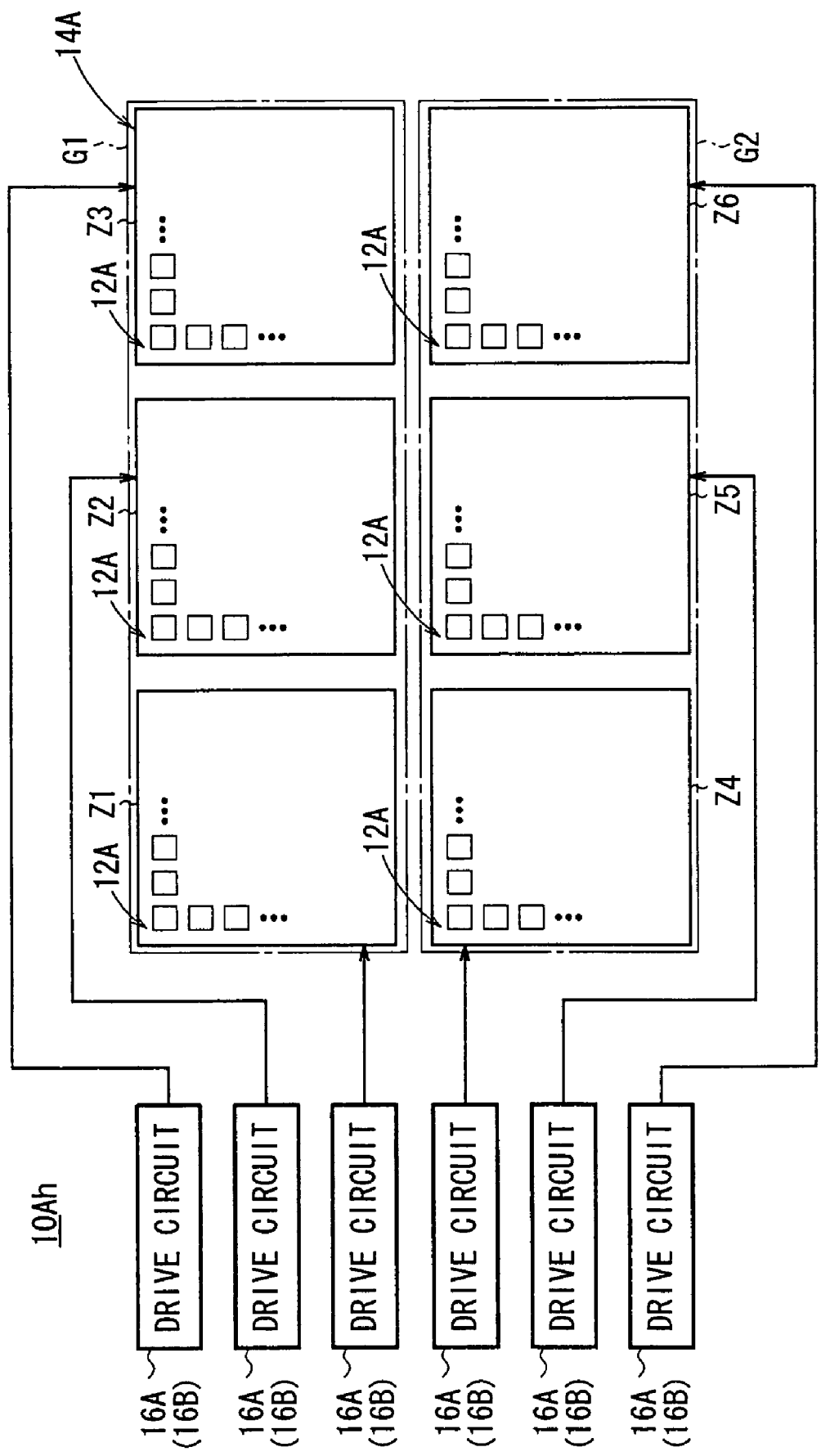
FIG. 32 is a view, partly in block form, of an eighth modification of the light source according to the first embodiment.

FIG. 32 shows a light source 10Ah according to an eighth modification. The light source 10Ah has first through sixth light source sections Z1 through Z6. The first through sixth light source sections Z1 through Z6 are divided into two groups (first and second groups G1, G2). When the electron emitters 12A in the planar light source sections Z1 through Z3 in the group G1 emit light, the electron emitters 12A in the planar light source sections Z4 through Z6 in the group G2 retrieve electric power of the electron emitters 12A in the group G1, and when the electron emitters 12A in the planar light source sections Z4 through Z6 in the group G2 emit light, the electron emitters 12A in the planar light source sections Z1 through Z3 in the group G1 retrieve electric power of the electron emitters 12A in the group G2.

With the light sources 10Ae through 10Ah according to the fifth through eighth modifications, the light emitting section 14A is divided into the six planar light source sections Z1 through Z6. However, the number of planar light source sections is optional.

As shown in FIG. 1, the light source 10A according to the first embodiment has a plurality of independent upper electrodes 18 disposed on the face side of one emitter 22, and a plurality of lower electrodes 20 disposed independently on the reverse side of the emitter 22, thus providing a plurality of electron emitters 12A. Other embodiments will be described below with reference to FIGS. 33 trough 37. In FIGS. 33 through 37, the collector electrode 32 and the phosphors 34 are omitted from illustration.

Figure 33:
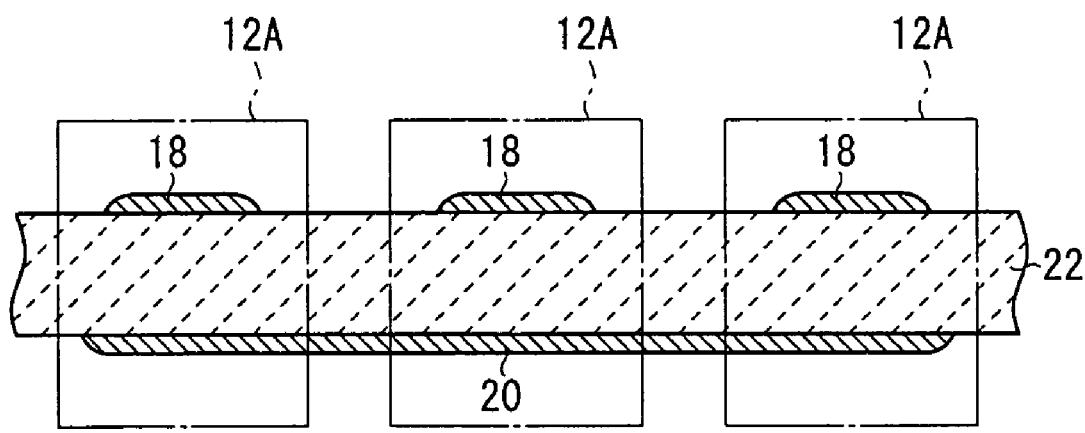
FIG. 33 is a fragmentary cross-sectional view of a ninth modification of the light source according to the first embodiment.

FIG. 33 shows a light source 10A according to a ninth modification. The light source 10A has a plurality of independent upper electrodes 18 disposed on the face side of one emitter 22, and a single lower electrode 20 (common lower electrode) disposed on the reverse side of the emitter 22, thus providing a plurality of electron emitters 12A.

Figure 34:
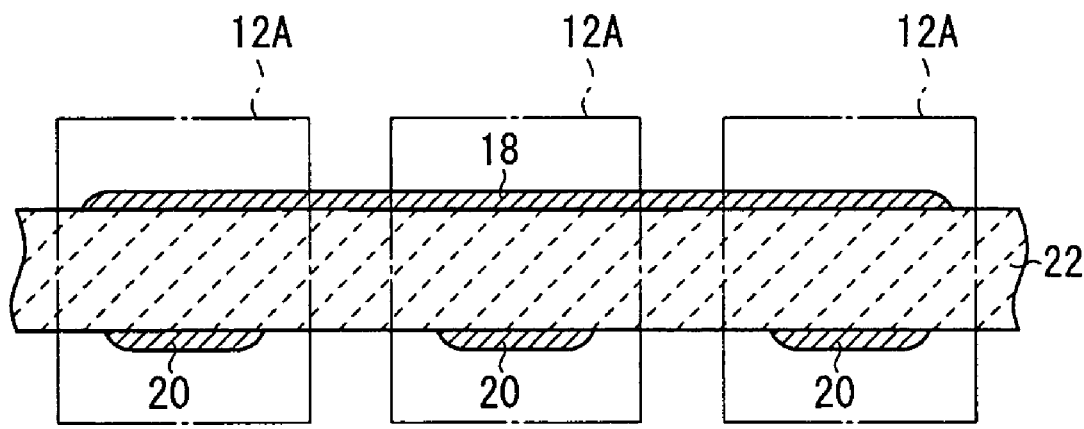
FIG. 34 is a fragmentary cross-sectional view of a tenth modification of the light source according to the first embodiment.

FIG. 34 shows a light source 10Aj according to a tenth modification. The light source 10Aj has a single very thin upper electrode 18 (common upper electrode) having a thickness up to 10 nm, disposed on the face side of one emitter 22, and a plurality of independent lower electrodes 20 disposed on the reverse side of the emitter 22, thus providing a plurality of electron emitters 12A.

Figure 35:
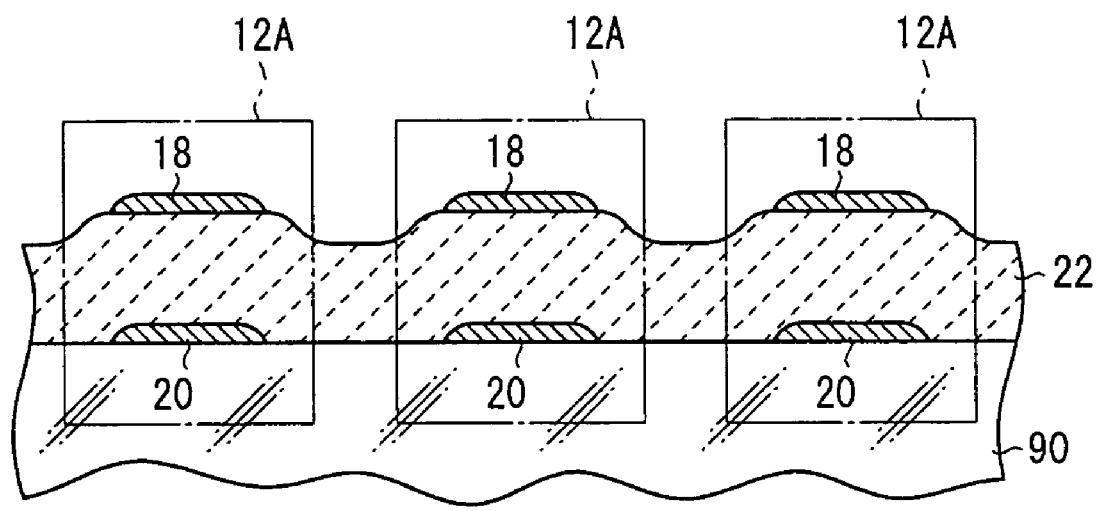
FIG. 35 is a fragmentary cross-sectional view of an eleventh modification of the light source according to the first embodiment.

FIG. 35 shows a light source 10Ak according to an eleventh modification. The light source 10Ak has a plurality of lower electrodes 20 disposed independently on a substrate 90, a single emitter 22 disposed in covering relation to the lower electrodes 20, and a plurality of independent upper electrodes 18 disposed on the emitter 22, thus providing a plurality of electron emitters 12A. The upper electrodes 18 are positioned above the corresponding lower electrodes 20 with the emitter 22 sandwiched therebetween.

Figure 36:
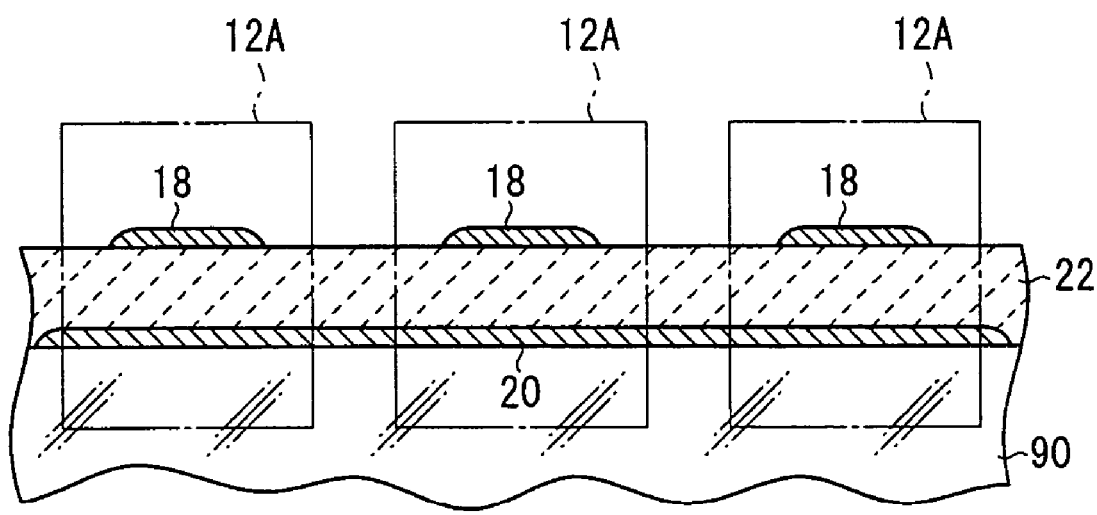
FIG. 36 is a fragmentary cross-sectional view of a twelfth modification of the light source according to the first embodiment.

FIG. 36 shows a light source 10Al according to a twelfth modification. The light source 10Al has a single lower electrode 20 disposed on a substrate 90, a single emitter 22 disposed in covering relation to the lower electrode 20, and a plurality of independent upper electrodes 18 disposed on the emitter 22, thus providing a plurality of electron emitters 12A.

Figure 37:
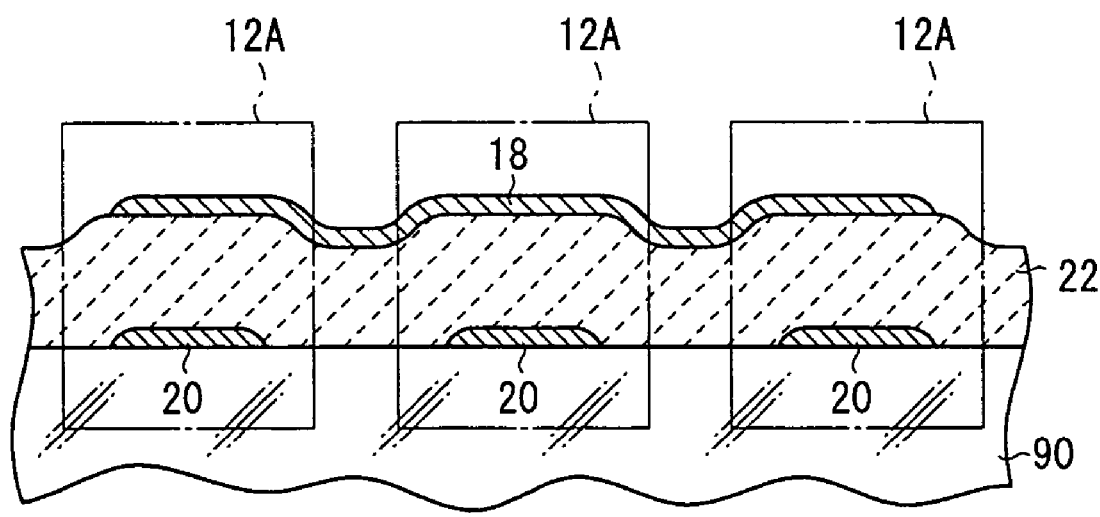
FIG. 37 is a fragmentary cross-sectional view of a thirteenth modification of the light source according to the first embodiment.

FIG. 37 shows a light source 10Am according to a thirteenth modification. The light source 10Am has a plurality of lower electrodes 20 disposed independently on a substrate 90, a single emitter 22 disposed in covering relation to the lower electrodes 20, and a single very thin upper electrode 18 disposed on the emitter 22, thus providing a plurality of electron emitters 12A.

A light source 10B according to a second embodiment of the present invention will be described below with reference to FIGS. 38 through 77. Those parts of the light source 10B according to the second embodiment which are identical or correspond to those of the light source 10A according to the first embodiment are denoted by identical or corresponding reference characters, and will not be described in detail below.

Figure 38:
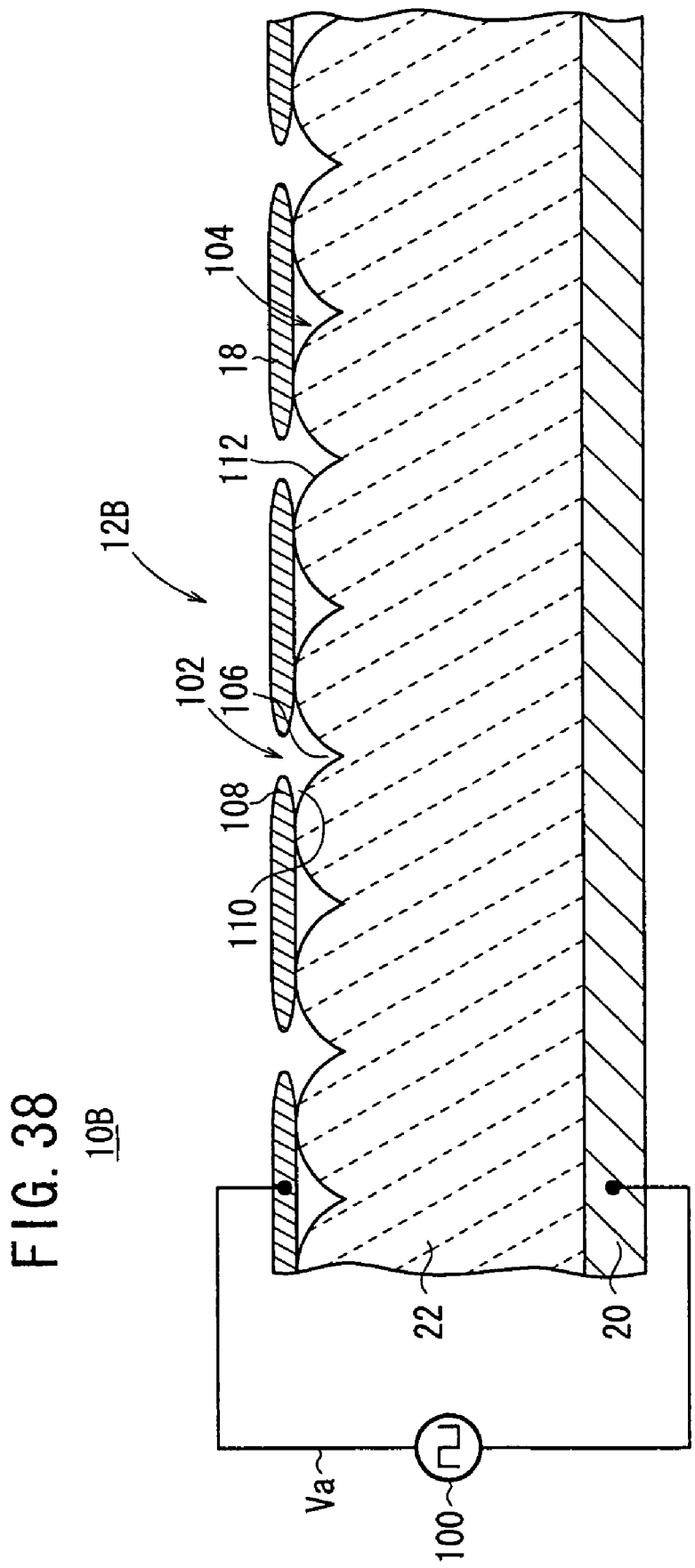
FIG. 38 is a fragmentary cross-sectional view of electron emitters used in a light source according to a second embodiment of the present invention.

As shown in FIG. 38, each of electron emitters 12B of the light source 10B according to the second embodiment comprises an emitter 22, an upper electrode 18, a lower electrode 20, and a pulse generating source 100 for applying a drive voltage Va between the upper electrode 18 and the lower electrode 20.

The upper electrode 18 has a plurality of through regions 102 where the emitter 22 is exposed. The emitter 22 has surface irregularities 104 due to the grain boundary of a dielectric material that the emitter 22 is made of. The through regions 102 of the upper electrode 18 are formed in areas corresponding to concavities 106 due to the grain boundary of the dielectric material. In the embodiment shown in FIG. 38, one through region 102 is formed in association with one concavity 106. However, one through region 102 may be formed in association with a plurality of concavities 106. The particle diameter of the dielectric material of the emitter 22 should preferably be in the range from 0.1 μm to 10 μm, and more preferably be in the range from 2 μm to 7 μm. In the embodiment shown in FIG. 38, the particle diameter of the dielectric material is of 3 μm.

In this embodiment, as shown in FIG. 39, each of the through regions 102 of the upper electrode 18 has a peripheral portion 108 having a surface 108a facing the emitter 22, the surface 108a being spaced from the emitter 22. Specifically, a gap 110 is formed between the surface 108a, facing the emitter 22, of the peripheral portion 108 of the through region 102 and the emitter 22, and the peripheral portion 108 of the through region 102 of the upper electrode 18 is formed as an overhanging portion (flange). In the description which follows, "the peripheral portion 108 of the through region 102 of the upper electrode 18" is referred to as "the overhanging portion 108 of the upper electrode 18". In FIGS. 38, 39, 41A, 41B, 42A, 42B, 44, 46 through 49, and 54, convexities 112 of the surface irregularities 104 of the grain boundary of the dielectric material are shown as having a semicircular cross-sectional shape. However, the convexities 112 are not limited to the semicircular cross-sectional shape.

With the electron emitter 12B, the upper electrode 18 has a thickness t in the range of 0.01 μm≦t≦10 μm, and the maximum angle θ between the upper surface of the emitter 22, i.e., the surface of the convexity 112 (which is also the inner wall surface of the concavity 106) of the grain boundary of the dielectric material, and the lower surface 108a of the overhanging portion 108 of the upper electrode 18 is in the range of 1°≦θ≦60°. The maximum distance d in the vertical direction between the surface of the convexity 112 (the inner wall surface of the concavity 106) of the grain boundary of the dielectric material and the lower surface 108a of the overhanging portion 108 of the upper electrode 18 is in the range of 0 μm<d≦10 μm.

In the electron emitter 12B, the shape of the through region 102, particularly the shape as seen from above, as shown in FIG. 40, is the shape of a hole 114, which may be a circular shape, an elliptical shape, a track shape, a shape including a curve, or a polygonal shape such as a quadrangular shape or a triangular shape. In FIG. 40, the shape of the hole 114 is a circular shape.

The hole 114 has an average diameter ranging from 0.1 μm to 10 μm. The average diameter represents the average of the lengths of a plurality of different line segments passing through the center of the hole 114.

The materials of the emitter 22 are the same as those according to the first embodiment, and will not be described below.

The emitter 22 may be made by any of various thick-film forming processes including screen printing, dipping, coating, electrophoresis, aerosol deposition, etc., or any of various thin-film forming processes including an ion beam process, sputtering, vacuum evaporation, ion plating, chemical vapor deposition (CVD), plating, etc. Particularly, it is preferable to form a powdery piezoelectric/electrostrictive material as the emitter 22 and impregnate the emitter 22 thus formed with glass of a low melting point or sol particles. According to this process, it is possible to form a film at a low temperature of 700° C. or lower or 600° C. or lower.

The upper electrode 18 is made of an organic metal paste which can produce a thin film after being baked. For example, a platinum resinate paste or the like, should preferably be used. An oxide electrode for suppressing a polarization inversion fatigue, which is made of ruthenium oxide ($RuO_2$), iridium oxide ($IrO_2$), strontium ruthenate ($SrRuO_3$), $La_{1-x}Sr_xCoO_3$ (e.g., x=0.3 or 0.5), $La_{1-x}Ca_xMnO_3$, (e.g., x=0.2), $La_{1-x}Ca_xMn_{1-y}CO_yO_3$ (e.g., x=0.2, y=0.05), or a mixture of any one of these compounds and a platinum resinate paste, for example, is preferable.

Figure 41A:
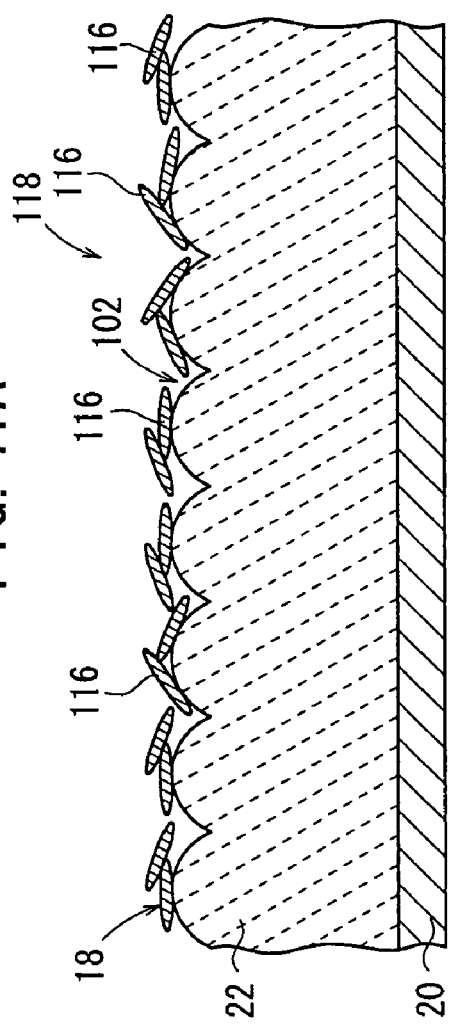
FIG. 41A is a cross-sectional view of another example of the upper electrode.
Figure 41B:
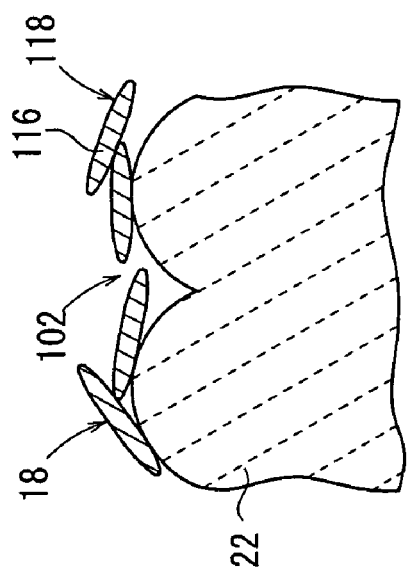
FIG. 41B is an enlarged fragmentary cross-sectional view of the upper electrode.

As shown in FIGS. 41A and 41B, the upper electrode 18 may preferably be in the form of a cluster 118 of a plurality of scale-like members 116 (e.g., of graphite). Alternatively, as shown in FIGS. 42A and 42B, the upper electrode 18 may preferably be in the form of a cluster 122 of electrically conductive members 120 including scale-like members 116. The cluster 118 or 122 does not fully cover the surface of the emitter 22, but a plurality of through regions 102 are provided through which the emitter 22 is partly exposed, and those portions of the emitter 22 which face the through regions 102 serve as electron emission regions.

The upper electrode 18 may be made of any of the above materials by any of thick-film forming processes including screen printing, spray coating, coating, dipping, electrophoresis, etc., or any of various thin-film forming processes including sputtering, an ion beam process, vacuum evaporation, ion plating, chemical vapor deposition (CVD), plating, etc. Preferably, the upper electrode 18 is made by any of the above thick-film forming processes.

The lower electrode 20 is made of an electrically conductive material, e.g., a metal such as platinum, molybdenum, tungsten, or the like. Alternatively, the lower electrode 20 is made of an electric conductor which is resistant to a high-temperature oxidizing atmosphere, e.g., a metal, an alloy, a mixture of insulative ceramics and a metal, a mixture of insulative ceramics and an alloy, or the like. Preferably, the lower electrode 20 should be made of a precious metal having a high melting point such as platinum, iridium, palladium, rhodium, molybdenum, or the like, or a material chiefly composed of an alloy of silver and palladium, silver and platinum, platinum and palladium, or the like, or a cermet of platinum and ceramics. Further preferably, the lower electrode 20 should be made of platinum only or a material chiefly composed of a platinum-base alloy.

The lower electrode 20 may be made of carbon or a graphite-base material. Ceramics to be added to the electrode material should preferably have a proportion ranging from 5 to 30 volume %. The lower electrode 20 may be made of the same material as the upper electrode 18, as described above.

The lower electrode 20 should preferably be formed by any of various thick-film forming processes. The lower electrode 20 has a thickness of 20 μm or less or preferably a thickness of 5 μm or less.

Each time the emitter 22, the upper electrode 18, or the lower electrode 20 is formed, the assembly is heated (sintered) into an integral structure.

The sintering process for integrally combining the emitter 22, the upper electrode 18, and the lower electrode 20 may be carried out at a temperature ranging from 500° to 1400° C., preferably from 1000° to 1400° C. For heating the emitter 22 which is in the form of a film, the emitter 22 should be sintered together with its evaporation source while their atmosphere is being controlled, so that the composition of the emitter 22 will not become unstable at high temperatures.

By performing the sintering process, the film which will serve as the upper electrode 18 is shrunk from the thickness of 10 μm to the thickness of 0.1 μm, and simultaneously a plurality of holes are formed therein. As a result, as shown in FIG. 38, a plurality of through regions 102 are formed in the upper electrode 18, and the peripheral portions 108 of the through regions 102 are turned into overhanging portions. In advance (of the sintering process), the film which will serve as the upper electrode 18 may be patterned by etching (wet etching or dry etching) or lift-off, and then may be sintered. In this case, recesses or slits may easily be formed as the through regions 102.

The emitter 22 may be covered with a suitable member, and then sintered such that the surface of the emitter 22 will not be exposed directly to the sintering atmosphere.

The principles of electron emission of the electron emitter 12B will be described below. First, a drive voltage Va is applied between the upper electrode 18 and the lower electrode 20. The drive voltage Va is defined as a voltage, such as a pulse voltage or an alternating-current voltage, which abruptly changes with time from a voltage level that is higher or lower than a reference voltage (e.g., 0 V) to a voltage level that is lower or higher than the reference voltage.

A triple junction is formed in a region of contact between the upper surface of the emitter 22, the upper electrode 18, and a medium (e.g., a vacuum) around the electron emitter 12B. The triple junction is defined as an electric field concentration region formed by a contact between the upper electrode 18, the emitter 22, and the vacuum. The triple junction includes a triple point where the upper electrode 18, the emitter 22, and the vacuum exist as one point. The vacuum level in the atmosphere should preferably in the range from $10^2$ to $10^{-6}$ Pa and more preferably in the range from $10^{-3}$ to $10^{-5}$ Pa.

According to the second embodiment, the triple junction is formed on the overhanging portion 108 of the upper electrode 18 and the peripheral area of the upper electrode 18. Therefore, when the above drive voltage Va is applied between the upper electrode 18 and the lower electrode 20, an electric field concentration occurs at the triple junction.

Figure 43:
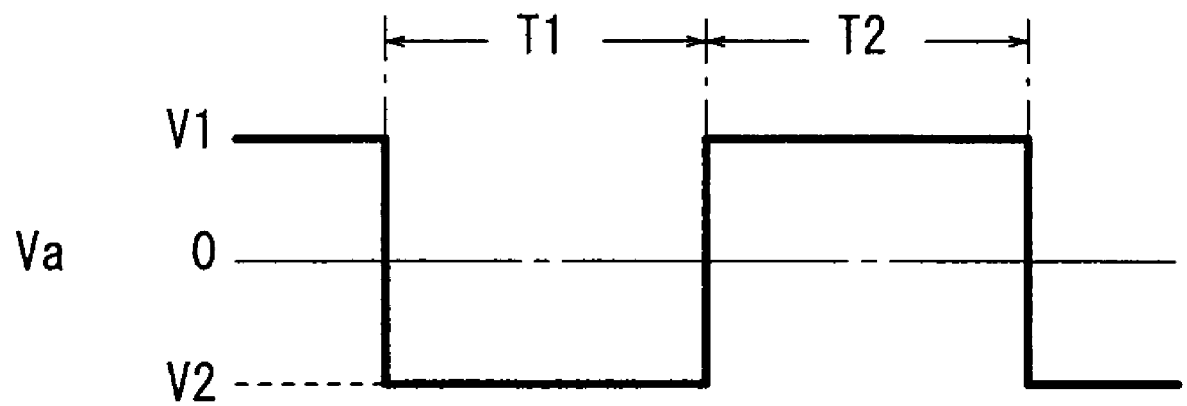
FIG. 43 is a diagram showing the voltage waveform of a drive voltage in a first electron emission process.
Figure 44:
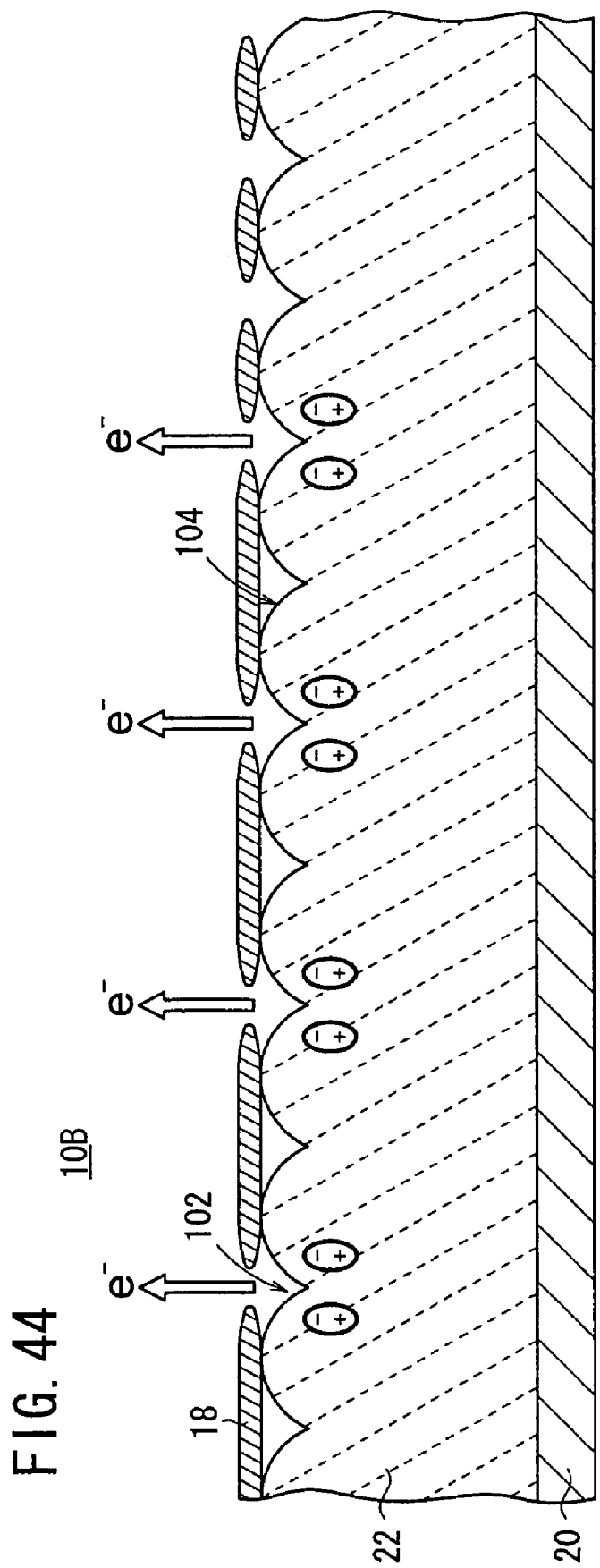
FIG. 44 is a view illustrative of the emission of electrons in a second output period of the first electron emission process.

A first electron emission process for the electron emitter 12B will be described below with reference to FIGS. 43 and 44. In a first output period T1 (first stage) shown in FIG. 43, a voltage V2 lower than a reference voltage (e.g., 0 V) is applied to the upper electrode 18, and a voltage V1 higher than the reference voltage is applied to the lower electrode 20. In the first output period T1, an electric field concentration occurs at the triple junction referred to above, causing the upper electrode 18 to emit primary electrons toward the emitter 22. The emitted electrons are accumulated in the portions of the emitter 22 which are exposed through the through region 102 of the upper electrode 18 and regions near the outer peripheral portion of the upper electrode 18, thus charging the emitter 22. At this time, the upper electrode 18 functions as an electron supply source.

In a next output period T2 (second stage), the voltage level of the drive voltage Va abruptly changes, i.e., the voltage V1 higher than the reference voltage is applied to the upper electrode 18, and the voltage V2 lower than the reference voltage to the lower electrode 20. The electrons that have been accumulated in the portions of the emitter 22 which are exposed through the through region 102 of the upper electrode 18 and the regions near the outer peripheral portion of the upper electrode 18 are expelled from the emitter 22 by dipoles (whose negative poles appear on the surface of the emitter 22) in the emitter 22 whose polarization has been inverted in the opposite direction. The electrons are emitted from the portions of the emitter 22 where the electrons have been accumulated, through the through regions 102. The electrons are also emitted from the regions near the outer peripheral portion of the upper electrode 18.

Figure 45:
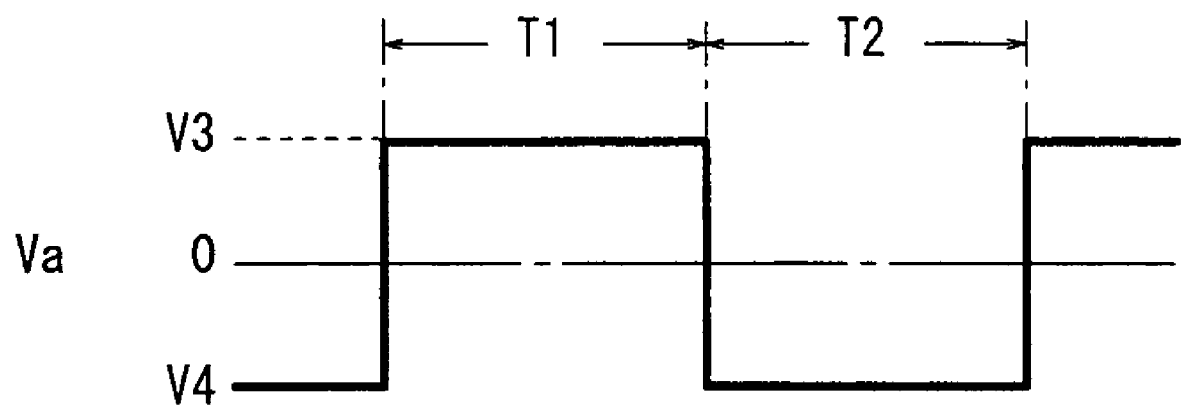
FIG. 45 is a diagram showing the voltage waveform of a drive voltage in a second electron emission process.
Figure 46:
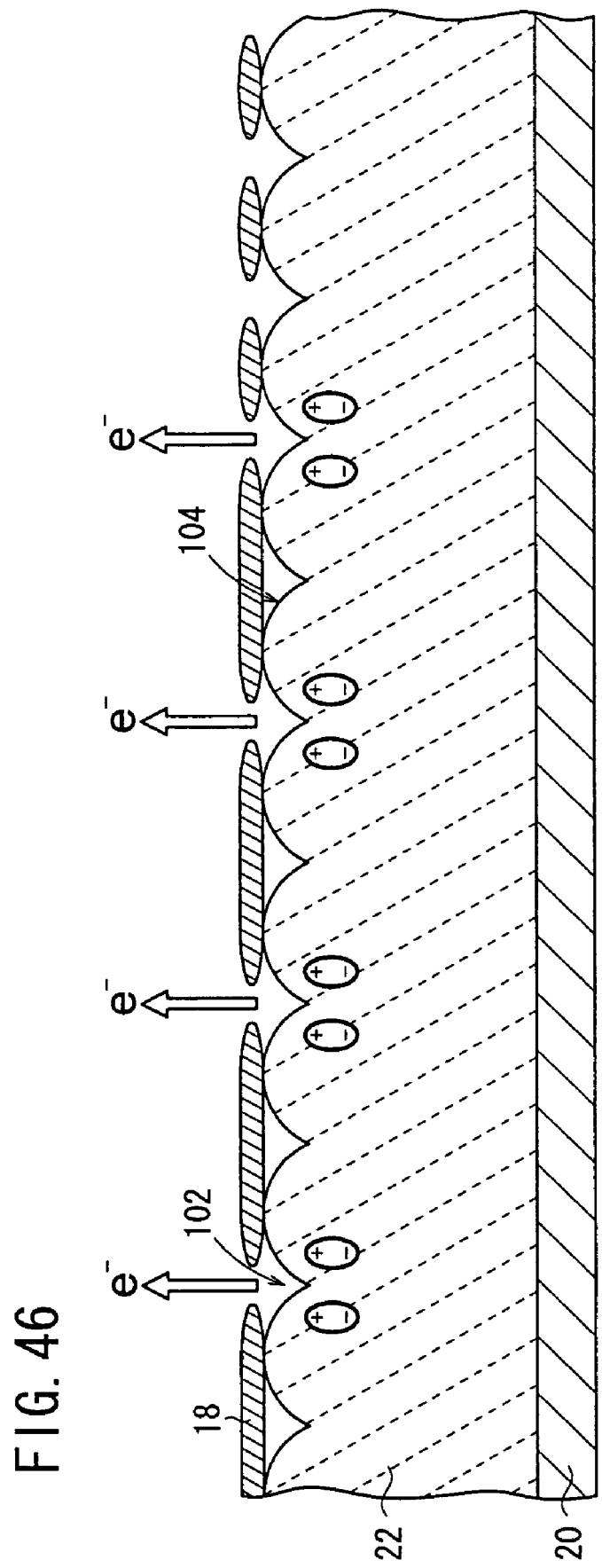
FIG. 46 is a view illustrative of the emission of electrons in a second output period of the second electron emission process.

A second electron emission process will be described below with reference to FIGS. 45 and 46. In a first output period T1 (first stage) shown in FIG. 45, a voltage V3 higher than the reference voltage is applied to the upper electrode 18, and a voltage V4 lower than the reference voltage is applied to the lower electrode 20. In the first output period T1, the electron emitter 12B is prepared for electron emission. In a next output period T2 (second stage), the voltage level of the drive voltage Va abruptly changes, i.e., the voltage V4 lower than the reference voltage is applied to the upper electrode 18, and the voltage V3 higher than the reference voltage to the lower electrode 20. An electric field concentration occurs at the triple junction referred to above, causing the upper electrode 18 to emit primary electrons, which impinge upon the portions of the emitter 22 which are exposed through the through region 102 and regions near the outer peripheral portion of the upper electrode 18. As shown in FIG. 46, secondary electrons (including reflected primary electrons) are emitted from the portions hit by the primary electrons. Thus, secondary electrons are emitted from the through region 102 and the regions near the outer peripheral portion of the upper electrode 18 in an initial state of the drive period T2.

The electron emitter 12B offers the following advantages: Since the upper electrode 18 has the plural through regions 102, electrons are uniformly emitted from each of the through regions 102 and the outer peripheral portions of the upper electrode 18. Thus, any variations in the overall electron emission characteristics of the electron emitter 12B are reduced, making it possible to facilitate the control of the electron emission and increase the electron emission efficiency.

Because the gap 110 is formed between the overhanging portion 108 of the upper electrode 18 and the emitter 22, when the drive voltage Va is applied, an electric field concentration tends to be produced in the region of the gap 110. This leads to a higher efficiency of the electron emission, making the drive voltage lower (emitting electrons at a lower voltage level).

As described above, according to the second embodiment, since the upper electrode 18 has the overhanging portion 108 on the peripheral portion of the through region 102, together with the increased electric field concentration in the region of the gap 110, electrons are easily emitted from the overhanging portion 108 of the upper electrode 18. This leads to a larger output and higher efficiency of the electron emission, making the drive voltage Va lower. The light source 10B according to the second embodiment, which has a number of arrayed electron emitters 12B, has a higher level of luminance.

According to either the first electron emission process (which emits electrons accumulated in the emitter 22) or the second electron emission process (which emits secondary electrons by forcing primary electrons from the upper electrode 18 into impingement upon the emitter 22), as the overhanging portion 108 of the upper electrode 18 functions as a gate electrode (a control electrode, a focusing electronic lens, or the like), the straightness of emitted electrons can be increased. This is effective in reducing crosstalk if a number of electron emitters 12B are arrayed for use as an electron source of displays.

As described above, the light source 10B according to the second embodiment is capable of easily developing a high electric field concentration, provides many electron emission regions, has a larger output and higher efficiency of the electron emission, and can be driven at a lower voltage (lower power consumption).

According to the second embodiment in particular, at least the upper surface of the emitter 22 has the surface irregularities 104 due to the grain boundary of the dielectric material. As the upper electrode 18 has the through regions 102 in portions corresponding to the concavities 106 of the grain boundary of the dielectric material, the overhanging portions 108 of the upper electrode 18 can easily be realized.

The maximum angle $\theta$ between the upper surface of the emitter 22, i.e., the surface of the convexity 112 (which is also the inner wall surface of the concavity 106) of the grain boundary of the dielectric material, and the lower surface 108a of the overhanging portion 108 of the upper electrode 18 is in the range of $1° \leq \theta \leq 60°$. The maximum distance d in the vertical direction between the surface of the convexity 112 (the inner wall surface of the concavity 106) of the grain boundary of the dielectric material and the lower surface 108a of the overhanging portion 108 of the upper electrode 18 is in the range of $0 \, \mu m < d \leq 10 \, \mu m$. These arrangements make it possible to increase the degree of the electric field concentration in the region of the gap 110, resulting in a larger output and higher efficiency of the electron emission and making the drive voltage lower efficiently.

According to the second embodiment, the through region 102 is in the shape of the hole 114. As shown in FIG. 39, the portions of the emitter 22 where the polarization is inverted or changed depending on the drive voltage Va applied between the upper electrode 18 and the lower electrode 20 (see FIG. 38) include a portion (first portion) 124 directly below the upper electrode 18 and a portion (second portion) 126 corresponding to a region extending from the inner peripheral edge of the through region 102 inwardly of the through region 102. Particularly, the second portion 126 changes depending on the level of the drive voltage Va and the degree of the electric field concentration. According to the second embodiment, the average diameter of the hole 114 is in the range from 0.1 μm to 10 μm. Insofar as the average diameter of the hole 114 is in this range, the distribution of electrons emitted through the through region 102 is almost free of any variations, allowing electrons to be emitted efficiently.

If the average diameter of the hole 114 is less than 0.1 μm, then the region where electrons are accumulated is made narrower, reducing the amount of emitted electrons. While one solution would be to form many holes 114, it would be difficult and highly costly to form many holes 114. If the average diameter of the hole 114 is in excess of 10 μm, then the proportion (share) of the portion (second portion) 126 which contributes to the emission of electrons in the portion of the emitter 22 that is exposed through the through region 102 is reduced, resulting in a reduction in the electron emission efficiency.

Figure 47:
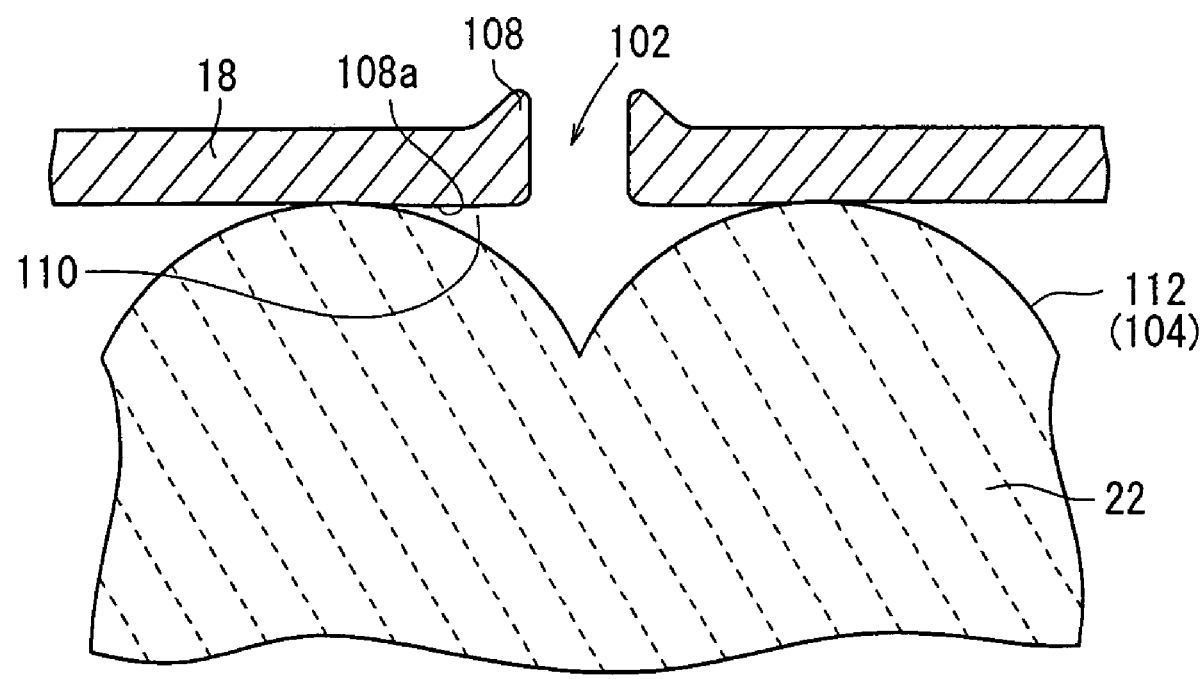
FIG. 47 is a view showing a cross-sectional shape of an overhanging portion of the upper electrode.
Figure 48:
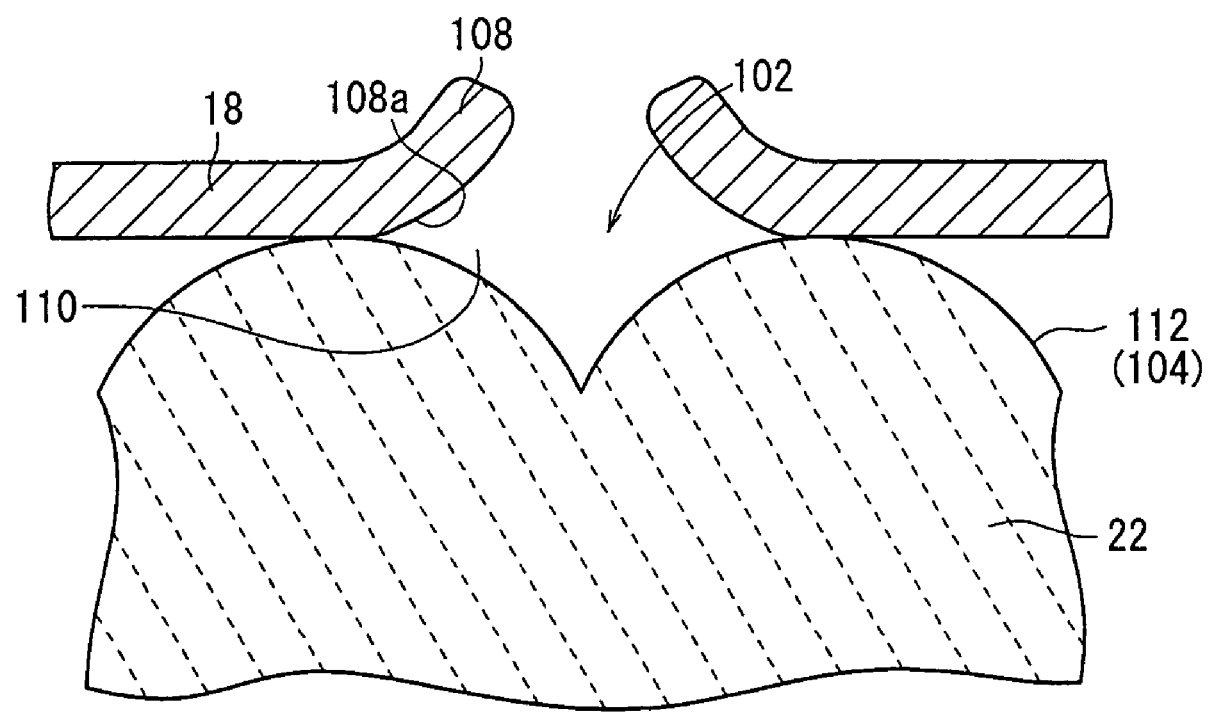
FIG. 48 is a view showing a cross-sectional shape of another overhanging portion of the upper electrode.
Figure 49:
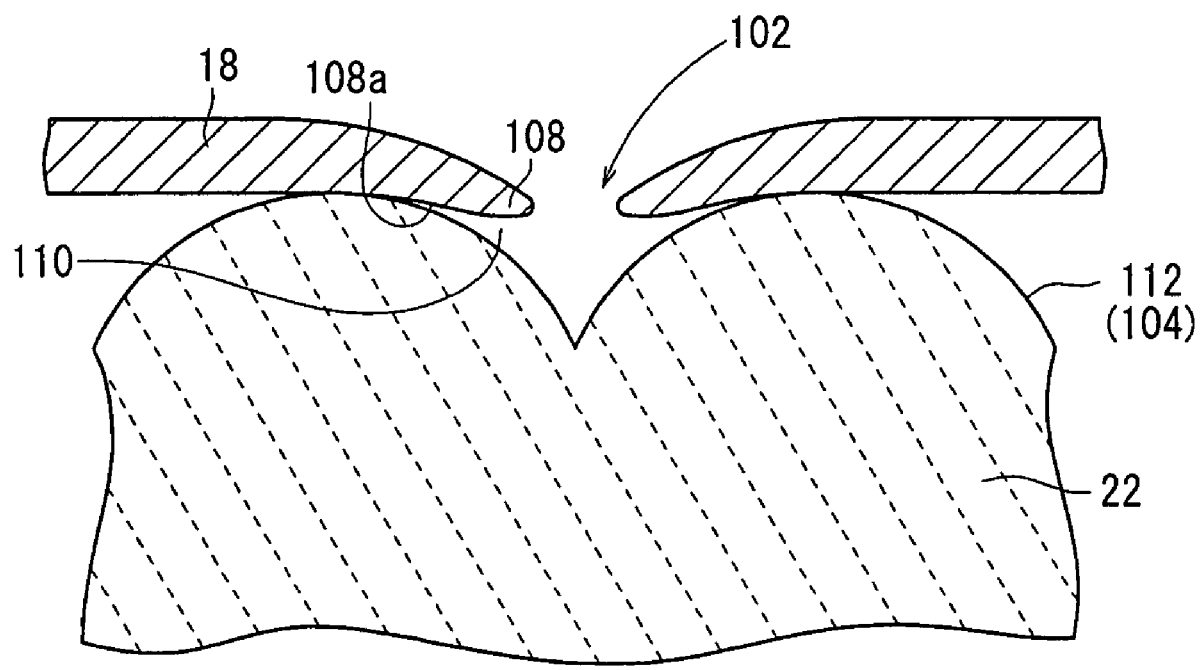
FIG. 49 is a view showing a cross-sectional shape of still another overhanging portion of the upper electrode.

The overhanging portion 108 of the upper electrode 18 may have upper and lower surfaces extending horizontally as shown in FIG. 39. Alternatively, as shown in FIG. 47, the overhanging portion 108 may have a lower surface 108a extending substantially horizontally and an upper end raised upwardly. Alternatively, as shown in FIG. 48, the overhanging portion 108 may have a lower surface 108a inclined progressively upwardly toward the center of the through region 102. Further alternatively, as shown in FIG. 49, the overhanging portion 108 may have a lower surface 108a inclined progressively downwardly toward the center of the through region 102. The arrangement shown in FIG. 47 is capable of increasing the function as a gate electrode. The arrangement shown in FIG. 49 makes it easier to produce a higher electric field concentration for a larger output and higher efficiency of the electron emission because the gap 110 is narrower.

Figure 50:
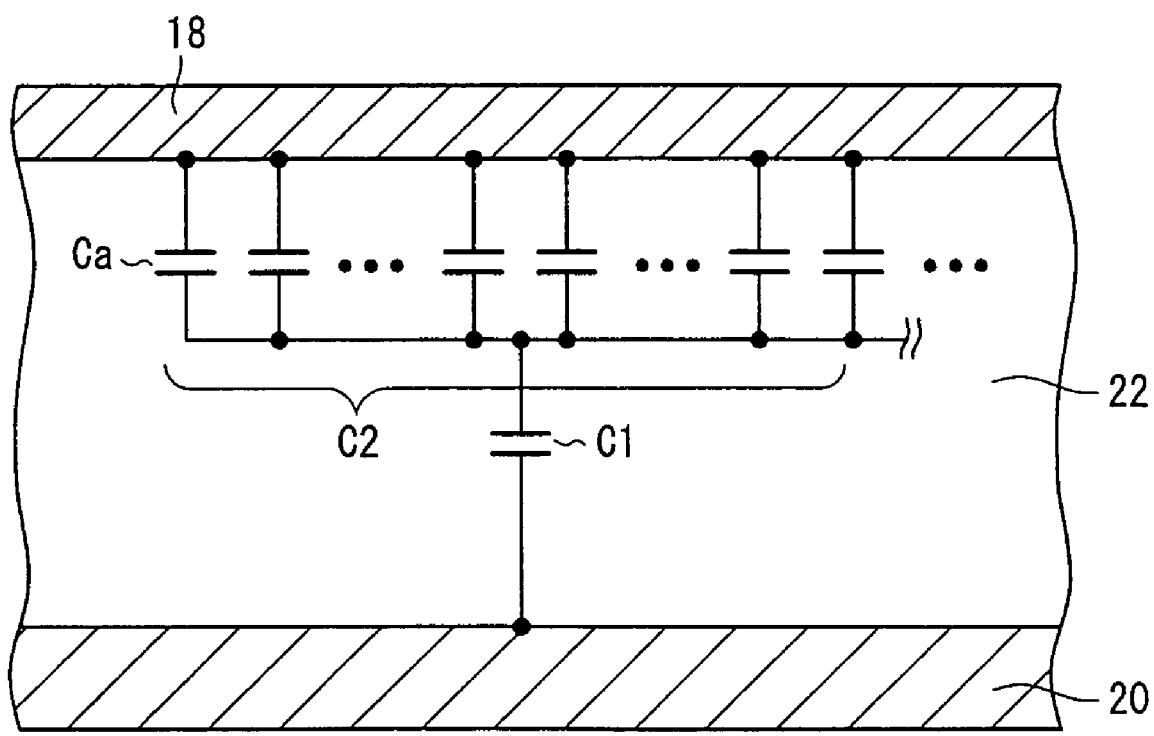
FIG. 50 is an equivalent circuit diagram showing a connected state of various capacitors connected between the upper electrode and the lower electrode.

As shown in FIG. 50, the electron emitter 12B according to the second embodiment has in its electrical operation a capacitor C1 due to the emitter 22 and a cluster of capacitors Ca due to respective gaps 110, disposed between the upper electrode 18 and the lower electrode 20. The capacitors Ca due to the respective gaps 110 are connected parallel to each other into a single capacitor C2. In terms of an equivalent circuit, the capacitor C1 due to the emitter 22 is connected in series to the capacitor C2 which comprises the cluster of capacitors Ca.

Actually, the capacitor C1 due to the emitter 22 is not directly connected in series to the capacitor C2 which comprises the cluster of capacitors Ca, but the capacitive component that is connected in series varies depending on the number of the through regions 102 formed in the upper electrode 18 and the overall area of the through regions 102.

Figure 51:
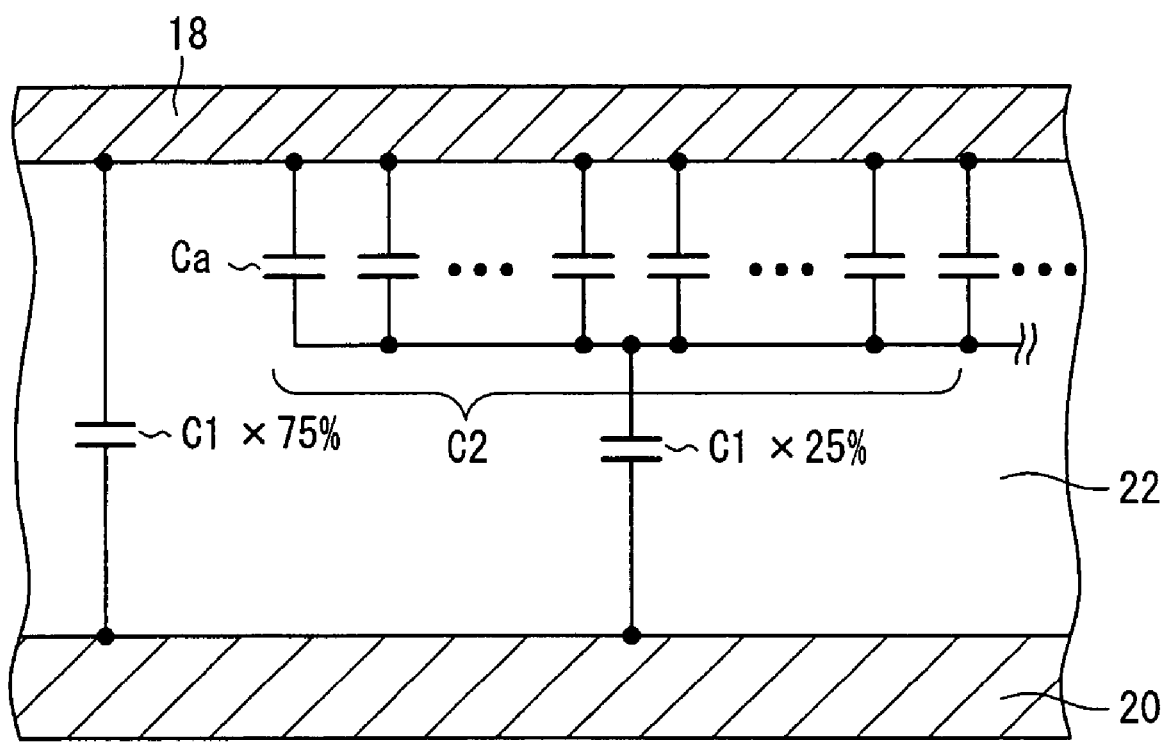
FIG. 51 is a diagram illustrative of calculations of capacitances of the various capacitors connected between the upper electrode and the lower electrode.

Capacitance calculations will be performed on the assumption that 25% of the capacitor C1 due to the emitter 22 is connected in series to the capacitor C2 which comprises the cluster of capacitors Ca, as shown in FIG. 51. Since the gaps 110 are in vacuum, the relative dielectric constant thereof is 1. It is assumed that the maximum distance d across the gaps 110 is 0.1 μm, the area S of each gap 110 is S=1 μm×1 μm, and the number of the gaps 110 is 10,000. It is also assumed that the emitter 22 has a relative dielectric constant of 2000, the emitter 22 has a thickness of 20 μm, and the confronting area of the upper and lower electrodes 18, 20 is 200 μm×200 μm. The capacitor C2 which comprises the cluster of capacitors Ca has a capacitance of 0.885 pF, and the capacitor C1 due to the emitter 22 has a capacitance of 35.4 pF. If the portion of the capacitor C1 due to the emitter 22 which is connected in series to the capacitor C2 which comprises the cluster of capacitors Ca is 25% of the entire capacitor C1, then that series-connected portion has a capacitance (including the capacitance of capacitor C2 which comprises the cluster of capacitors Ca) of 0.805 pF, and the remaining portion has a capacitance of 26.6 pF.

Because the series-connected portion and the remaining portion are connected parallel to each other, the overall capacitance is 27.5 pF. This capacitance is 78% of the capacitance 35.4 pF of the capacitor C1 due to the emitter 22. Therefore, the overall capacitance is smaller than the capacitance of the capacitor C1 due to the emitter 22.

Consequently, the capacitance of the cluster of capacitors Ca due to the gaps 110 is relatively small. Because of the voltage division between the cluster of capacitors Ca and the capacitor C1 due to the emitter 22, almost the entire applied voltage Va is applied across the gaps 110, which are effective to produce a larger output of the electron emission.

Since the capacitor C2 which comprises the cluster of capacitors Ca is connected in series to the capacitor C1 due to the emitter 22, the overall capacitance is smaller than the capacitance of the capacitor C1 due to the emitter 22. This is effective to provide such preferred characteristics that the electron emission is performed for a larger output and the overall power consumption is lower.

Three modifications of the electron emitter 12B of the light source 10B according to the second embodiment will be described below with reference to FIGS. 52 through 54.

Figure 52:
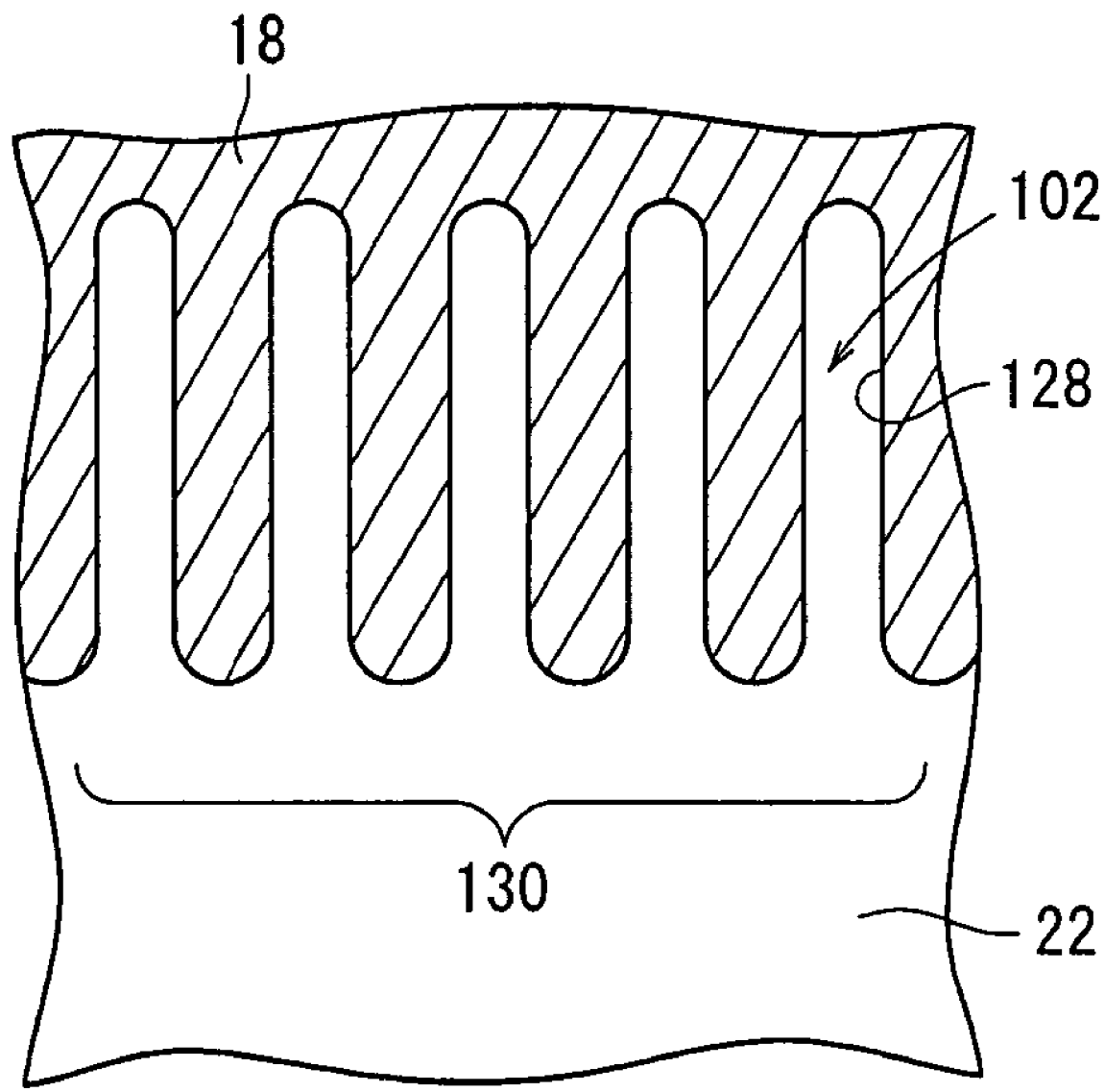
FIG. 52 is a fragmentary plan view of an electron emitter according to a first modification which can be used in the light source according to the second embodiment.

As shown in FIG. 52, an electron emitter 12Ba according to a first modification differs from the above electron emitter 12B in that the through region 102 has a shape, particularly a shape viewed from above, in the form of a recess 128. As shown in FIG. 52, the recess 128 should preferably be shaped such that a number of recesses 128 are successively formed into a comb-like recess 130. The comb-like recess 130 is effective to reduce variations in the distribution of electrons emitted through the through region 102 for efficient electron emission. Particularly, it is preferable to have the average width of the recesses 128 in the range from 0.1 μm to 10 μm. The average width represents the average of the lengths of a plurality of different line segments extending perpendicularly across the central line of the recess 128.

Figure 53:
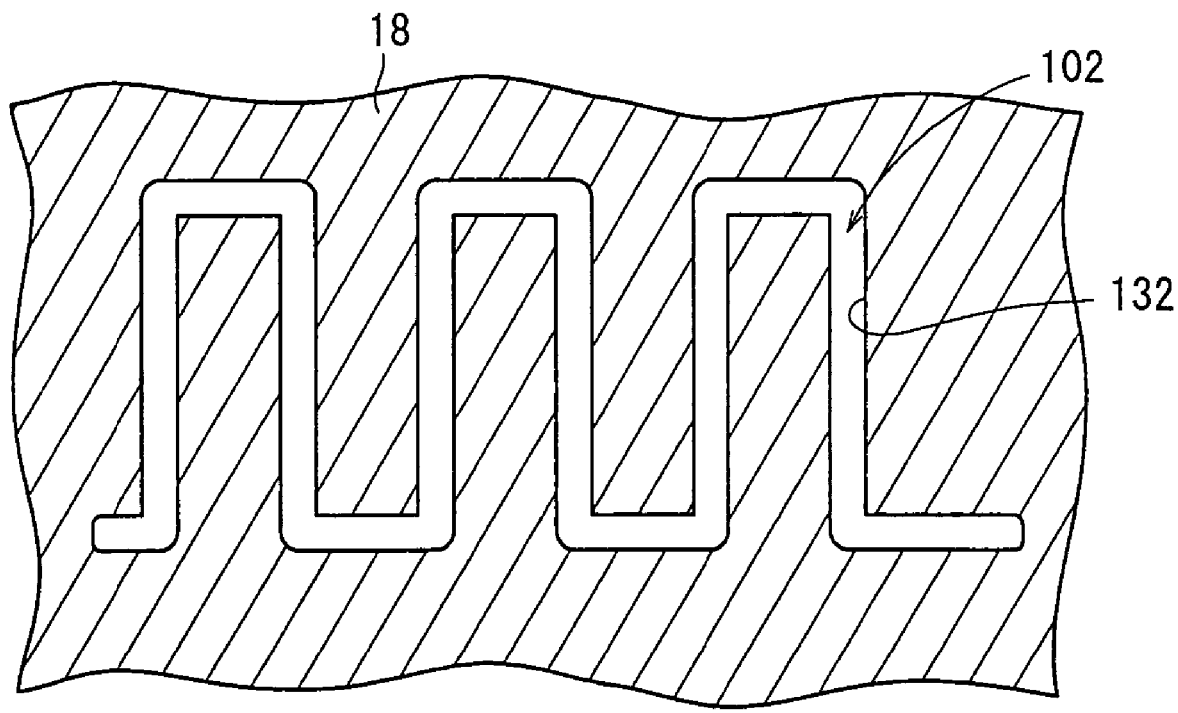
FIG. 53 is a fragmentary plan view of an electron emitter according to a second modification which can be used in the light source according to the second embodiment.

As shown in FIG. 53, an electron emitter 12Bb according to a second modification differs from the above electron emitter 12B in that the through region 102 has a shape, particularly a shape viewed from above, in the form of a slit 132. The slit 132 is defined as something having a major axis (extending in a longitudinal direction) whose length is 10 times or more as long as the minor axis (extending in a transverse direction) thereof. Those having a major axis (extending in a longitudinal direction) whose length is less than 10 times as long as the minor axis (extending in a transverse direction) thereof are defined as holes 114 (see FIG. 40). The slit 132 includes a succession of holes 114 in communication with each other. The slit 132 should preferably have an average width ranging from 0.1 μm to 10 μm for reducing variations in the distribution of electrons emitted through the through region 102 for efficient electron emission. The average width represents the average of the lengths of a plurality of different line segments extending perpendicularly across the central line of the slit 132.

Figure 54:
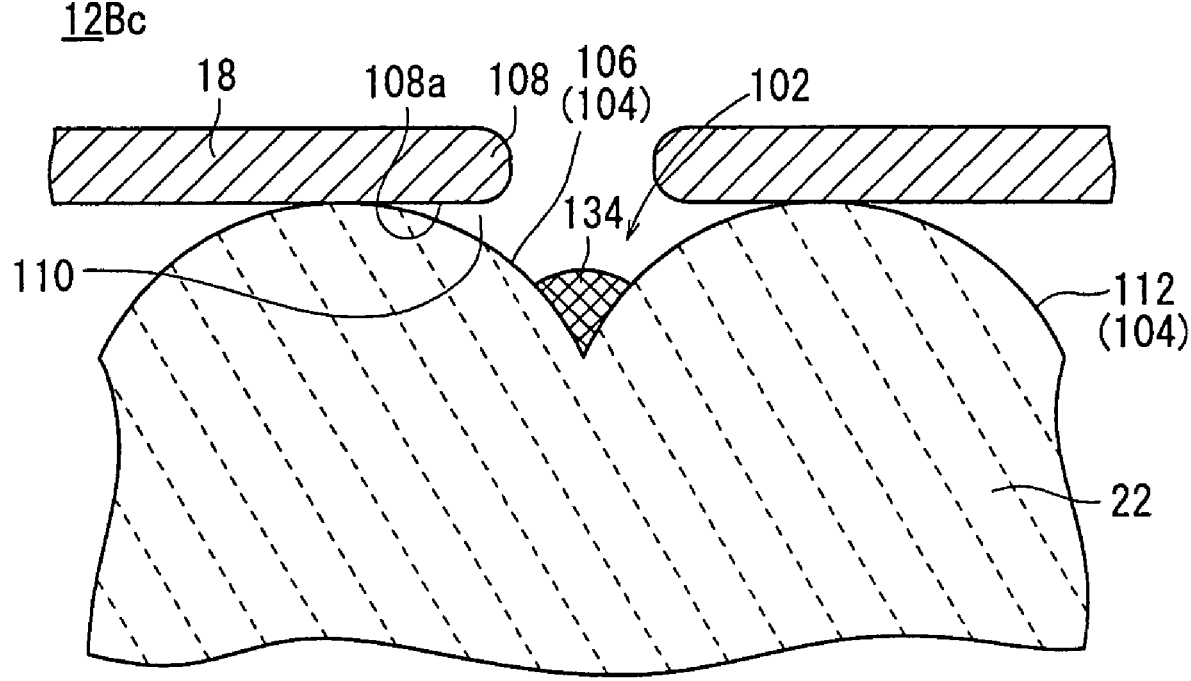
FIG. 54 is a fragmentary cross-sectional view of an electron emitter according to a third modification which can be used in the light source according to the second embodiment.

As shown in FIG. 54, an electron emitter 12Bc according to a third modification differs from the above electron emitter 12B in that a floating electrode 134 exists on the portion of the upper surface of the emitter 22 which corresponds to the through region 102, e.g., in the concavity 106 due to the grain boundary of the dielectric material. With this arrangement, since the floating electrode 134 also functions as an electron supply source, the electron emitter 12Bc can emit many electrons through the through region 102 in an electron emission stage (the second output period T2 (see FIG. 43) according to the first electron emission process described above). The electron emission from the floating electrode 134 may be attributed to an electric field concentration at the triple junction of the floating electrode 134, the dielectric material, and the vacuum.

The characteristics of the electron emitter 12B of the light source 10B according to the second embodiment, particularly, the voltage vs. charge quantity characteristics (the voltage vs. polarization quantity characteristics) thereof will be described below.

Figure 55:
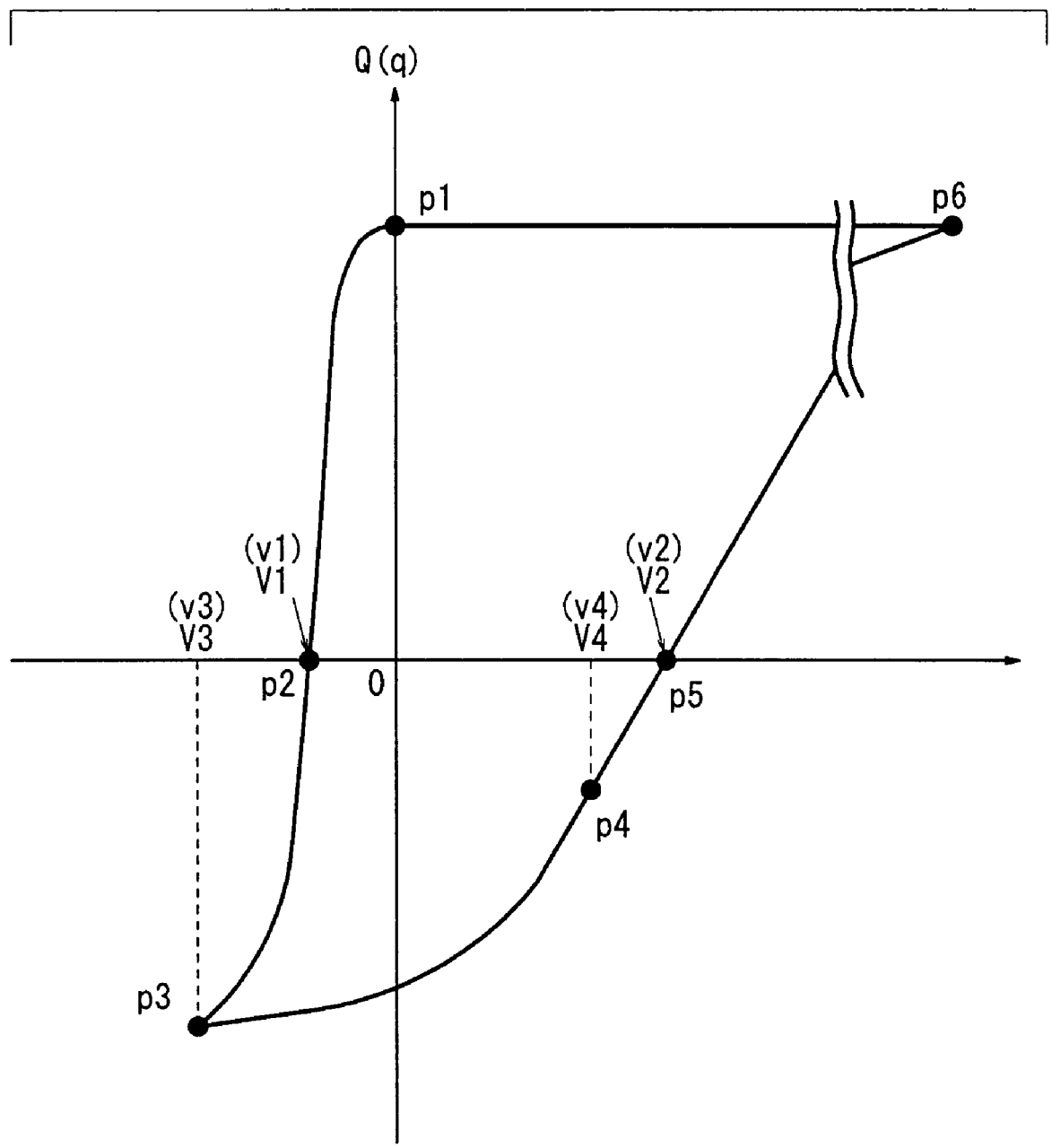
FIG. 55 is a diagram showing the voltage vs. charge quantity characteristics (voltage vs. polarized quantity characteristics) of an electron emitter used in the light source according to the second embodiment of the present invention.

The electron emitter 12B is characterized by an asymmetric hysteresis curve based on the reference voltage=0 (V) in vacuum, as indicated by the characteristics shown in FIG. 55.

The voltage vs. charge quantity characteristics will be described below. If a region from which electrons are emitted is defined as an electron emission region, then at a point p1 (initial state) where the reference voltage is applied, almost no electrons are stored in the electron emission region. Thereafter, when a negative voltage is applied, the amount of positive charges of dipoles whose polarization is inverted in the emitter 22 in the electron emission region increases, and electrons are emitted from the upper electrode 18 toward the electron emission region in the first stage, so that electrons are stored. When the absolute value of the negative voltage increases, electrons are progressively stored in the electron emission region until the amount of positive charges and the amount of electrons are held in equilibrium with each other at a point p2 of the negative voltage. As the absolute value of the negative voltage further increases, the stored amount of electrons increases, making the amount of negative charges greater than the amount of positive charges. The accumulation of electrons is saturated at a point P3. The amount of negative charges is the sum of the amount of electrons remaining to be stored and the amount of negative charges of the dipoles whose polarization is inverted in the emitter 22.

As the absolute value of the negative voltage then decreases, and a positive voltage is applied in excess of the reference voltage, electrons start being emitted at a point p4 in the second stage. When the positive voltage increases in a positive direction, the amount of emitted electrons increases until the amount of positive charges and the amount of electrons are held in equilibrium with each other at a point p5. At a point p6, almost all the stored electrons are emitted, bringing the difference between the amount of positive charges and the amount of negative charges into substantial conformity with a value in the initial state. That is, almost all stored electrons are eliminated, and only the negative charges of dipoles whose polarization is inverted in the emitter 22 appear in the electron emission region.

The voltage vs. charge quantity characteristics have the following features:

(1) If the negative voltage at the point p2 where the amount of positive charges and the amount of electrons are held in equilibrium with each other is represented by V1 and the positive voltage at the point p5 by V2, then these voltages satisfy the following relationship:

$|V1|<|V2|$ (2) More specifically, the relationship is expressed as $1.5\times|V1|<|V2|$ (3) If the rate of change of the amount of positive charges and the amount of electrons at the point p2 is represented by $\Delta Q1/\Delta V1$ and the rate of change of the amount of positive charges and the amount of electrons at the point p5 by $\Delta Q2/\Delta V2$, then these rates satisfy the following relationship:

$(\Delta Q1/\Delta V1)>(\Delta Q2/\Delta V2)$ (4) If the voltage at which the accumulation of electrons is saturated is represented by V3 and the voltage at which electrons start being emitted by V4, then these voltages satisfy the following relationship:

$1\leq|V4|/|V3|\leq1.5$

The characteristics shown in FIG. 55 will be described below in terms of the voltage vs. polarization quantity characteristics. It is assumed that the emitter 22 is polarized in one direction, with dipoles having negative poles facing toward the upper surface of the emitter 22 (see FIG. 56A).

Figure 56A:
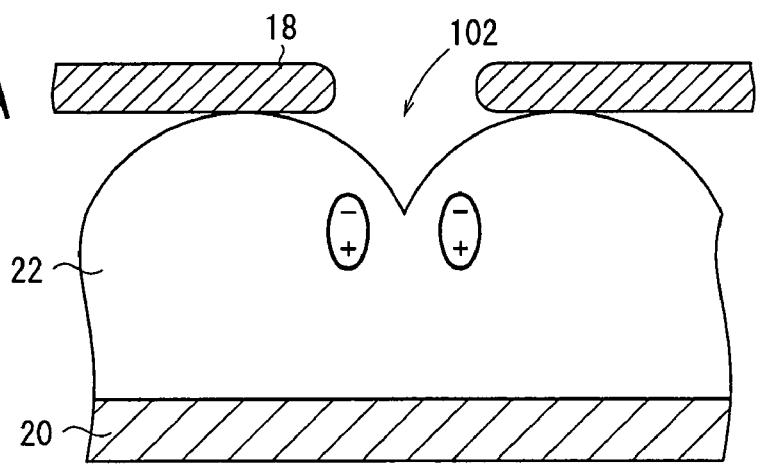
FIG. 56A is a view illustrative of a state at a point p1 shown in FIG. 55.
Figure 56B:
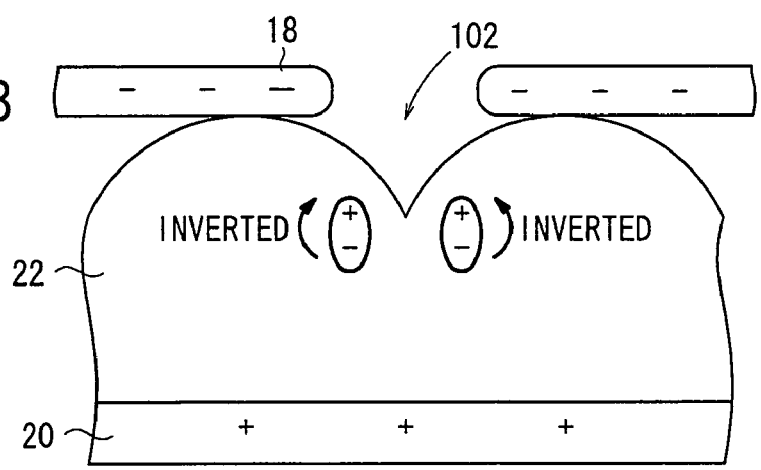
FIG. 56B is a view illustrative of a state at a point p2 shown in FIG. 55.
Figure 56C:
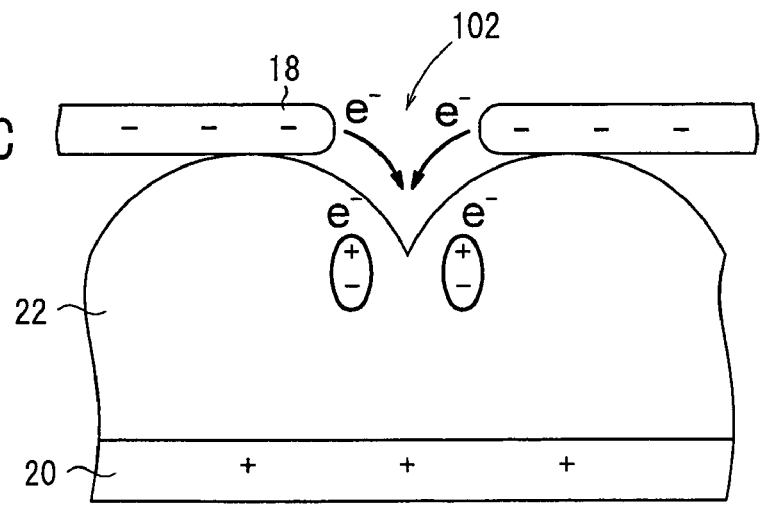
FIG. 56C is a view illustrative of a state from the point p2 to a point p3 shown in FIG. 55.

At the point p1 (initial state) where the reference voltage (e.g., 0 V) is applied as shown in FIG. 55, since the negative poles of the dipole moments face toward the upper surface of the emitter 22, as shown in FIG. 56A, almost no electrons are accumulated on the upper surface of the emitter 22.

Thereafter, when a negative voltage is applied and the absolute value of the negative voltage is increased, the polarization starts being inverted substantially at the time the negative voltage exceeds a negative coercive voltage (see the point p2 in FIG. 55). All the polarization is inverted at the point p3 shown in FIG. 55 (see FIG. 56B). Because of the polarization inversion, an electric field concentration occurs at the triple junction, and the upper electrode 18 emits electrons toward the emitter 22 in the first stage, causing electrons to be accumulated in the portion of the emitter 22 which is exposed through the through region 102 of the upper electrode 18 and the portion of the emitter 22 which is near the peripheral portion of the upper electrode 18 (see FIG. 56C). In particular, electrons are emitted (emitted inwardly) from the upper electrode 18 toward the portion of the emitter 22 which is exposed through the through region 102 of the upper electrode 18. At the point p3 shown in FIG. 55, the accumulation of electrons is saturated.

Figure 57A:
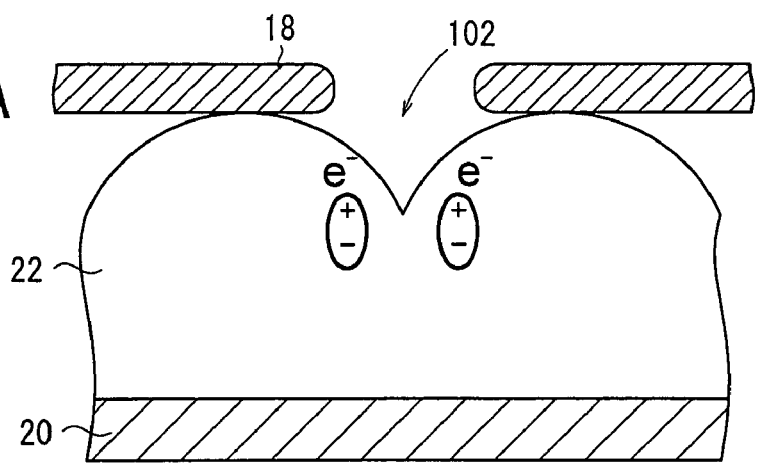
FIG. 57A is a view illustrative of a state from the point p3 to a point p4 shown in FIG. 55.
Figure 57B:
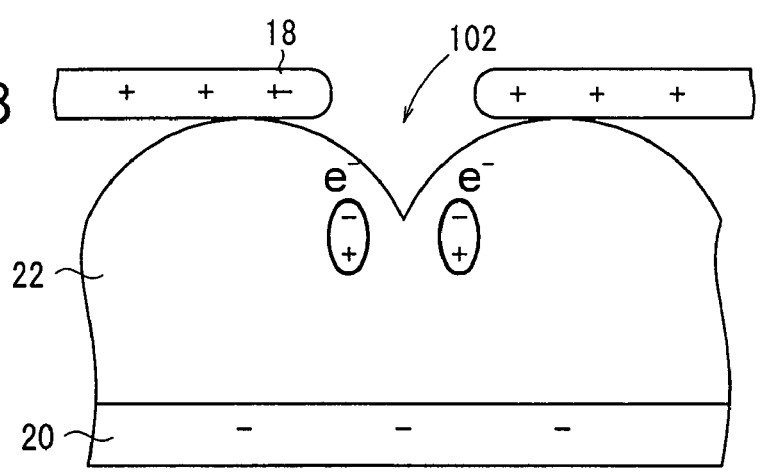
FIG. 57B is a view illustrative of a state immediately prior to a point p4 shown in FIG. 55.

Thereafter, when the absolute value of the negative voltage is reduced and a positive voltage is applied in excess of the reference voltage, the upper surface of the emitter 22 is kept charged up to a certain voltage level (see FIG. 57A). As the level of the positive voltage is increased, there is produced a region where the negative poles of dipoles start facing the upper surface of the emitter 22 (see FIG. 57B) immediately prior to the point p4 in FIG. 55. When the level is further increased, electrons start being emitted due to coulomb repulsive forces posed by the negative poles of the dipoles after the point p4 in FIG. 55 (see FIG. 57C). When the positive voltage is increased in the positive direction, the amount of emitted electrons is increased. Substantially at the time the positive voltage exceeds the positive coercive voltage (the point p5), a region where the polarization is inverted again is increased. At the point p6, almost all the accumulated electrons are emitted, and the amount of polarization at this time is essentially the same as the amount of polarization in the initial state.

The characteristics of the electron emitter 12B has have the following features:

(A) If the negative coercive voltage is represented by v1 and the positive coercive voltage by v2, then $|v1|<|v2|$ (B) More specifically, $1.5\times|v1|<|v2|$ (C) If the rate of change of the polarization at the time the negative coercive voltage v1 is applied is represented by $\Delta q1/\Delta v1$ and the rate of change of the amount of positive charges and the rate of change of the polarization at the time the positive coercive voltage v2 is applied is represented by $\Delta q2/\Delta v2$, then $(\Delta q1/\Delta v1)>(\Delta q2/\Delta v2)$ (D) If the voltage at which the accumulation of electrons is saturated is represented by v3 and the voltage at which electrons start being emitted by v4, then $1\leq|v4|/|v3|\leq1.5$ Since the electron emitter 12B has the above characteristics, it can easily be applied to the light source 10B according to the second embodiment which has a plurality of electron emitters 12B arrayed in association with a plurality of pixels, for emitting light due to the emission of electrons from the electron emitters 12B.

The light source 10B which employs the electron emitters 12B will be described below.

The light source 10B according to the second embodiment is a light source in conformity with a display for displaying an image such as a liquid crystal display backlight or the like. As shown in FIG. 58, the light source 10B has a light emission section 14B comprising a matrix or staggered pattern of electron emitters 12B corresponding to respective light-emitting devices such as pixels, and a drive circuit 16B for driving the light emission section 14B. One electron emitter 12B may be assigned to each pixel, or a plurality of electron emitters 12B may be assigned to each pixel. In the present embodiment, it is assumed for the sake of brevity that one electron emitter 12B is assigned to each pixel.

The drive circuit 16B has a plurality of row select lines 144 for selecting rows in the light emission section 14B and a plurality of signal lines 146 for supplying data signals Sd to the light emission section 14B.

The drive circuit 16B also has a row selecting circuit 148 for supplying a selection signal Ss selectively to the row select lines 144 to successively select a row of electron emitters 12B, a signal supplying circuit 150 for supplying parallel data signals Sd to the signal lines 146 to supply the data signals Sd to a row (selected row) selected by the row selecting circuit 148, and a signal control circuit 152 for controlling the row selecting circuit 148 and the signal supplying circuit 150 based on a control signal (video signal or the like) Sv and a synchronizing signal Sc that are input to the signal control circuit 152.

A power supply circuit 154 (which supplies 50 V and 0 V, for example) is connected to the row selecting circuit 148 and the signal supplying circuit 150. A pulse power supply 156 is connected between a negative line between the row selecting circuit 148 and the power supply circuit 154, and GND (ground). The pulse power supply 156 outputs a pulsed voltage waveform having a reference voltage (e.g., 0 V) during a charge accumulation period Td, to be described later, and a certain voltage (e.g., −400 V) during a light emission period Th.

During the charge accumulation period Td, the row selecting circuit 148 outputs the selection signal Ss to the selected row and outputs a non-selection signal Sn to the unselected rows. During the light emission period Th, the row selecting circuit 148 outputs a constant voltage (e.g., −350 V) which is the sum of a power supply voltage (e.g., 50 V) from the power supply circuit 154 and a voltage (e.g., −400 V) from the pulse power supply 156.

The signal supplying circuit 150 has a pulse generating circuit 158 and an amplitude modulating circuit 160. The pulse generating circuit 158 generates and outputs a pulse signal Sp having a constant pulse period and a constant amplitude (e.g., 50 V) during the charge accumulation period Td, and outputs a reference voltage (e.g., 0 V) during the light emission period Th.

During the charge accumulation period Td, the amplitude modulating circuit 160 amplitude-modulates the pulse signal Sp from the pulse generating circuit 158 depending on the luminance levels of the light-emitting devices of the selected row, and outputs the amplitude-modulated pulse signal Sp as the data signal Sd for the light-emitting devices of the selected row. During the light emission period Th, the amplitude modulating circuit 160 outputs the reference voltage from the pulse generating circuit 158 as it is. The timing control in the amplitude modulating circuit 160 and the supply of the luminance levels of the selected light-emitting devices to the amplitude modulating circuit 160 are performed through the signal supplying circuit 150.

Figure 59C:
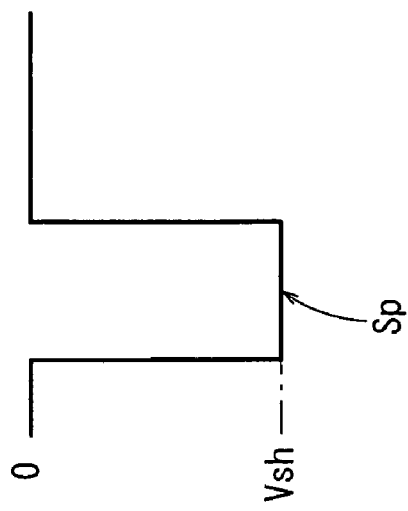
FIGS. 59A through 59C are waveform diagrams illustrative of the amplitude modulation of pulse signals by an amplitude modulating circuit.

For example, as indicated by three examples shown in FIGS. 50A through 59C, if the luminance level is low, then the amplitude of the pulse signal Sp is set to a low level Vsl (see FIG. 59A), if the luminance level is medium, then the amplitude of the pulse signal Sp is set to a medium level Vsm (see FIG. 59B), and if the luminance level is high, then the amplitude of the pulse signal Sp is set to a high level Vsh (see FIG. 59C). Though the amplitude of the pulse signal Sp is modulated into three levels in the above examples, if the amplitude modulation is applied to the light source 10B, then the pulse signal Sp is amplitude-modulated to 128 levels or 256 levels depending on the luminance levels of the light-emitting devices.

A modification of the signal supplying circuit 150 will be described below with reference to FIGS. 60 through 61C.

Figure 60:
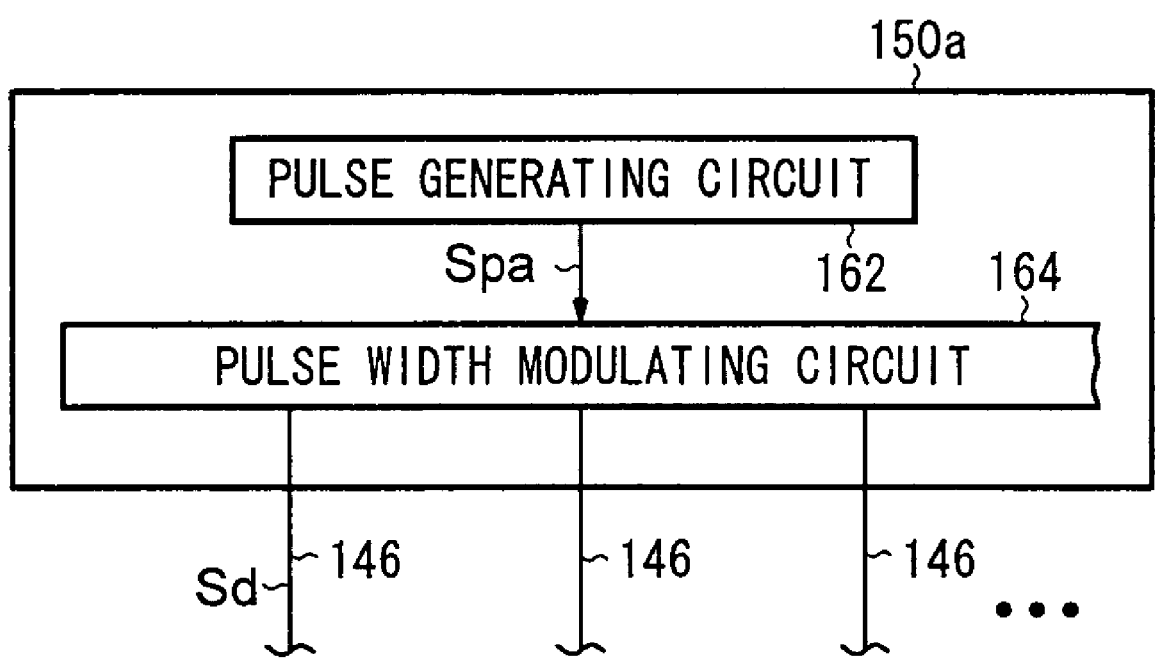
FIG. 60 is a block diagram of a signal supply circuit according to a modification.

As shown in FIG. 60, a modified signal supplying circuit 150a has a pulse generating circuit 162 and a pulse width modulating circuit 164. The pulse generating circuit 162 generates and outputs a pulse signal Spa (indicated by the broken lines in FIGS. 61A through 61C) where the positive-going edge of a voltage waveform (indicated by the solid lines in FIGS. 61A through 61C) applied to the electron emitter 12B is continuously changed in level, during the charge accumulation period Td. The pulse generating circuit 162 outputs a reference voltage during the light emission period Th. During the charge accumulation period Td, the pulse width modulating circuit 164 modulates the pulse width Wp (see FIGS. 61A through 61C) of the pulse signal Spa from the pulse generating circuit 162 depending on the luminance levels of the light-emitting devices of the selected row, and outputs the pulse signal Spa with the modulated pulse width Wp as the data signal Sd for the light-emitting devices of the selected row. During the light emission period Th, the pulse width modulating circuit 164 outputs the reference voltage from the pulse generating circuit 162 as it is. The timing control in the pulse width modulating circuit 164 and the supply of the luminance levels of the selected pixels to the pulse width modulating circuit 164 are also performed through the signal supplying circuit 150a.

Figure 61A:
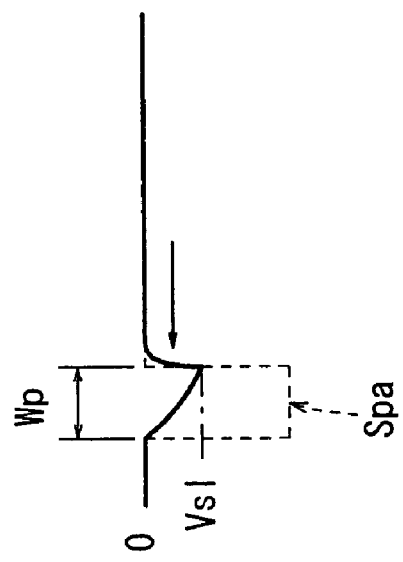
FIGS. 61A through 61C are waveform diagrams illustrative of the pulse width modulation of pulse signals by a pulse width modulating circuit.
Figure 61B:
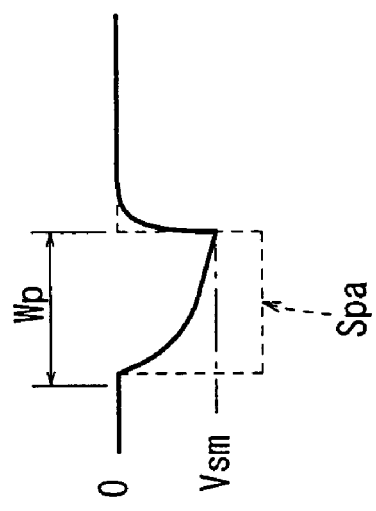
Figure 61C:
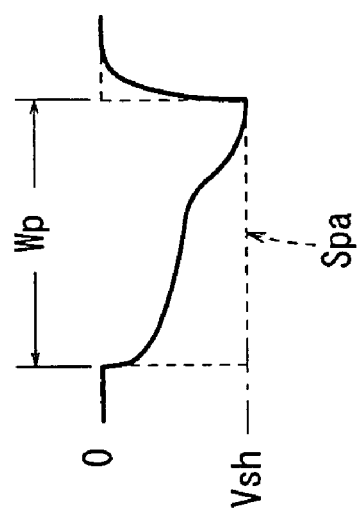

For example, as indicated by three examples shown in FIGS. 61A through 61C, if the luminance level is low, then the pulse width Wp of the pulse signal Spa is set to a short width, setting the substantial amplitude to a low level Vsl (see FIG. 61A), if the luminance level is medium, then the pulse width Wp of the pulse signal Spa is set to a medium width, setting the substantial amplitude to a medium level Vsm (see FIG. 61B), and if the luminance level is high, then the pulse width Wp of the pulse signal Spa is set to a long width, setting the substantial amplitude to a high level Vsh (see FIG. 61C). Though the pulse width Wp of the pulse signal Spa is modulated into three levels in the above examples, if the amplitude modulation is applied to the light source 10B, then the pulse signal Spa is pulse-width-modulated to 128 levels or 256 levels depending on the luminance levels of the light-emitting devices.

Figure 59B:
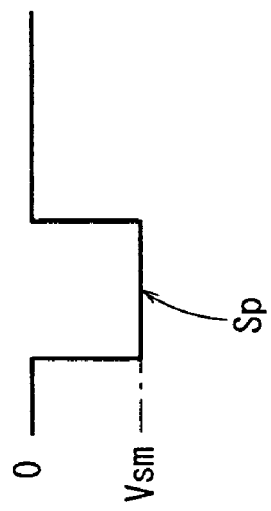
Figure 59A:
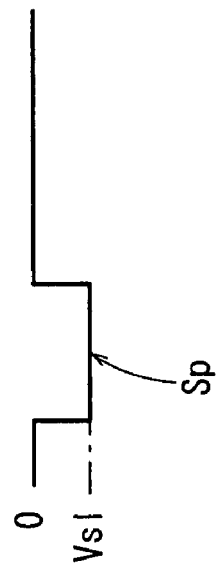
Figure 62A:
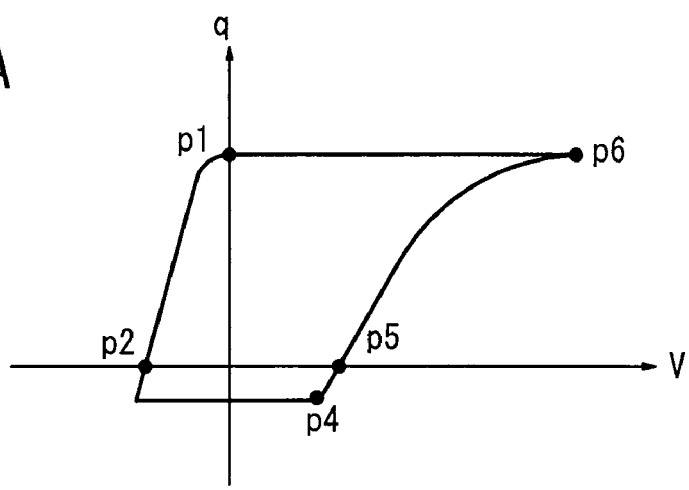
FIG. 62A is a diagram showing a hysteresis curve plotted when a voltage Vsl shown in FIG. 59A or 61A is applied.
Figure 62B:
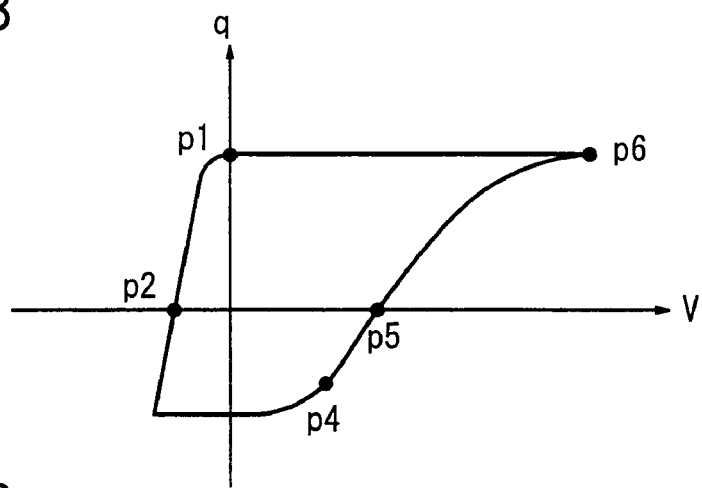
FIG. 62B is a diagram showing a hysteresis curve plotted when a voltage Vsm shown in FIG. 59B or 61B is applied.

Changes of the characteristics at the time the level of the negative voltage for the accumulation of electrons will be reviewed in relation to the three examples of amplitude modulation on the pulse signal Sp shown in FIGS. 59A through 59C and the three examples of pulse width modulation on the pulse signal Spa shown in FIGS. 61A through 61C. At the level Vsl of the negative voltage shown in FIGS. 59A and 61A, the amount of electrons accumulated in the electron emitter 12B is small as shown in FIG. 62A. At the level Vsm of the negative voltage shown in FIGS. 59B and 61B, the amount of electrons accumulated in the electron emitter 12B is medium as shown in FIG. 62B. At the level Vsh of the negative voltage shown in FIGS. 59C and 61C, the amount of electrons accumulated in the electron emitter 12B is large and is substantially saturated as shown in FIG. 62C.

Figure 62C:
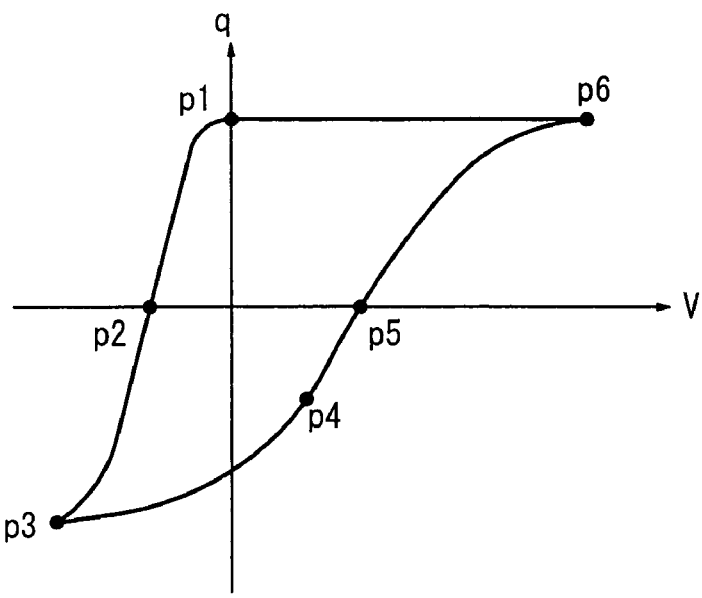
FIG. 62C is a diagram showing a hysteresis curve plotted when a voltage Vsh shown in FIG. 59C or 61C is applied.

However, as shown in FIGS. 62A through 62C, the voltage level at the point p4 where electrons start being emitted is substantially the same. That is, even if the applied voltage changes to the voltage level indicated at the point p4 after electrons are accumulated, the amount of accumulated electrons does not change essentially. It can thus be seen that a memory effect has been caused.

Figure 63:
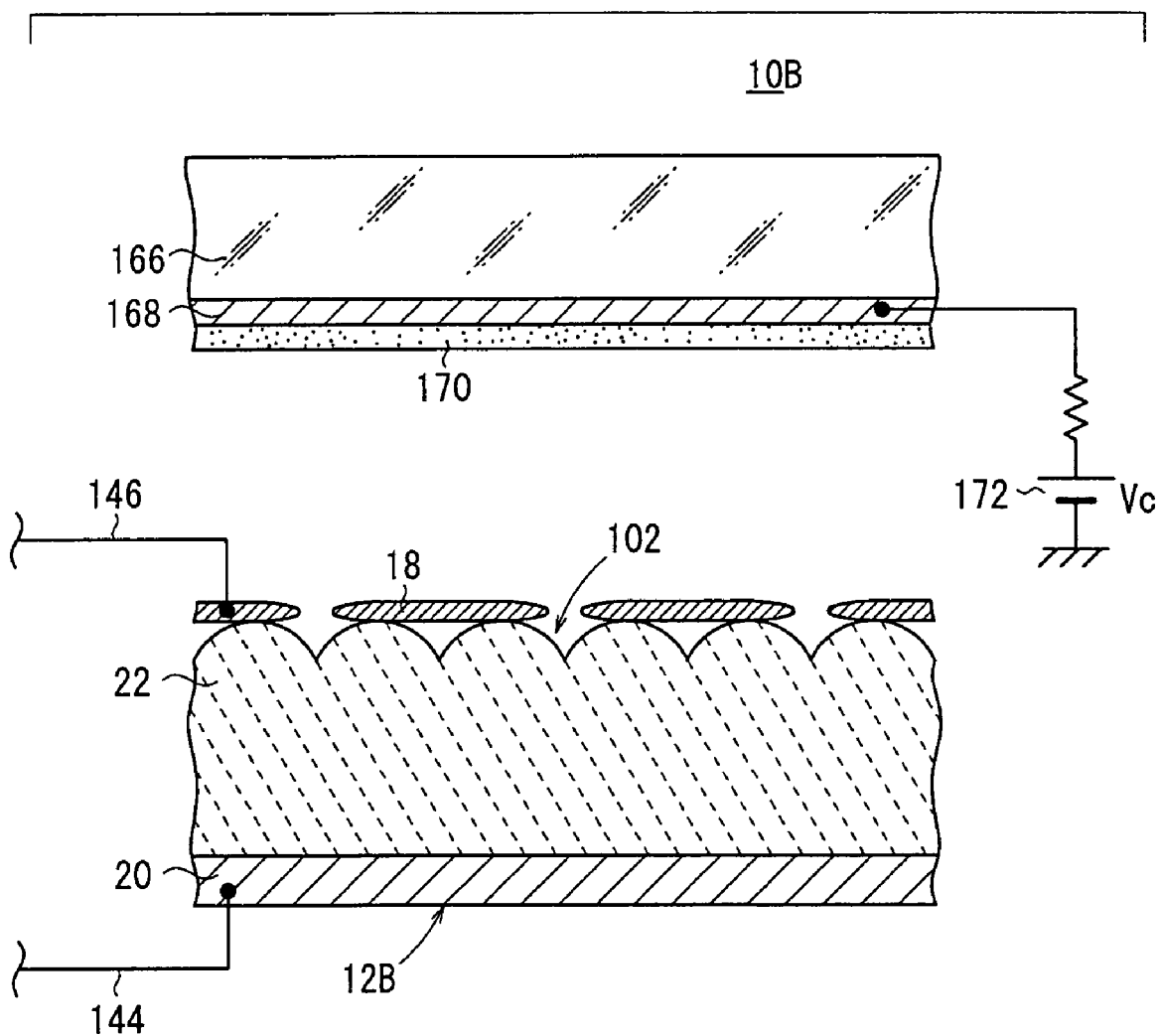
FIG. 63 is a view showing a layout of a collector electrode, a phosphor, and a transparent plate on the upper electrode.

For using the electron emitter 12B as light-emitting device of the light source 10B, as shown in FIG. 63, a transparent plate 166 made of glass or acrylic resin is placed above the upper electrode 18, and a collector electrode 168 in the form of a transparent electrode, for example, is placed on the reverse side of the transparent plate 166 (which faces the upper electrode 18), the collector electrode 168 being coated with a phosphor 170. A bias voltage source 172 (collector voltage Vc) is connected to the collector electrode 168 through a resistor. The electron emitter 12B is naturally placed in a vacuum. The vacuum level in the atmosphere should preferably in the range from $10^2$ to $10^{-6}$ Pa and more preferably in the range from $10^{-3}$ to $10^{-5}$ Pa.

The reason for the above range is that in a lower vacuum, (1) many gas molecules would be present in the space, and a plasma can easily be generated and, if too an intensive plasma were generated, many positive ions thereof would impinge upon the upper electrode 18 and damage the same, and (2) emitted electrons would tend to impinge upon gas molecules prior to arrival at the collector electrode 168, failing to sufficiently excite the phosphor 170 with electrons that are sufficiently accelerated under the collector voltage Vc.

In a higher vacuum, though electrons would be liable to be emitted from a point where electric field concentrates, structural body supports and vacuum seals would be large in size, posing disadvantages on efforts to make the emitter smaller in size.

Figure 64:
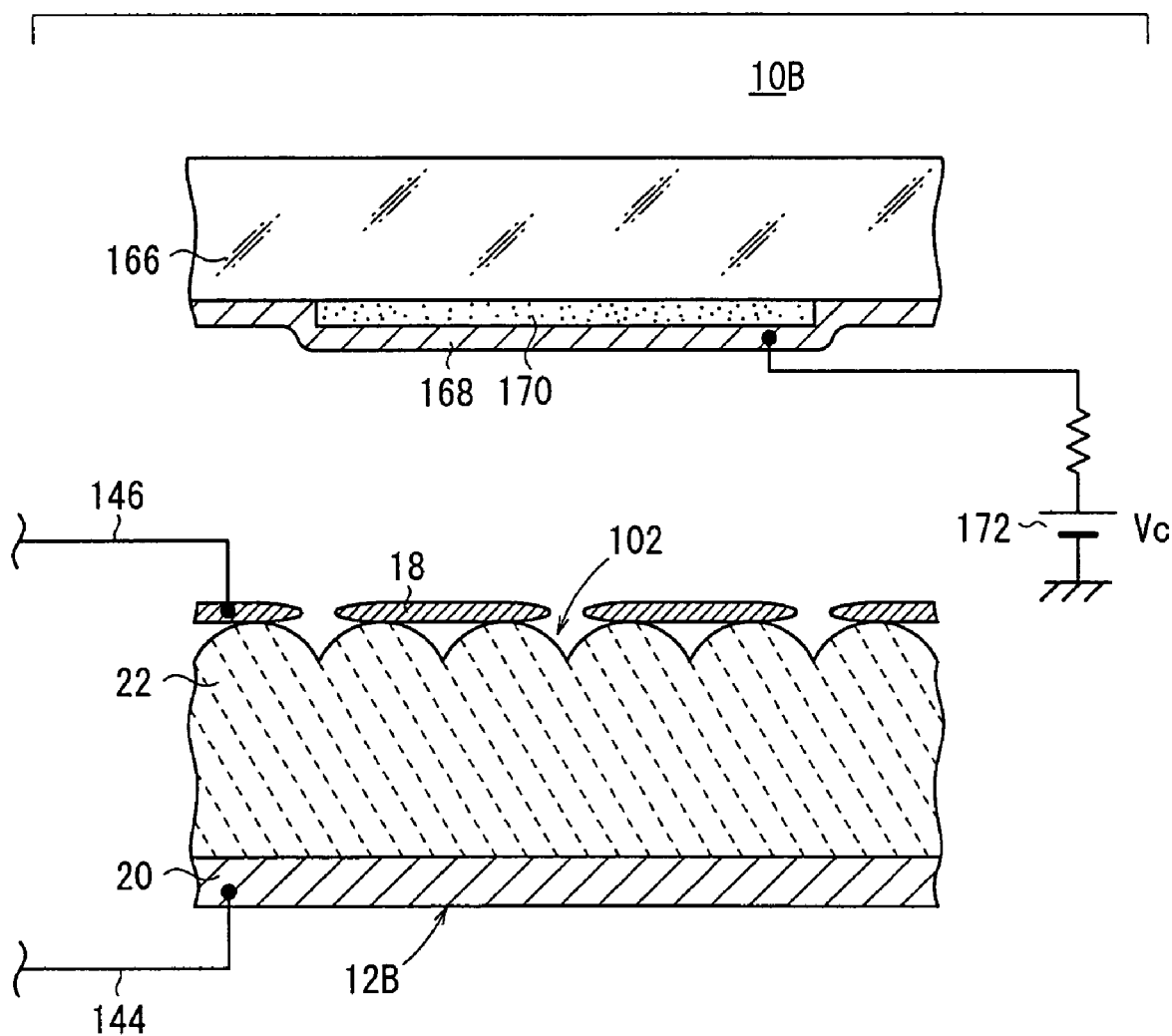
FIG. 64 is a view showing another layout of a collector electrode, a phosphor, and a transparent plate on the upper electrode.

In the embodiment shown in FIG. 63, the collector electrode 168 is formed on the reverse side of the transparent plate 166, and the phosphor 170 is formed on the surface of the collector electrode 168 (which faces the upper electrode 18). According to another arrangement, as shown in FIG. 64, the phosphor 170 may be formed on the reverse side of the transparent plate 166, and the collector electrode 168 may be formed in covering relation to the phosphor 170.

Such another arrangement is for use in a CRT or the like where the collector electrode 168 functions as a metal back. Electrons emitted from the emitter 22 pass through the collector electrode 168 into the phosphor 170, exciting the phosphor 170. Therefore, the collector electrode 168 is of a thickness which allows electrons to pass therethrough, preferably be 100 nm or less thick. As the kinetic energy of the emitted electrons is larger, the thickness of the collector electrode 168 may be increased.

This arrangement offers the following advantages:

(a) If the phosphor 170 is not electrically conductive, then the phosphor 170 is prevented from being charged (negatively), and an electric field for accelerating electrons can be maintained.

(b) The collector electrode 168 reflects light emitted from the phosphor 170, and discharges the light emitted from the phosphor 170 efficiently toward the transparent plate 166 (light emission surface).

(c) Electrons are prevented from impinging excessively upon the phosphor 170, thus preventing the phosphor 170 from being deteriorated and from producing a gas.

Four experimental examples (first through fourth experimental examples) of the electron emitter 12B used in the light source 10B according to the second embodiment will be shown.

Figure 65A:
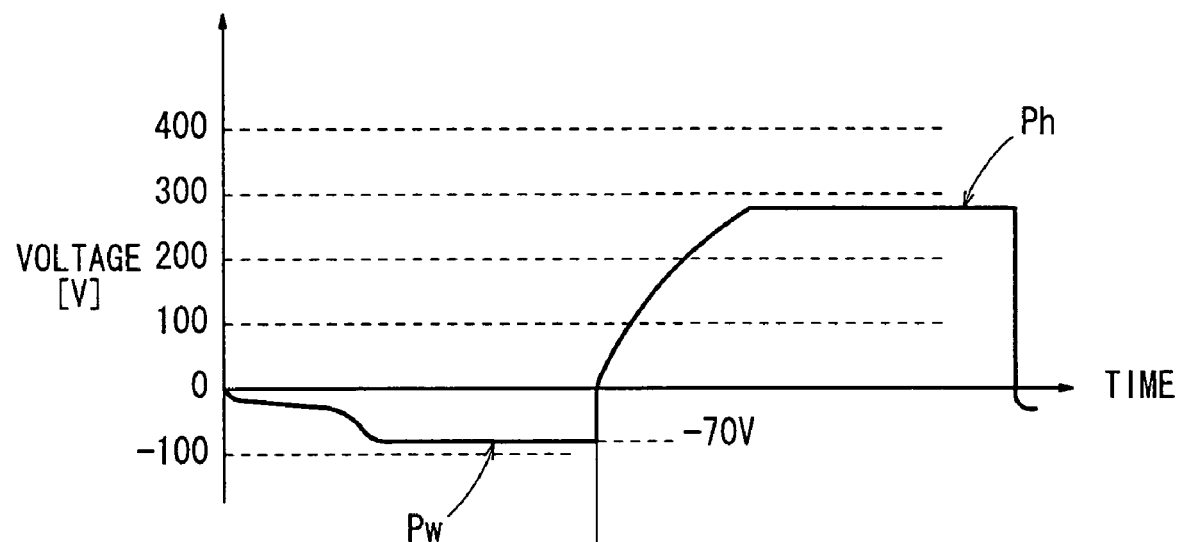
FIG. 65A is a diagram showing the waveform of a write pulse and a turn-on pulse that are used in a first experimental example (an experiment for observing the emission of electrons from an electron emitter)
Figure 65B:
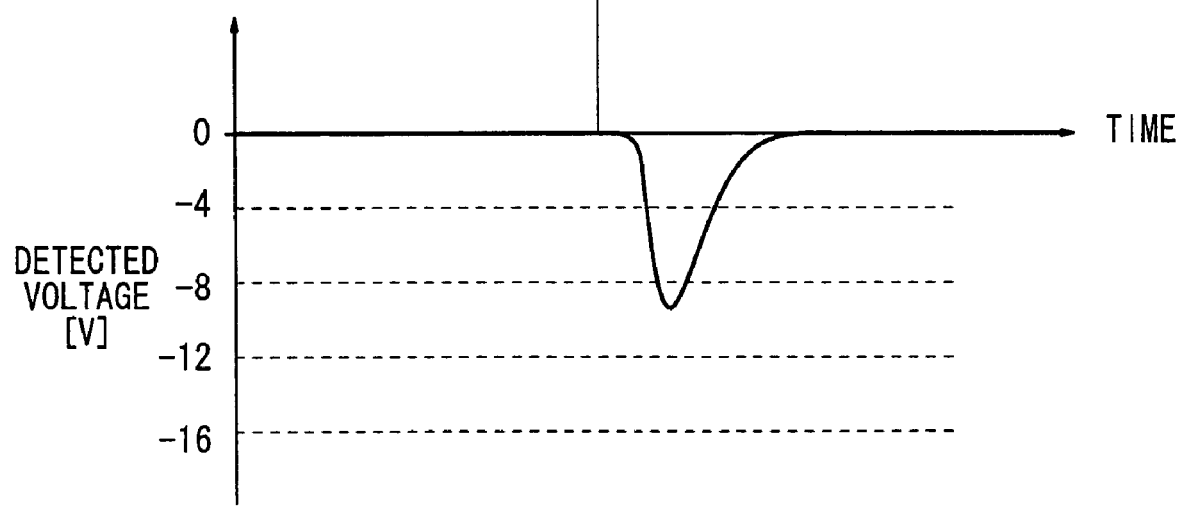
FIG. 65B is a diagram showing the waveform of a detected voltage of a light-detecting device, which is representative of the emission of electrons from the electron emitter in the first experimental example.

According to the first experimental example, the emission of electrons from the electron emitter 12B was observed. Specifically, as shown in FIG. 65A, a write pulse Pw having a voltage of −70 V was applied to the electron emitter 12B to cause the electron emitter 12B to accumulate electrons, and thereafter a turn-on pulse Ph having a voltage of 280 V was applied to cause the electron emitter 12B to emit electrons. The emission of electrons was measured by detecting the light emission from the phosphor 170 with a light-detecting device (photodiode). The detected waveform is shown in FIG. 65B. The write pulse Pw and the turn-on pulse Ph had a duty cycle of 50%.

It can be seen from the first experimental example that light starts to be emitted on a positive-going edge of the turn-on pulse Ph and the light emission is finished in an initial stage of the turn-on pulse Ph. Therefore, it is considered that the light emission will not be affected by shortening the period of the turn-on pulse Ph. This period shortening will lead to a reduction in the period to which the high voltage is applied, resulting in a reduction in power consumption.

According to the second experimental example, how the amount of electrons emitted from the electron emitter 12B is changed by the amplitude of the write pulse Pw shown in FIG. 66 was observed. Changes in the amount of emitted electrons were measured by detecting the light emission from the phosphor 170 with a light-detecting device (photodiode), as with the first experimental example. The experimental results are shown in FIG. 67.

In FIG. 67, the solid-line curve A represents the characteristics at the time the turn-on pulse Ph had an amplitude of 200 V and the write pulse Pw had an amplitude changing from −10 V to −80 V, and the solid-line curve B represents the characteristics at the time the turn-on pulse Ph had an amplitude of 350 V and the write pulse Pw had an amplitude changing from −10 V to −80 V.

As illustrated in FIG. 67, when the write pulse Pw is changed from −20 V to −40 V, it can be understood that the light emission luminance changes substantially straightly. A comparison between the amplitudes 350 V and 200 V of the turn-on pulse Ph in particular indicates that a change in the light emission luminance in response to the write pulse Pw at the time the amplitude of the turn-on pulse Ph is 350 V has a wider dynamic range, which is advantageous for increased luminance. If the light source 10B according to the second embodiment is applied to a display, then the contrast of the display can be increased. This tendency appears to be more advantageous as the amplitude of the turn-on pulse Ph increases in a range until the light emission luminance is saturated with respect to the setting of the amplitude of the turn-on pulse Ph. It is preferable to set the amplitude of the turn-on pulse Ph to an optimum value in relation to the withstand voltage and power consumption of the signal transmission system.

According to the third experimental example, how the amount of electrons emitted from the electron emitter 12B is changed by the amplitude of the turn-on pulse Ph shown in FIG. 66 was observed. Changes in the amount of emitted electrons were measured by detecting the light emission from the phosphor 170 with a light-detecting device (photodiode), as with the first experimental example. The experimental results are shown in FIG. 68.

Figure 68:
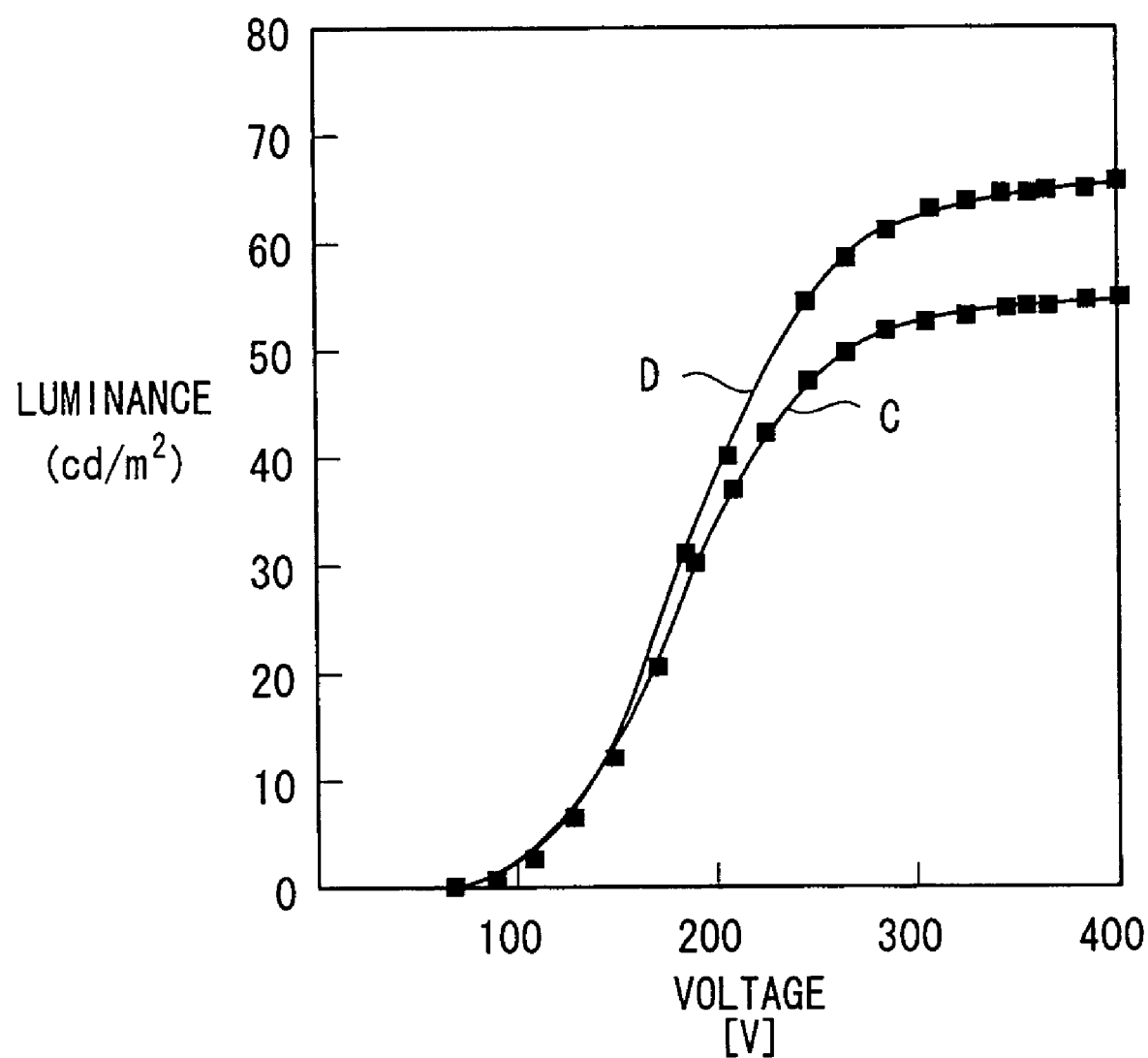
FIG. 68 is a characteristic diagram showing the results of a third experimental example (an experiment for observing how the amount of electrons emitted from the electron emitter changes depending on the amplitude of a turn-on pulse)

In FIG. 68, the solid-line curve C represents the characteristics at the time the write pulse Pw had an amplitude of −40 V and the turn-on pulse Ph had an amplitude changing from 50 V to 400 V, and the solid-line curve D represents the characteristics at the time the write pulse Pw had an amplitude of −70 V and the turn-on pulse Ph had an amplitude changing from 50 V to 400 V.

As illustrated in FIG. 68, when the turn-on pulse Ph is changed from 100 V to 300 V, it can be understood that the light emission luminance changes substantially straightly. A comparison between the amplitudes 40 V and −70 V of the write pulse Pw in particular indicates that a change in the light emission luminance in response to the turn-on pulse Ph at the time the amplitude of the write pulse Pw is −70 V has a wider dynamic range, which is advantageous for increased luminance and also increased contrast if the light source 10B is applied to a display. This tendency appears to be more advantageous as the amplitude (in this case, the absolute value) of the write pulse Pw increases in a range until the light emission luminance is saturated with respect to the setting of the amplitude of the write pulse Pw. It is preferable also in this case to set the amplitude (absolute value) of the write pulse Pw to an optimum value in relation to the withstand voltage and power consumption of the signal transmission system.

According to the fourth experimental example, how the amount of electrons emitted from the electron emitter 12B is changed by the level of the collector voltage Vc shown in FIG. 63 or 64 was observed. Changes in the amount of emitted electrons were measured by detecting the light emission from the phosphor 170 with a light-detecting device (photodiode), as with the first experimental example. The experimental results are shown in FIG. 69.

Figure 69:
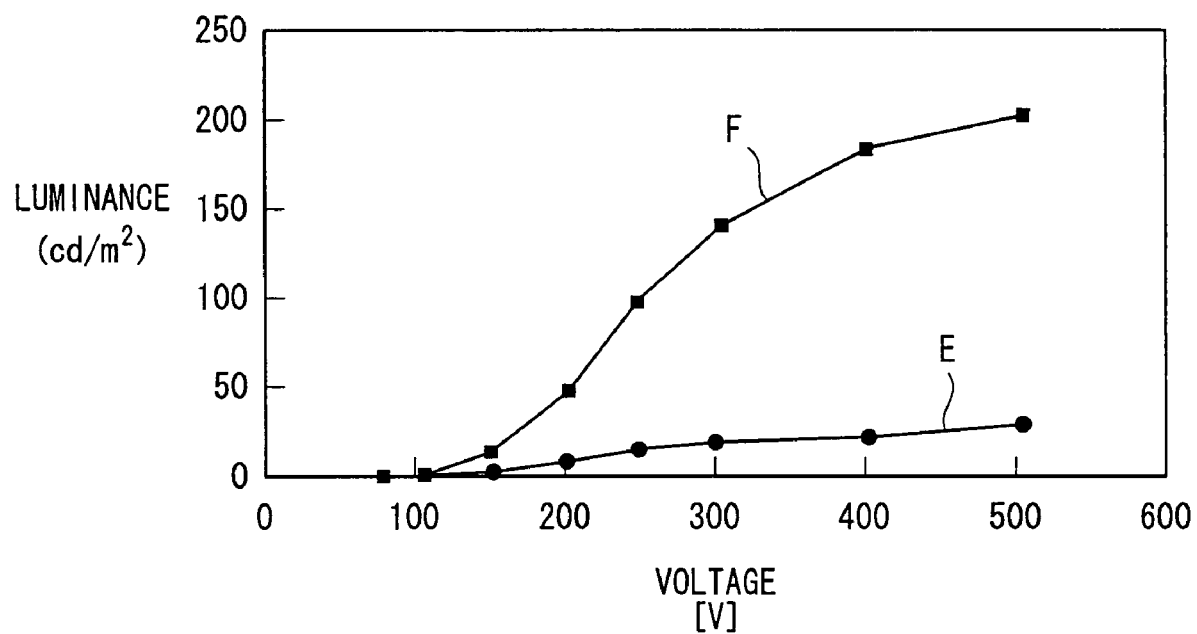
FIG. 69 is a characteristic diagram showing the results of a fourth experimental example (an experiment for observing how the amount of electrons emitted from the electron emitter changes depending on the level of a collector voltage)

In FIG. 69, the solid-line curve E represents the characteristics at the time the level of the collector voltage Vc was 3 kV and the amplitude of the turn-on pulse Ph was changed from 80 V to 500 V, and the solid-line curve F represents the characteristics at the time the level of the collector voltage Vc was 7 kV and the amplitude of the turn-on pulse Ph was changed from 80 V to 500 V.

As illustrated in FIG. 69, it can be understood that a change in the light emission luminance in response to the turn-on pulse Ph has a wider dynamic range when the collector voltage Vc is 7 kV than when the collector voltage Vc is 3 kV, which is advantageous for increased luminance and also increased contrast if the light source 10B is applied to a display. This tendency appears to be more advantageous as the level of the collector voltage Vc increases. It is preferable also in this case to set the level of the collector voltage Vc to an optimum value in relation to the withstand voltage and power consumption of the signal transmission system.

Figure 70:
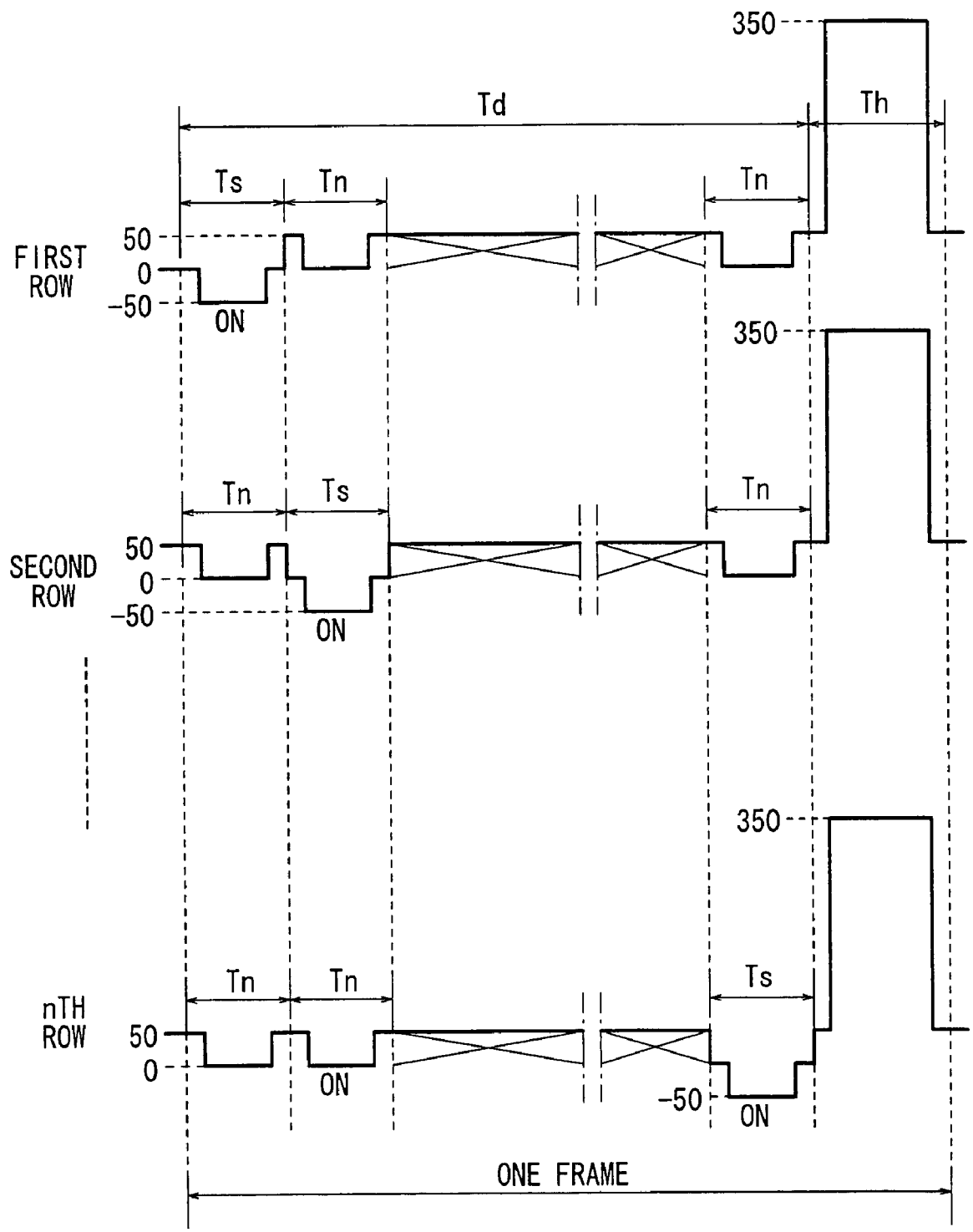
FIG. 70 is a timing chart illustrative of a drive method for the light source.

A drive method for the light source 10B according to the second embodiment will be described below with reference to FIGS. 70 and 71. FIG. 70 shows operation of pixels in the first row and the first column, the second row and the first column, and the nth row and the first column. An electron emitter 12A used in the drive method has such characteristics that the coercive voltage v1 at the point p2 shown in FIG. 55 is −20 V, for example, the coercive voltage v2 at the point p5 is +70 V, the voltage v3 at the point p3 is −50 V, and the voltage v4 at the point p4 is +50 V.

As shown in FIG. 70, if the period in which to select all the rows is defined as one frame, then one charge accumulation period Td and one light emission period Th are included in one frame, and n selection periods Ts are included in one charge accumulation period Td. Since each selection period Ts becomes a selection period Ts for a corresponding row, it becomes a non-selection period Tn for non-corresponding n-1 rows.

According to the drive method, all the electron emitters 12B are scanned in the charge accumulation period Td, and voltages depending on the luminance levels of corresponding pixels to be turned on (to emit light) are applied to a plurality of electron emitters 12B which correspond to light-emitting devices to be turned on, thereby accumulating charges (electrons) in amounts depending on the luminance levels of the corresponding light-emitting devices in the electron emitters 12B which correspond to the light-emitting devices to be turned on. In the next light emission period Th, a constant voltage is applied to all the electron emitters 12B to cause the electron emitters 12B which correspond to the light-emitting devices to be turned on to emit electrons in amounts depending on the luminance levels of the corresponding light-emitting devices, thereby emitting light from the light-emitting devices to be turned on.

More specifically, as also shown in FIG. 71, in the selection period Ts for the first row, a selection signal Ss of 50 V, for example, is supplied to the row selection line 144 of the first row, and a non-selection signal Sn of 0 V, for example, is applied to the row selection lines 144 of the other rows. A data signal Sd supplied to the signal lines 146 of the light-emitting devices to be turned on (to emit light) of all the pixels of the first row has a voltage in the range from 0 V to 30 V, depending on the luminance levels of the corresponding light-emitting devices. If the luminance level is maximum, then the voltage of the data signal Sd is 0 V. The data signal Sd is modulated depending on the luminance level by the amplitude modulating circuit 160 shown in FIG. 58 or the pulse width modulating circuit 164 shown in FIG. 60.

Thus, a voltage ranging from −50 V to −20 V depending on the luminance level is applied between the upper and lower electrodes 18, 20 of the electron emitter 12B which corresponds to each of the light-emitting devices to be turned on in the first row. As a result, each electron emitter 12B accumulates electrons depending on the applied voltage. For example, the electron emitter 12B corresponding to the light-emitting device in the first row and the first column is in a state at the point p3 shown in FIG. 55 as the luminance level of the pixel is maximum, and the portion of the emitter 22 which is exposed through the through region 102 of the upper electrode 18 accumulates a maximum amount of electrons.

A data signal Sd supplied to the electron emitters 12B which correspond to light-emitting devices to be turned off (to extinguish light) has a voltage of 50 V, for example. Therefore, a voltage of 0 V is applied to the electron emitters 12B which correspond to light-emitting devices to be turned off, bringing those electron emitters 12B into a state at the point p1 shown in FIG. 55, so that no electrons are accumulated in those electron emitters 12B.

After the supply of the data signal Sd to the first row is finished, in the selection period Ts for the second row, a selection signal Ss of 50 V is supplied to the row selection line 144 of the second row, and a non-selection signal Sn of 0 V is applied to the row selection lines 144 of the other rows. In this case, a voltage ranging from −50 V to −20 V depending on the luminance level is also applied between the upper and lower electrodes 18, 20 of the electron emitter 12B which corresponds to each of the light-emitting devices to be turned on. At this time, a voltage ranging from 0 V to 50 V is applied between the upper and lower electrodes 18, 20 of the electron emitter 12B which corresponds to each of unselected light-emitting devices in the first row, for example. Since this voltage is of a level not reaching the point 4 in FIG. 55, no electrons are emitted from the electron emitters 12B which correspond to the light-emitting devices to be turned on in the first row. That is, the unselected light-emitting devices in the first row are not affected by the data signal Sd that is supplied to the selected light-emitting devices in the second row.

Similarly, in the selection period Ts for the nth row, a selection signal Ss of 50 V is supplied to the row selection line 144 of the nth row, and a non-selection signal Sn of 0 V is applied to the row selection lines 144 of the other rows. In this case, a voltage ranging from −50 V to −20 V depending on the luminance level is also applied between the upper and lower electrodes 18, 20 of the electron emitter 12B which corresponds to each of the light-emitting devices to be turned on. At this time, a voltage ranging from 0 V to 50 V is applied between the upper and lower electrodes 18, 20 of the electron emitter 12B which corresponds to each of unselected light-emitting devices in the first through (n-1)th rows. However, no electrons are emitted from the electron emitters 12B which correspond to the light-emitting devices to be turned on, of those unselected light-emitting devices.

Figure 57C:
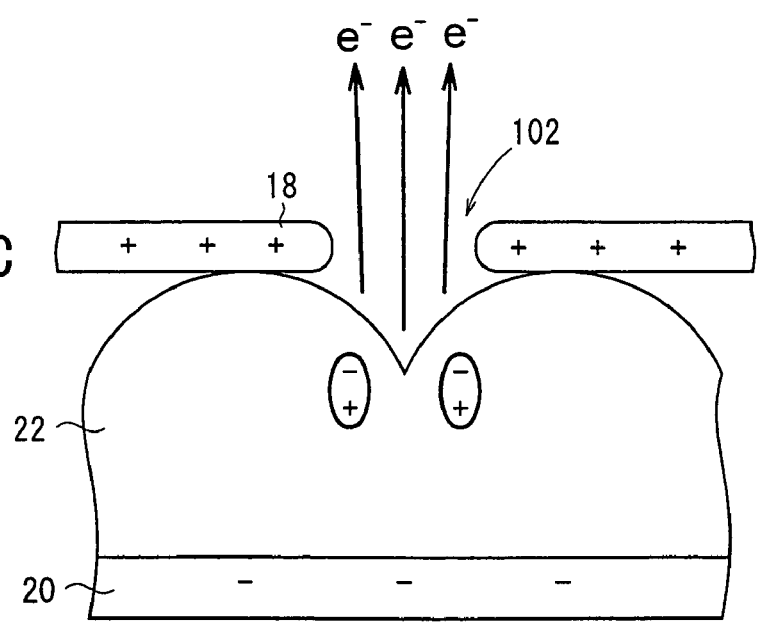
FIG. 57C is a view illustrative of a state from the point p4 to a point p6 shown in FIG. 55.

After elapse of the selection period Ts for the nth row, it is followed by the light emission period Th. In the light emission period Th, a reference voltage (e.g., 0 V) is applied from the signal supplying circuit 150 to the upper electrodes 18 of all the electron emitters 12B, and a voltage of −350 V (the sum of the voltage of −400 V from the pulse power supply 156 and the power supply voltage 50 V from the row selecting circuit 148) is applied to the lower electrodes 20 of all the electron emitters 12B. Thus, a high voltage (+350 V) is applied between the upper and lower electrodes 18, 20 of all the electron emitters 12B. All the electron emitters 12B are now brought into a state at the point p6 shown in FIG. 55. As shown in FIG. 57C, electrons are emitted from the portion of the emitter 22 where the electrons have been accumulated, through the through region 102. Electrons are also emitted from near the outer peripheral portion of the upper electrode 18.

Electrons are thus emitted from the electron emitters 12B which correspond to the light-emitting devices to be turned on, and the emitted electrons are led to the collector electrodes 168 which correspond to those electron emitters 12B, exciting the corresponding phosphors 170 which emit light. The emitted light is radiated out through the surface of the transparent plate 166.

Subsequently, electrons are accumulated in the electron emitters 12B which correspond to the light-emitting devices to be turned on (to emit light) in the charge accumulation period Td, and the accumulated electrons are emitted for fluorescent light emission in the light emission period Th, for thereby radiating emitted light through the surface of the transparent plate 166.

With the light source 10B according to the second embodiment, all the electron emitters 12B are scanned in the charge accumulation period Td in one frame, and voltages depending on the luminance levels of corresponding light-emitting devices are applied to electron emitters 12B corresponding to the light-emitting devices to be turned on, thereby accumulating amounts of charges depending on the luminance levels of corresponding light-emitting devices in the electron emitters 12B corresponding to the light-emitting devices to be turned on. In the next light emission period Th, a constant voltage is applied to all the electron emitters 12B to cause a plurality of electron emitters 12B which correspond to the light-emitting devices to be turned on to emit electrons in amounts depending on the luminance levels of the corresponding light-emitting devices, thereby emitting light from the light-emitting devices to be turned on.

With the electron emitter 12B used in the light source 10B according to the second embodiment, the voltage V3 at which the accumulation of electrons is saturated and the voltage V4 at which electrons start being emitted satisfy the following relationship:

$1 \leq |V4|/|V3| \leq 1.5$

Usually, if the electron emitters 12B are arranged in a matrix, and when a row of electron emitters 12B is selected at a time in synchronism with a horizontal scanning period and the selected electron emitters 12B are supplied with a data signal Sd depending on the luminance levels of the light-emitting devices, the data signal Sd is also supplied to the unselected light-emitting devices.

If the unselected electron emitters 12B emit electrons, for example, in response to the supplied data signal Sd, then the luminance of the light source 10B tends to suffer irregularities.

Since the electron emitter 12B has the above characteristics, however, even if a simple voltage relationship is employed such that the voltage level of the data signal Sd supplied to the selected electron emitters 12B is set to an arbitrary level from the reference voltage to the voltage V3, and a signal which is opposite in polarity to the data signal Sd, for example, is supplied to the unselected electron emitters 12B, the unselected light-emitting devices are not affected by the data signal Sd supplied to the selected light-emitting devices. That is, the amount of electrons accumulated by each electron emitter 12B (the amount of charges in the emitter 22 of each electron emitter 12B) in the selection period Ts is maintained until electrons are emitted in the next light emission period Th. As a result, each electron emitter 12B realizes a memory effect for higher luminance and higher contrast.

With the light source 10B according to the second embodiment, necessary charges are accumulated in all the electron emitters 12B in the charge accumulation period Td, and a voltage required to emit electrons is applied to all the electron emitters 12B in the subsequent light emission period Th to cause a plurality of electron emitters 12B corresponding to light-emitting devices to be turned on to emit electrons thereby to emit light from the light-emitting devices to be turned on.

Usually, if light-emitting devices are constructed of the electron emitters 12B, then it is necessary to apply a high voltage to the electron emitters 12B in order to emit light from the light-emitting devices. For accumulating charges when the light-emitting devices are scanned and emitting light from the light-emitting devices, it is necessary to apply a high voltage throughout a period (e.g., one frame) for emitting light from one light-emitting device, resulting in large electric power consumption. It is also necessary that the circuit for selecting the electron emitters 12B and supplying the data signal Sd be a circuit compatible with the high voltage.

In the present embodiment, after charges are accumulated in all the electron emitters 12B, a voltage is applied to all the electron emitters 12B to emit light from light-emitting devices corresponding to those electron emitters 12B which are to be turned on.

Therefore, the period Th for applying the voltage (emission voltage) for electron emission to all the electron emitters 12B is naturally shorter than one frame. Furthermore, since the period for applying the emission voltage can be shortened as can be seen from the first experimental example shown in FIGS. 65A and 65B, the electric power consumption can be much smaller than if charges are accumulated and light is emitted when the light-emitting devices are scanned.

Since the period Td in which charges are accumulated in the electron emitters 12B and the period Th in which electrons are emitted from the electron emitters 12B corresponding to the light-emitting devices to be turned on are separate from each other, the circuit for applying voltages depending on luminance levels to the electron emitters 12B can be driven at a lower voltage.

The data signal Sd and the selection signal Ss/non-selection signal Sn in the charge accumulation period Td need to be applied to each row or column. Since the drive voltage may be of several tens volts as can be seen in the above embodiments, an inexpensive multi-output driver for use with fluorescent display tubes or the like can be used. In the light emission period Th, the voltage for emitting sufficient electrons is possibly higher than the drive voltage. However, because all light-emitting devices to be turned on may be driven altogether, multi-output circuit components are not necessary. For example, a drive circuit having one output and constructed of discrete components of a high withstand voltage is sufficient, the light source may be inexpensive and may be of a small circuit scale. The drive voltage and discharge voltage may be lowered by reducing the film thickness of the emitter 22. The drive voltage may be set to several volts by setting the film thickness of the emitter 22.

According to the present drive method, furthermore, electrons are emitted in the second stage from all the light-emitting devices, independent of the row scanning, separately from the first stage based on the row scanning. Consequently, the light emission time can easily be maintained for increased luminance irrespective of the resolution and the screen size.

Various modifications of the electron emitter 12B used in the light source 10B according to the second embodiment will be described below with reference to FIGS. 72 through 77.

Figure 72:
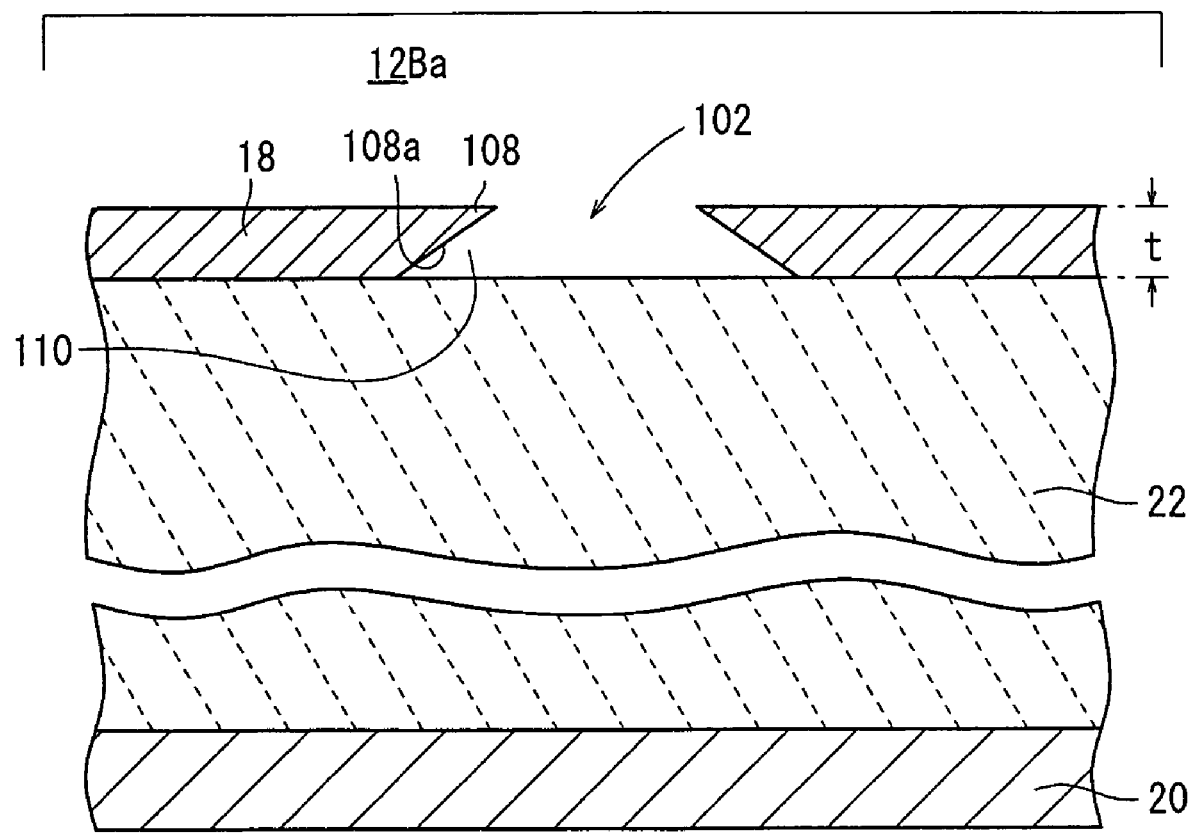
FIG. 72 is a fragmentary cross-sectional view of an electron emitter according to a first modification which can be used in the light source according to the second embodiment.

As shown in FIG. 72, an electron emitter 12Ba according to a first modification has essentially the same structure as the electron emitter 12B described above, and resides in that the upper electrode 18 is made of the same material as the lower electrode 20, the upper electrode 18 has a thickness t greater than 10 μm, and the through region 102 is artificially formed by etching (wet etching or dry etching), lift-off, and a laser beam. The through region 102 may be shaped as the hole 114, the recess 128, or the slit 132, as with the electron emitter 12B described above.

The peripheral portion 108 of the upper electrode 18 has a lower surface 108a slanted gradually upwardly toward the center of the peripheral portion 108 of the through region 102. The shape of the peripheral portion 108 can easily be formed by lift-off, for example.

The light source 10B which employs the electron emitter 12Ba according to the first modification, as with the electron emitter 12B described above, is capable of easily developing a high electric field concentration, provides many electron emission regions, has a larger output and higher efficiency of the electron emission, and can be driven at a lower voltage (lower power consumption).

Figure 73:
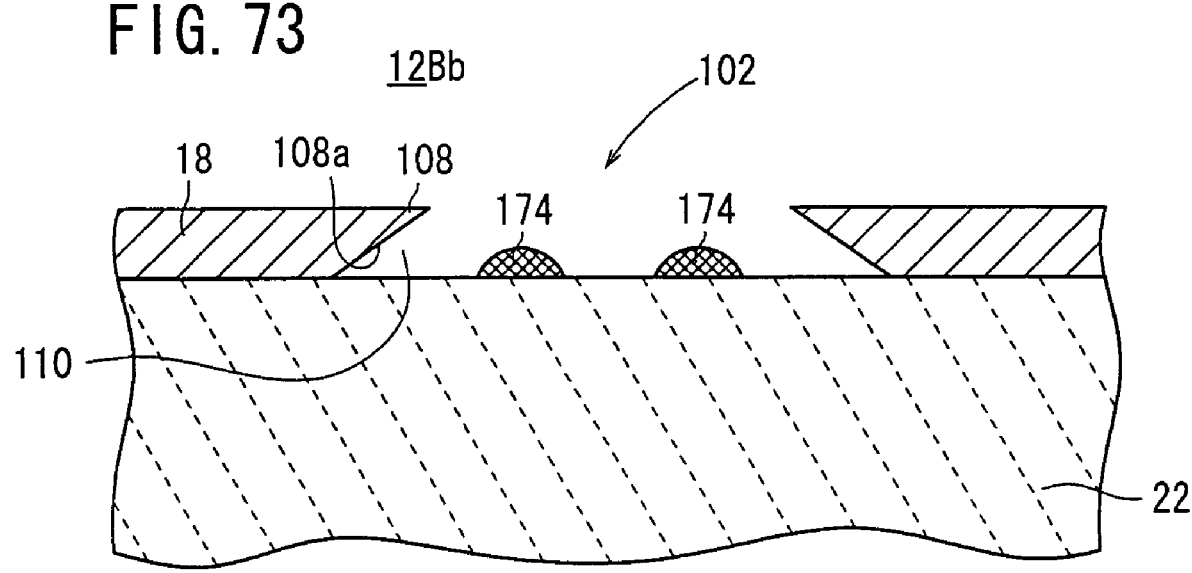
FIG. 73 is a fragmentary cross-sectional view of an electron emitter according to a second modification which can be used in the light source according to the second embodiment.

FIG. 73 shows an electron emitter 12Bb according to a second modification. The electron emitter 12Bb has floating electrodes 174 which are present on the portion of the upper surface of the emitter 22 which corresponds to the through region 102.

Figure 74:
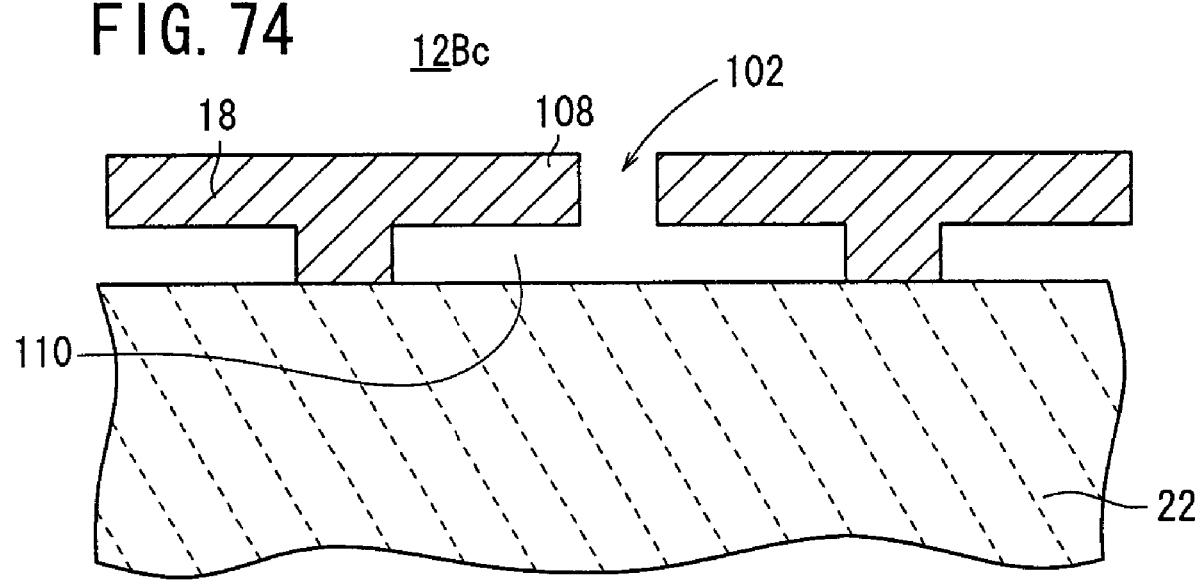
FIG. 74 is a fragmentary cross-sectional view of an electron emitter according to a third modification which can be used in the light source according to the second embodiment.

FIG. 74 shows an electron emitter 12Bc according to a third modification. The electron emitter 12Bc has upper electrodes 18 each having a substantially T-shaped cross section.

Figure 75:
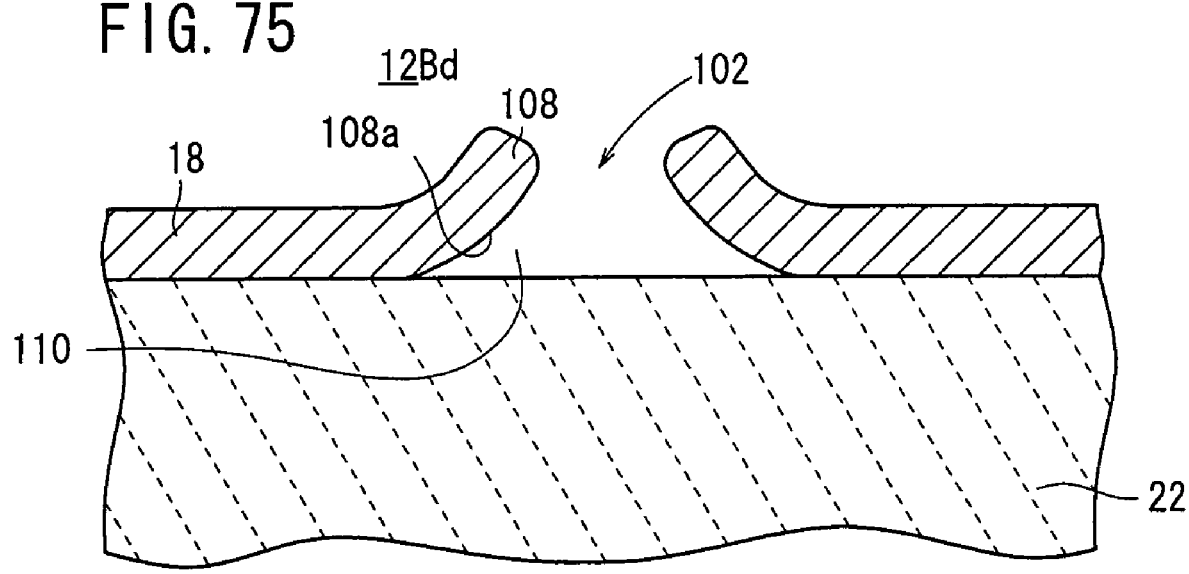
FIG. 75 is a fragmentary cross-sectional view of an electron emitter according to a fourth modification which can be used in the light source according to the second embodiment.

FIG. 75 shows an electron emitter 12Bd according to a fourth modification. The electron emitter 12Bd has an upper electrode 18 including a lifted peripheral portion 108 of a through region 102. To produce such a shape, the film material of the upper electrode 18 contains a material which will be gasified in the baking process. In the process, the material is gasified, forming a number of through regions 102 in the upper electrode 18 and lifting the peripheral portions 108 of the through regions 102.

An electron emitter 12Be according to a fifth modification will be described below with reference to FIG. 76.

Figure 76:
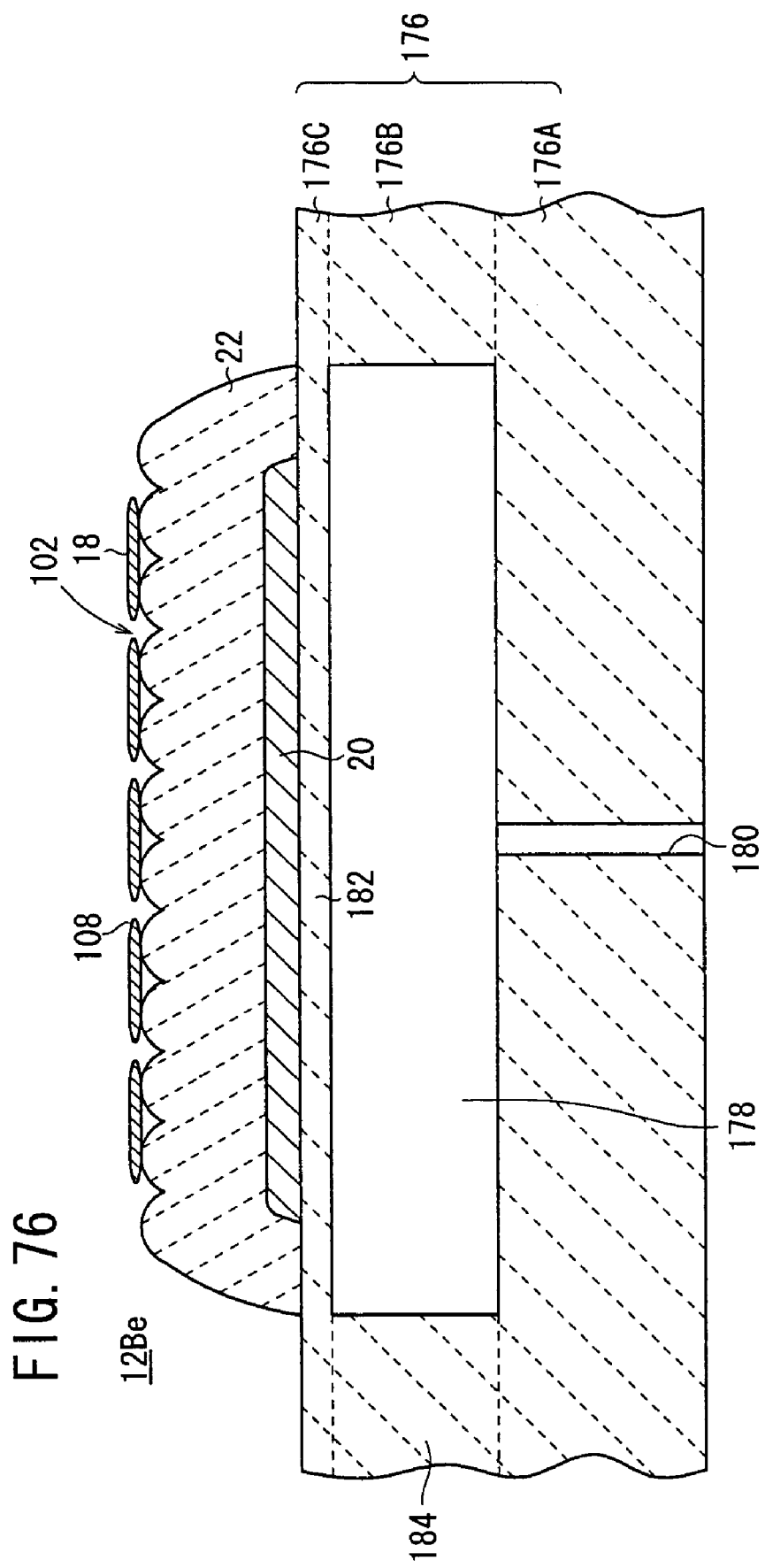
FIG. 76 is a fragmentary cross-sectional view of an electron emitter according to a fifth modification which can be used in the light source according to the second embodiment.

As shown in FIG. 76, the electron emitter 12Be according to the fifth modification has essentially the same structure as the electron emitter 12B described above, but differs therefrom in that it has a single substrate 176 of ceramics, a lower electrode 20 formed on the substrate 176, an emitter 22 formed on the substrate 176 in covering relation to the lower electrode 20, and an upper electrode 18 formed on the emitter 22.

The substrate 176 has a cavity 178 defined therein at a position aligned with the emitter 22 to form a thinned portion to be described below. The cavity 178 communicates with the exterior through a through hole 180 having a small diameter which is defined in the other end of the substrate 176 remote from the emitter 22.

The portion of the substrate 176 below which the cavity 178 is defined is thinned (hereinafter referred to as "thinned portion 182"). The other portion of the substrate 176 is thicker and functions as a fixed section 184 for supporting the thinned portion 182.

The substrate 176 comprises a laminated assembly of a substrate layer 176A as a lowermost layer, a spacer layer 176B as an intermediate layer, and a thin layer 176C as an uppermost layer. The laminated assembly may be regarded as an integral structure with the cavity 178 defined in the portion of the spacer layer 176B which is aligned with the emitter 22. The substrate layer 176A functions as a stiffening substrate and also as a wiring substrate. The substrate 176 may be formed by integrally baking the substrate layer 176A, the spacer layer 176B, and the thin layer 176C, or may be formed by bonding the substrate layer 176A, the spacer layer 176B, and the thin layer 176C together.

The thinned portion 182 should preferably be made of a highly heat-resistant material. The reason for this is that if the thinned portion 182 is directly supported by the fixed section 184 without using a heat-resistant material such as an organic adhesive or the like, the thinned portion 182 is not be modified at least when the emitter 22 is formed.

The thinned portion 182 should preferably be made of an electrically insulating material in order to electrically isolate interconnects connected to the upper electrode 18 formed on the substrate 176 and interconnects connected to the lower electrode 20 formed on the substrate 176.

The thinned portion 182 may thus be made of a material such as an enameled material where a highly heat-resistant metal or its surface is covered with a ceramic material such as glass or the like. However, ceramics is optimum as the material of the thinned portion 182.

The ceramics of the thinned portion 182 may be stabilized zirconium oxide, aluminum oxide, magnesium oxide, titanium oxide, spinel, mullite, aluminum nitride, silicon nitride, glass, or a mixture thereof. Of these materials, aluminum oxide and stabilized zirconium oxide are particularly preferable because they provide high mechanical strength and high rigidity. Stabilized zirconium oxide is particularly suitable because it has relatively high mechanical strength, relatively high tenacity, and causes a relatively small chemical reaction with the upper electrode 18 and the lower electrode 20. Stabilized zirconium oxide includes both stabilized zirconium oxide and partially stabilized zirconium oxide. Stabilized zirconium oxide does not cause a phase transition because it has a crystalline structure such as a cubic structure or the like.

Zirconium oxide causes a phase transition between a monoclinic structure and a tetragonal structure at about 1000° C., and may crack upon such a phase transition.

Stabilized zirconium oxide contains 1–30 mol % of calcium oxide, magnesium oxide, yttrium oxide, scandium oxide, ytterbium oxide, cerium oxide, or an oxide of a rare earth metal. The stabilizer should preferably contain yttrium oxide for increasing the mechanical strength of the substrate 176. The stabilizer should preferably contain 1.5 to 6 mol % of yttrium oxide, or more preferably 2 to 4 mol % of yttrium oxide, and furthermore should preferably contain 0.1 to 5 mol % of aluminum oxide.

The crystalline phase of stabilized zirconium oxide may be a mixture of cubic and monoclinic systems, a mixture of tetragonal and monoclinic systems, or a mixture of cubic, tetragonal and monoclinic systems. Particularly, a mixture of cubic and monoclinic systems or a mixture of tetragonal and monoclinic systems is most preferable from the standpoint of strength, tenacity, and durability.

If the substrate 176 is made of ceramics, then it is constructed of relatively many crystal grains. In order to increase the mechanical strength of the substrate 176, the average diameter of the crystal grains should preferably be in the range from 0.05 to 2 μm and more preferably in the range from 0.1 to 1 μm.

The fixed section 184 should preferably be made of ceramics. The fixed section 184 may be made of ceramics which is the same as or different from the ceramics of the thinned portion 182. As with the material of the thinned portion 182, the ceramics of the fixed section 184 may be stabilized zirconium oxide, aluminum oxide, magnesium oxide, titanium oxide, spinel, mullite, aluminum nitride, silicon nitride, glass, or a mixture thereof.

The substrate 176 used in the electron emitter 12Be is made of a material containing zirconium oxide as a chief component, a material containing aluminum oxide as a chief component, or a material containing a mixture of zirconium oxide and aluminum oxide as a chief component. Particularly preferable is a material chiefly containing zirconium oxide.

Clay or the like may be added as a sintering additive. Components of such a sintering additive need to be adjusted so that the sintering additive does not contain excessive amounts of materials which can easily be vitrified, e.g., silicon oxide, boron oxide, etc. This is because while these easily vitrifiable materials are advantageous in joining the substrate 176 to the emitter 22, they promote a reaction between the substrate 176 and the emitter 22, making it difficult to keep the desired composition of the emitter 22 and resulting in a reduction in the device characteristics.

Specifically, the easily vitrifiable materials such as silicon oxide in the substrate 176 should preferably be limited to 3% by weight or less or more preferably to 1% by weight or less. The chief component referred to above is a component which occurs at 50% by weight or more.

The thickness of the thinned portion 182 and the thickness of the emitter 22 should preferably be of substantially the same level. If the thickness of the thinned portion 182 were extremely larger than the thickness of the emitter 22 by at least ten times, then since the thinned portion 182 would work to prevent the emitter 22 from shrinking when it is baked, large stresses would be developed in the interface between the emitter 22 and the substrate 176, making the emitter 22 easy to peel off the substrate 176. If the thickness of the thinned portion 182 is substantially the same as the thickness of the emitter 22, the substrate 176 (the thinned portion 182) is easy to follow the emitter 22 as it shrinks when it is baked, allowing the substrate 176 and the emitter 22 to be appropriately combined with each other. Specifically, the thickness of the thinned portion 182 should preferably be in the range from 1 to 100 μm, more particularly in the range from 3 to 50 μm, and even more particularly in the range from 5 to 20 μm. The thickness of the emitter 22 should preferably be in the range from 5 to 100 μm, more particularly in the range from 5 to 50 μm, and even more particularly in the range from 5 to 30 μm.

The emitter 22 may be formed on the substrate 176 by any of various thick-film forming processes including screen printing, dipping, coating, electrophoresis, aerosol deposition, etc., or any of various thin-film forming processes including an ion beam process, sputtering, vacuum evaporation, ion plating, chemical vapor deposition (CVD), plating, etc. Particularly, it is preferable to form a powdery piezoelectric/electrostrictive material as the emitter 22 and impregnate the emitter 22 thus formed with glass of a low melting point or sol particles. According to this process, it is possible to form a film at a low temperature of 700° C. or lower or 600° C. or lower.

The material of the lower electrode 20, the material of the emitter 22, and the material of the upper electrode 18 may be successively be stacked on the substrate 176, and then baked into an integral structure as the electron emitter 12Be. Alternatively, each time the lower electrode 20, the emitter 22, or the upper electrode 18 is formed, the assembly may be heated (sintered) into an integral structure. Depending on how the upper electrode 18 and the lower electrode 20 are formed, however, the heating (sintering) process for producing an integral structure may not be required.

The sintering process for integrally combining the substrate 176, the emitter 22, the upper electrode 18, and the lower electrode 20 may be carried out at a temperature ranging from 500° to 1400° C., preferably from 1000° to 1400° C. For heating the emitter 22 which is in the form of a film, the emitter 22 should preferably be sintered together with its evaporation source while their atmosphere is being controlled, so that the composition of the emitter 22 will not become unstable at high temperatures.

The emitter 22 may be covered with a suitable member, and then sintered such that the surface of the emitter 22 will not be exposed directly to the sintering atmosphere. In this case, the covering member should preferably be of the same material as the substrate 176.

With the electron emitter 12Be according to the fifth modification, the emitter 22 shrinks when baked. However, stresses produced when the emitter 22 shrinks are released when the cavity 178 is deformed, the emitter 22 can sufficiently be densified. The densification of the emitter 22 increases the withstand voltage and allows the emitter 22 to carry out the polarization inversion and the polarization change efficiently, resulting in improved characteristics of the electron emitter 12Be.

Figure 77:
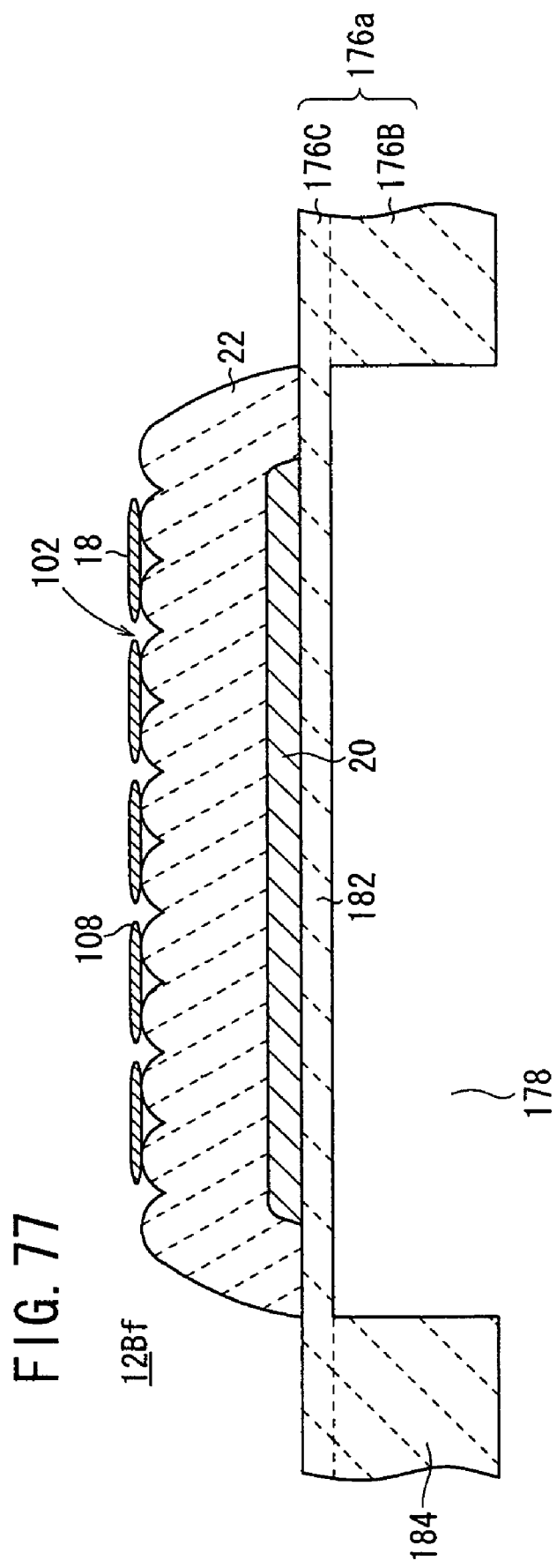
FIG. 77 is a fragmentary cross-sectional view of an electron emitter according to a sixth modification which can be used in the light source according to the second embodiment.

According to the fifth modification, the substrate 176 comprises a three-layer substrate. FIG. 77 shows an electron emitter 12Bf according to a sixth modification which has a two-layer substrate 176a which is free of the lowermost substrate layer 176A.

As with the light source 10Ac according to the third modification shown in FIG. 16, the light source 10B according to the second embodiment may have its light emission section 14B divided into two groups (first and second groups G1, G2). When the electron emitters 12B in the group G1 emit light, the electron emitters 12B in the group G2 may retrieve electric power of the electron emitters 12B in the group G1, and when the electron emitters 12B in the group G2 emit light, the electron emitters 12B in the group G1 may retrieve electric power of the electron emitters 12A in the group G2.

As with the light source 10Ae according to the fifth modification shown in FIG. 29, the light source 10B according to the second embodiment may have two or more planar light source sections Z1 through Z6. In the fifth modification shown in FIG. 29, the light source 10Ae has six planar light source sections Z1 through Z6. Each of the planar light source sections Z1 through Z6 has a two-dimensional array of electron emitters 12B, and drive circuits 16B are independently connected to the respective planar light source sections Z1 through Z6.

Each of the planar light source sections Z1 through Z6 can be controlled for energization/de-energization to perform stepwise light control (digital light control). Particularly, if the drive circuits 16B independently connected respectively to the planar light source sections Z1 through Z6 have modulation circuits 60 (see FIG. 18), then the light emission distributions of the planar light source sections Z1 through Z6 can independently be controlled. That is, the light source 10B can perform analog light control as well as digital light control for fine light control applications.

As with the light source 10Af according to the sixth modification shown in FIG. 30, the light source 10B according to the second embodiment may include first and sixth planar light source sections Z1, Z6 which are of a horizontally long rectangular shape with long sides, second and fifth planar light source sections Z2, Z5 which are of a vertically long rectangular shape with long sides shorter than the long sides of the first and sixth planar light source sections Z1, Z6, and third and fourth planar light source sections Z3, Z4 which are of a horizontally long rectangular shape with long sides shorter than the long sides of the first and sixth planar light source sections Z1, Z6.

As with the light source 10Ag according to the seventh modification shown in FIG. 31, the light source 10B according to the second embodiment may have first through sixth light source sections Z1 through Z6, and the electron emitters 12A in each of the first through sixth light source sections Z1 through Z6 may be divided into two groups (first and second groups G1, G2). In each of the first through sixth light source sections Z1 through Z6, when the electron emitters 12B in the group G1 emit light, the electron emitters 12B in the group G2 may retrieve electric power of the electron emitters 12B in the group G1, and when the electron emitters 12B in the group G2 emit light, the electron emitters 12B in the group G1 may retrieve electric power of the electron emitters 12B in the group G2.

As with the light source 10Ah according to the eighth modification shown in FIG. 32, the light source 10B according to the second embodiment may have first through sixth light source sections Z1 through Z6, and the first through sixth light source sections Z1 through Z6 may be divided into two groups (first and second groups G1, G2). When the electron emitters 12B in the planar light source sections Z1 through Z3 in the group G1 emit light, the electron emitters 12B in the planar light source sections Z4 through Z6 in the group G2 may retrieve electric power of the electron emitters 12B in the group G1, and when the electron emitters 12B in the planar light source sections Z4 through Z6 in the group G2 emit light, the electron emitters 12B in the planar light source sections Z1 through Z3 in the group G1 may retrieve electric power of the electron emitters 12B in the group G2.

The light source 10B according to the second embodiment may have the structure of any of the light sources 10Ai through 10Am according to the ninth through thirteenth modifications shown in FIGS. 33 through 37.

The light source 10A according to the first embodiment (including various modifications) and the light source 10B according to the second embodiment (including various modifications) offer the following advantages:

(1) Since the light source can produce higher luminance and consume lower electric power, it is optimum for use as projector light sources which are required to have a luminance level of 2000 lumens.

(2) Because the light source can easily provide a high-luminance two-dimensional array light source, can be operated in a wide temperature range, and have their light emission efficiency unchanged in outdoor environments, it is promising as an alternative of LEDs. For example, the light source is optimum as an alternative of two-dimensional array LED modules for traffic signal devices. At 25° C. or higher, LEDs have an allowable current lowered and produce low luminance.

(3) Since a planar light source comprising a two-dimensional array of electron emitters can be turned on/off emitter by emitter, it is preferable for use in applications where portions of a light emission area are turned on/off. Furthermore, because the planar light source can instantaneously be turned on, it requires no time for warming up. If the planar light source is used as the backlight of liquid crystal display, then the quality of moving images displayed thereby can be improved (moving image blurring can be improved) by high-speed blinking.

A preferred structure fabricated as a planar light source, i.e., a light source 10C according to a third embodiment, will be described below with reference to FIGS. 78 through 81.

Figure 78:
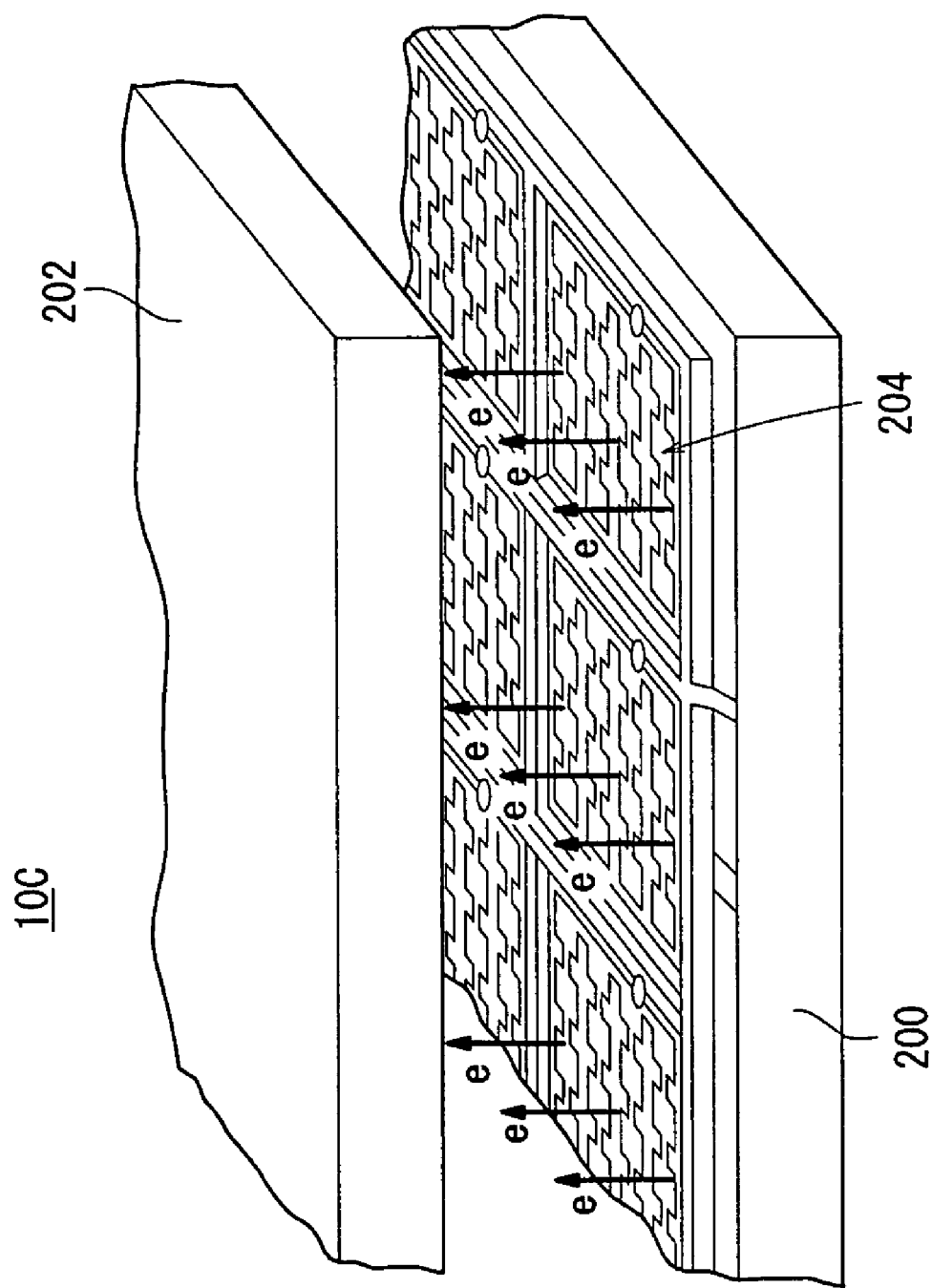
FIG. 78 is a fragmentary perspective view of a light source according to a third embodiment of the present invention.

As shown in FIG. 78, the light source 10C according to the third embodiment has a rear glass substrate 200 and a front glass substrate 202 having a plate surface disposed in facing relation to a principal surface of the rear glass substrate 200. The plate surface of the front glass substrate 202 is coated with a white phosphor (not shown). A two-dimensional array of electron emitters 12B as shown in FIG. 38, for example, is disposed on the principal surface of the rear glass substrate 200. A vacuum is developed between the rear glass substrate 200 and the front glass substrate 202.

Figure 79:
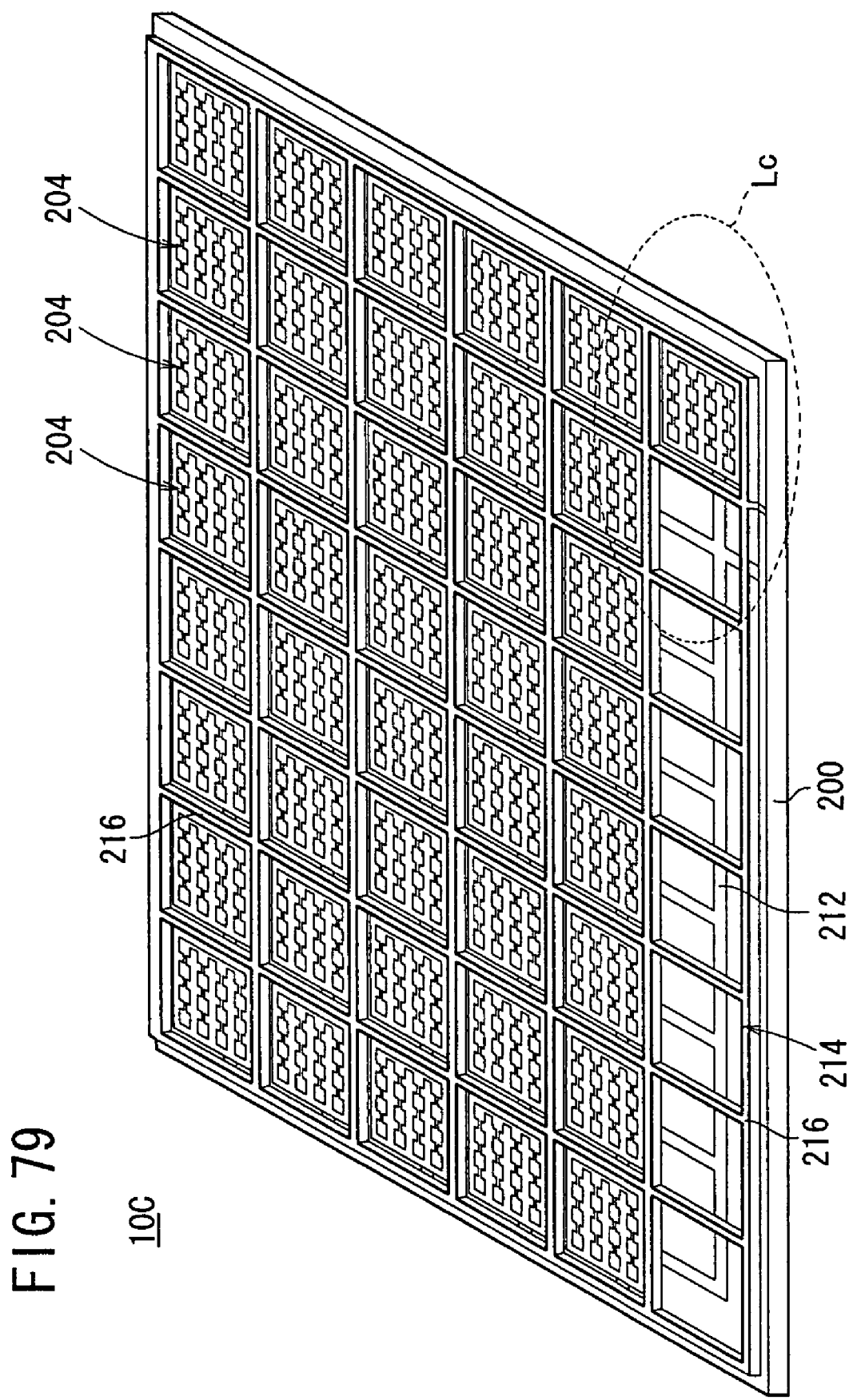
FIG. 79 is a perspective view of an array of electron emission units in the light source according to the third embodiment.

As shown in FIG. 79, the electron emitters 12B may comprise a two-dimensional array of rectangular electron emission units 204 (described later).

Figure 80:
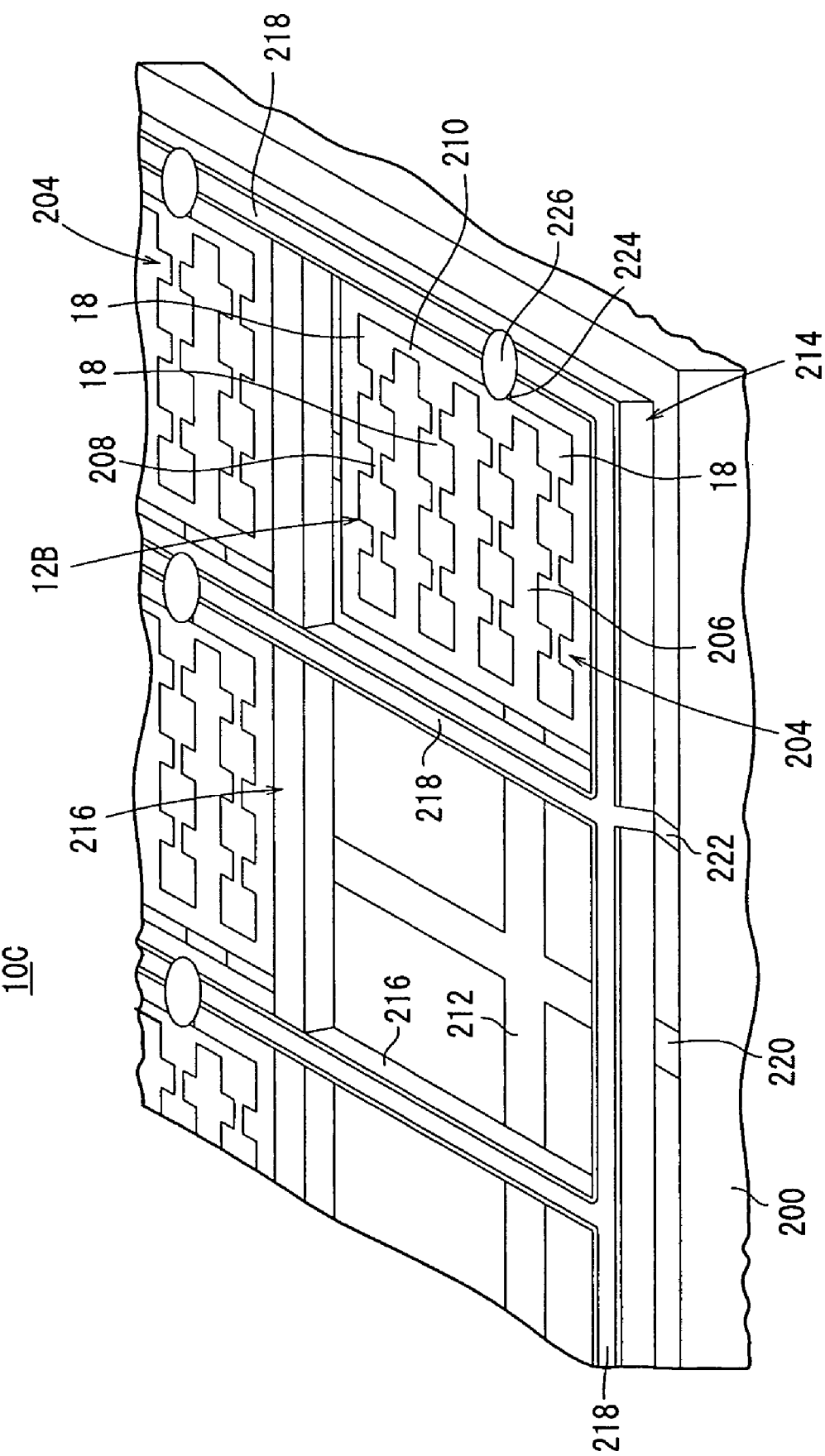
FIG. 80 is an enlarged fragmentary perspective view of an encircled portion Lc in FIG. 79.
Figure 81:
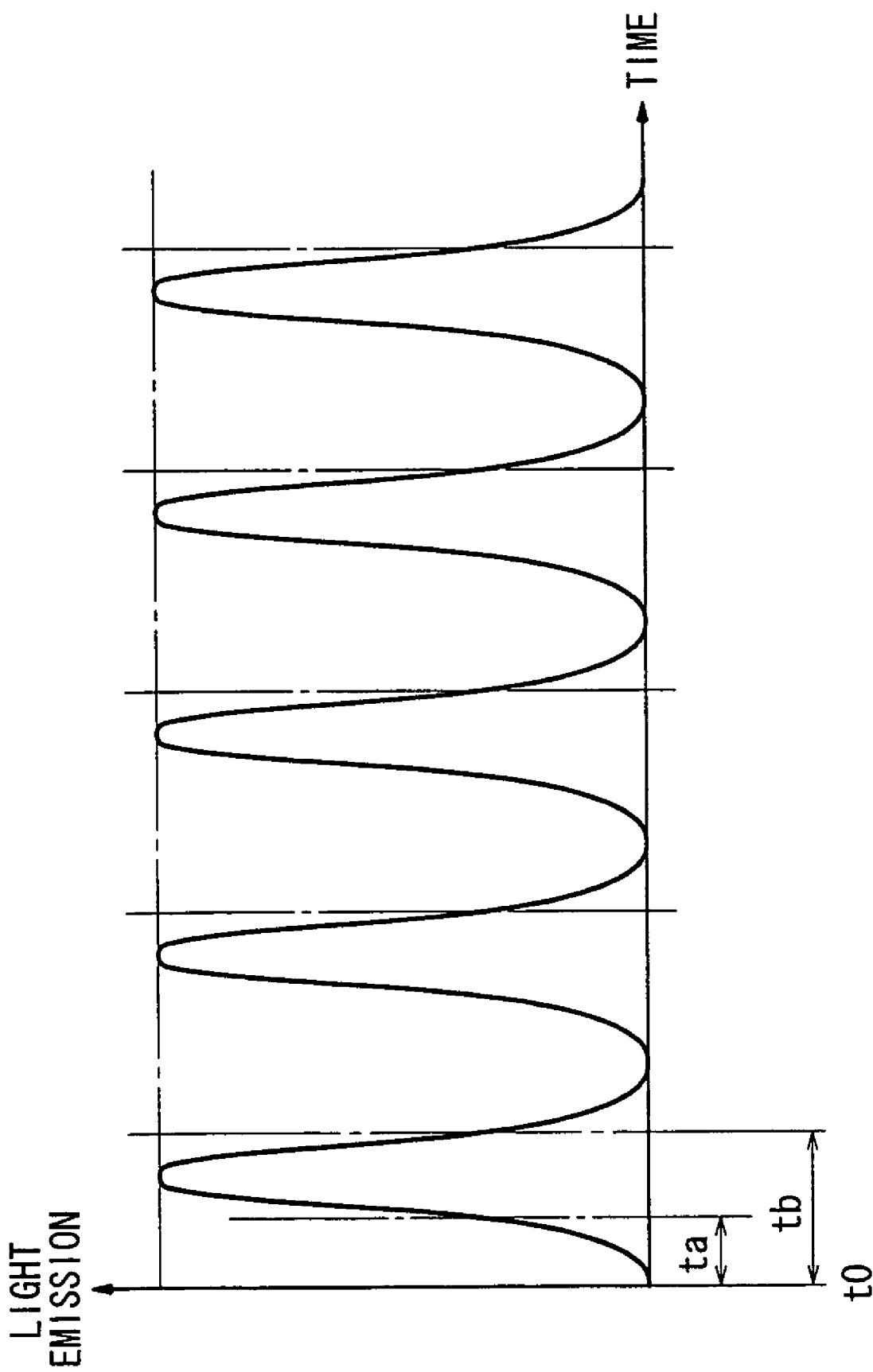
FIG. 81 is a waveform diagram showing light emission pulse widths in the light source according to the third embodiment.

As shown in FIG. 80, each of the electron emission units 204 comprises a single ferroelectric sheet 206 (emitter 22), a matrix of 16 upper electrodes 18, for example, disposed on an upper surface of the ferroelectric sheet 206, and a matrix of lower electrodes 20 (not shown) disposed on a lower surface of the ferroelectric sheet 206 at respective positions aligned with the upper electrodes 18. Specifically, each of the electron emission units 204 comprises a matrix of 16 electron emitters 12B.

In the arrangement shown in FIG. 80, in each of the electron emission units 204, the 16 upper electrodes 18 are arranged in four rows and four columns. The four upper electrodes 18 in each row are electrically connected to each other by leads 208, and the four upper electrodes 18 in the rightmost column are electrically connected to each other by leads 210. The lower electrodes 20 are similarly arranged and electrically connected.

A plurality of lower electrode interconnects 212 are disposed on the principal surface of the rear glass substrate 200. A frame 214 is mounted on the principal surface of the rear glass substrate 200 where the lower electrode interconnects 212 are disposed. The frame 214 has a plurality of squares, arranged a matrix, for example, which are defined by a plurality of walls 216 arranged in rows and columns.

The electron emission units 204 are inserted respectively in the squares. Each of the squares as viewed in plan is slightly greater than a single electron emission unit 204, allowing the electron emission units 204 to be easily inserted respectively in the squares. In FIGS. 79 and 80, some of the electron emission units 204 are omitted from illustration for making some of the lower electrode interconnects 212 visible.

As shown in FIG. 80, upper electrode interconnects 218 are disposed on the walls 216 of the frame 214. The lower electrode interconnects 212 have a common lead 220, and the upper electrode interconnects 218 have a common lead 222, the common leads 220, 222 extending to one side edge of the rear glass substrate 200.

The upper electrode interconnects 218 and the upper electrodes 18 of the electron emission units 204 are electrically connected to each other by leads 224 extending from the upper electrodes 18 in the fourth columns and electrically connected to the upper electrode interconnects 218 disposed on the walls 216 near the upper electrodes 18 in the fourth columns, by an electrically conductive paste 226.

The lower electrode interconnects 212 and the lower electrodes 20 (not shown) are electrically connected to each other directly by an electrically conductive paste (not shown) applied to the lower electrode interconnects 212 disposed on the principal surface of the rear glass substrate 200 and the lower electrodes 20.

The light source 10C according to the third embodiment operates as follows: As shown in FIG. 78, electrons are emitted from the electron emitters 12B in each of the electron emission units 204 impinge upon the white phosphor (not shown) on the plate surface of the front glass substrate 202, exciting the white phosphor to emit fluorescent light.

If the light source 10C emits pulsed light at an emission frequency of 300 Hz, then each of the emitted light pulses has a rise time ta of 1.7 msec. from an emission start time t0 and a fall time tb of 3.3 msec. from the emission start time t0.

The light source 10C according to the third embodiment is capable of emitting fluorescent light due to electron excitation in each of the electron emission units 204 at an emission efficiency higher than the emission efficiency of LED light emission. The light source 10C is also advantageous in that it has a reduced burden on the environment because it does not employ mercury.

The principles of the present invention may be applied to light sources, set forth below, other than the light sources, described above, for emitting light directly from a phosphor by having electrons emitted from electron emitters impinge upon the phosphor.

(1) Discharge lamps for utilizing emitted electrons to ignite or assist in an electric discharge, including discharge lamps for emitting visible light from a sealed gas rather than a phosphor.

(2) Light sources for emitting light from a phosphor that is excited by an ultraviolet radiation generated from a gas sealed in a space in the light source, wherein the generation of the ultraviolet radiation is assisted by emitted electrons.

(3) Light sources for emitting light from a phosphor by having electrons and/or ions impinge upon the phosphor, the electrons and/or ions being produced when electrons impinge upon molecules of a gas sealed in a space in the light source and ionize the molecules of the gas. In this case, emitted electrons impinging upon the gas molecules promote the ionization thereof.

In any one of the applications (1), (2), and (3), the electron emitters may be arranged in a two-dimensional array for producing an electric discharge or generating an ultraviolet radiation or uniformizing the ionization of gas molecules, thereby providing a planar light source for emitting uniform light.

Figure 82:
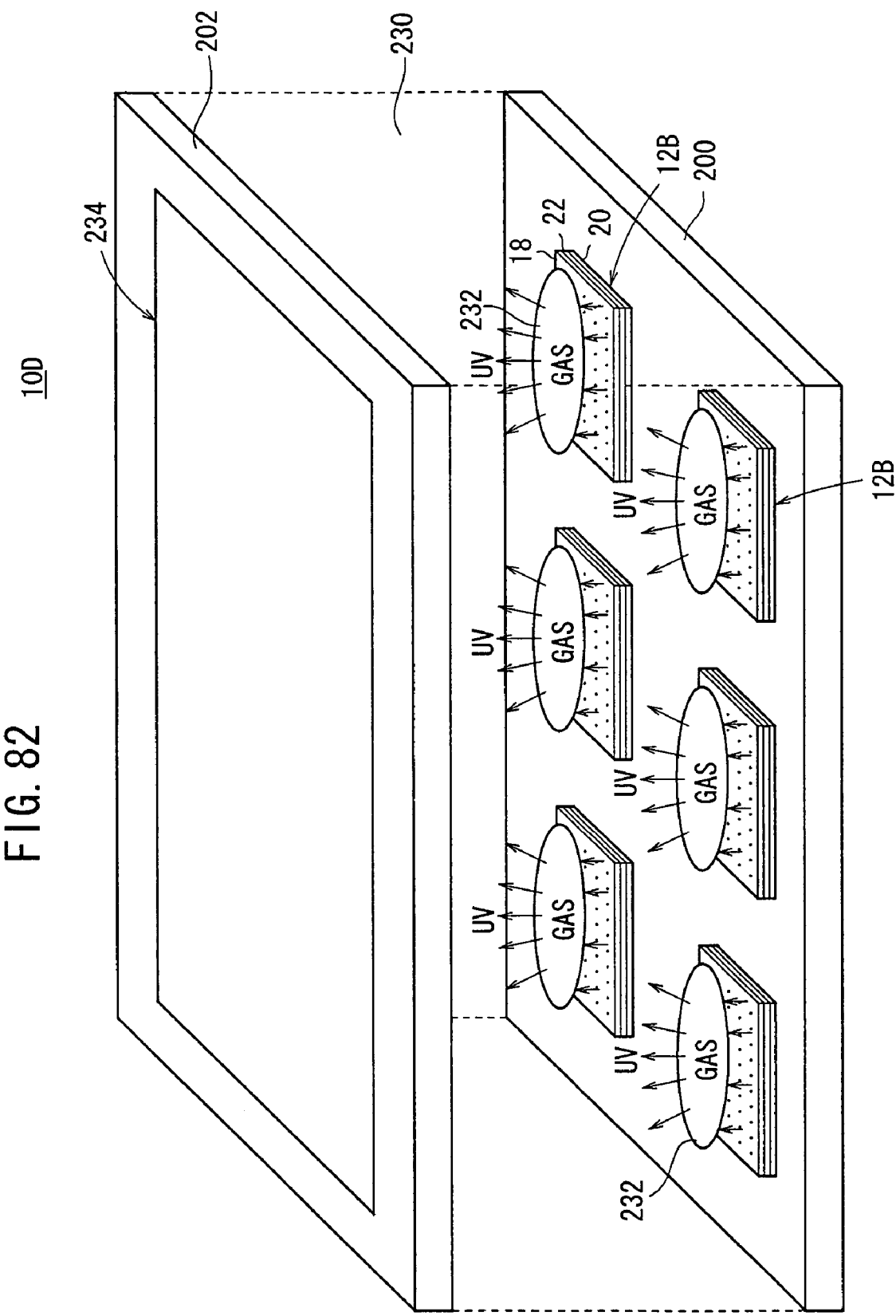
FIG. 82 is a fragmentary perspective view of a light source according to a fourth embodiment of the present invention.

FIG. 82 shows one such light source, i.e., a light source 10D according to a fourth embodiment of the present invention. The light source 10D according to the fourth embodiment has a rear glass substrate 200 and a front glass substrate 202 having a plate surface disposed in facing relation to a principal surface of the rear glass substrate 200. The plate surface of the front glass substrate 202 is coated with a phosphor (not shown). A two-dimensional array of electron emitters 12B as shown in FIG. 38, for example, is disposed on the principal surface of the rear glass substrate 200. A space 230 defined between the rear glass substrate 200 and the front glass substrate 202, i.e., a space in the light source, is filled with a gas 232. The gas 232 may be an Hg (mercury) gas or an Xe (xenon) gas.

Some of the electrons emitted from the electron emitters 12B impinge upon mercury particles in the gas 232, e.g., an Hg gas, exciting the mercury particles to generate an ultraviolet radiation UV. The ultraviolet radiation UV hits the phosphor on the front glass substrate 202, exciting the phosphor to emit fluorescent light 234.

A light source 10E according to a fifth embodiment of the present invention will be described below with reference to FIGS. 83 through 85. The principles of fluorescent light emission of the light source 10E according to the fifth embodiment are identical to the principles of fluorescent light emission of the light source 10D according to the fourth embodiment.

The light source 10E according to the fifth embodiment has a rear glass substrate 200 and a front glass substrate 202 having a plate surface disposed in facing relation to a principal surface of the rear glass substrate 200. The plate surface of the front glass substrate 202 is coated with a white phosphor (not shown). A two-dimensional array of electron emitters 12B as shown in FIG. 38, for example, is disposed on the principal surface of the rear glass substrate 200. The principal surface of the rear glass substrate 200 is also coated with a white phosphor 240. A space 230 defined between the rear glass substrate 200 and the front glass substrate 202, i.e., a space in the light source, is filled with a gas 232. The gas 232 may be an Hg (mercury) gas or an Xe (xenon) gas, as with the fourth embodiment.

The principal surface of the rear glass substrate 200 is divided into a plurality of first areas Za1 where electron emitters 12B are positioned, a plurality of second areas Za2 where the white phosphor 240 is positioned, and a plurality of third areas Za3 where anode electrodes 242, which are functionally equivalent to the collector electrode 32 shown in FIG. 1, are positioned. The first areas Za1, the second areas Za2, and the third areas Za3 are arrayed in the order of a first area Za1, a second area Za2, a third area Za3, a second area Za2, a first area Za1, . . . from the left, for example.

Figure 84:
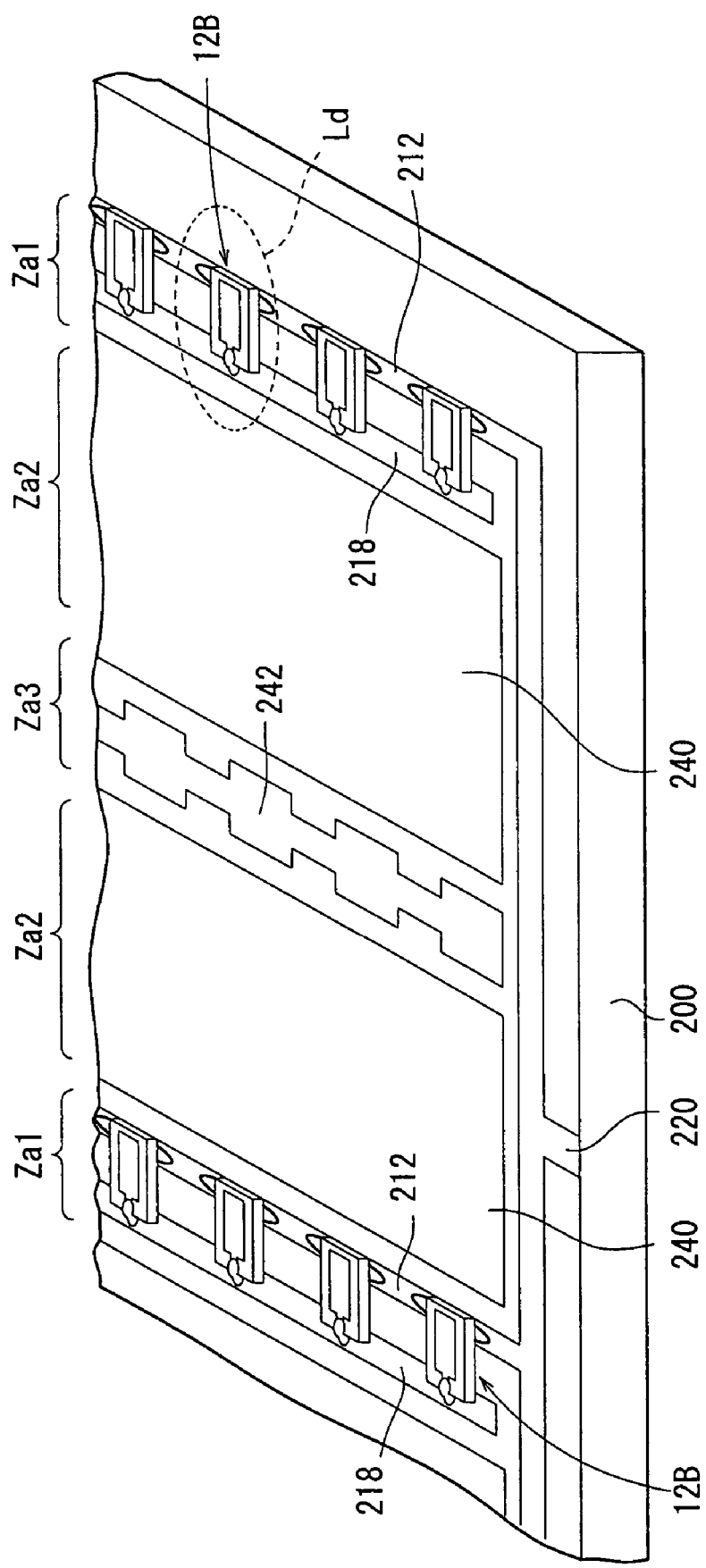
FIG. 84 is a fragmentary perspective view showing an array of electron emitters, white phosphors, and an anode electrode in the light source according to the fifth embodiment.
Figure 85:
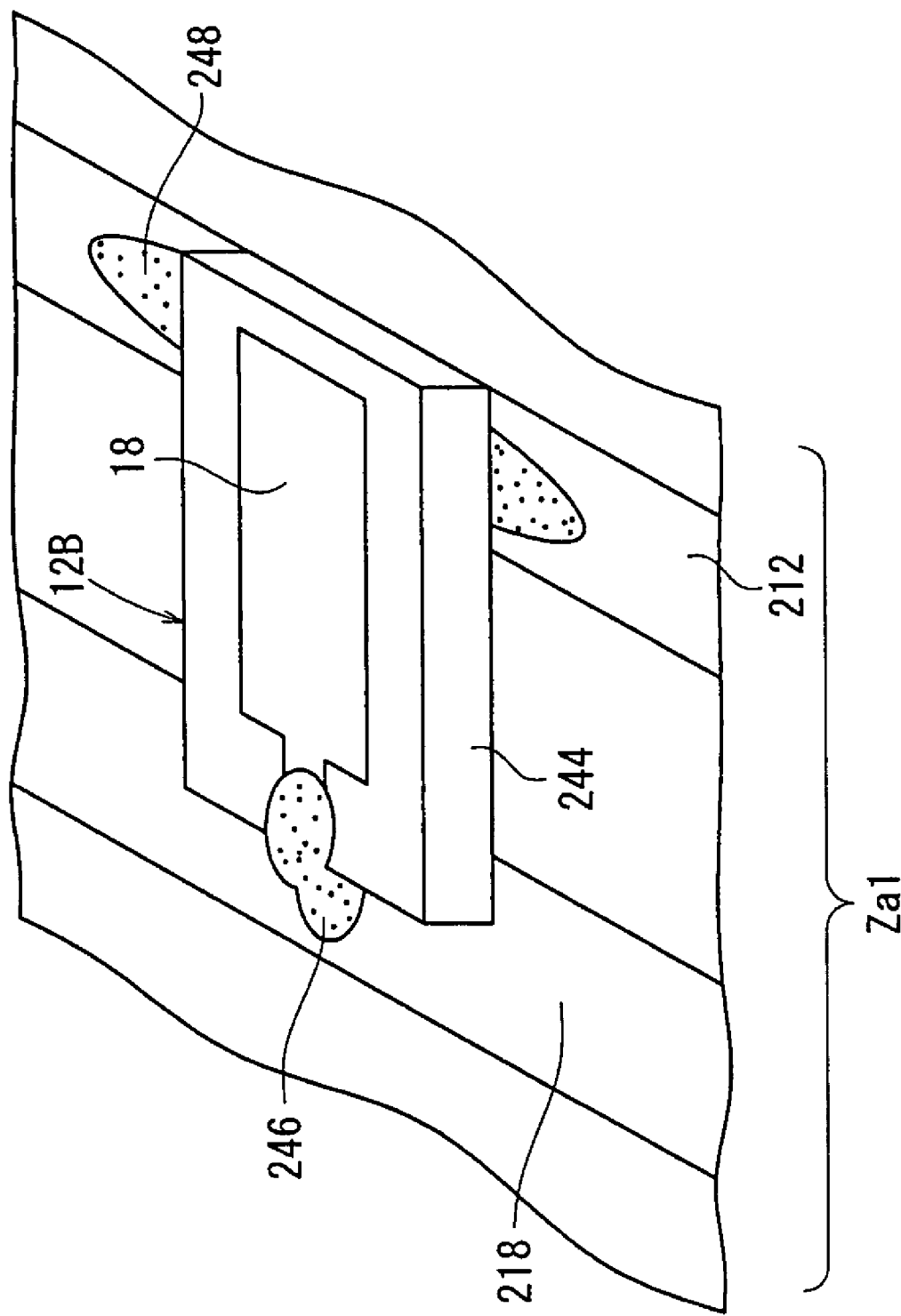
FIG. 85 is an enlarged fragmentary perspective view of an encircled portion Ld in FIG. 84.

As shown in FIG. 85, each of the first areas Za1 has a lower electrode interconnect 212 and an upper electrode interconnect 218 that are spaced from, but disposed adjacent to, each other, and a plurality of electron emitters 12B spanning between the lower electrode interconnect 212 and the upper electrode interconnect 218. Each of the electron emitters 12B comprises a ferroelectric chip 244 (emitter 22), an upper electrode 18 disposed on an upper surface of the ferroelectric chip 244, and a lower electrode 20 (not shown) disposed on a lower surface of the ferroelectric chip 244. The upper electrode 18 and the upper electrode interconnect 218 are electrically connected to each other by an electrically conductive paste 246, and the lower electrode 20 and the lower electrode interconnect 212 are electrically connected to each other by an electrically conductive paste 248. As shown in FIG. 84, the lower electrode interconnects 212 have a common lead 220 extending to one side edge of the rear glass substrate 200, and the upper electrode interconnects 218 have a common lead (not shown) extending to another side edge, e.g., a side edge opposite to the above one side edge, of the rear glass substrate 200. The anode electrode 242 disposed in each of the third areas Za3 also extends to the other side edge of the rear glass substrate 200.

Figure 83:
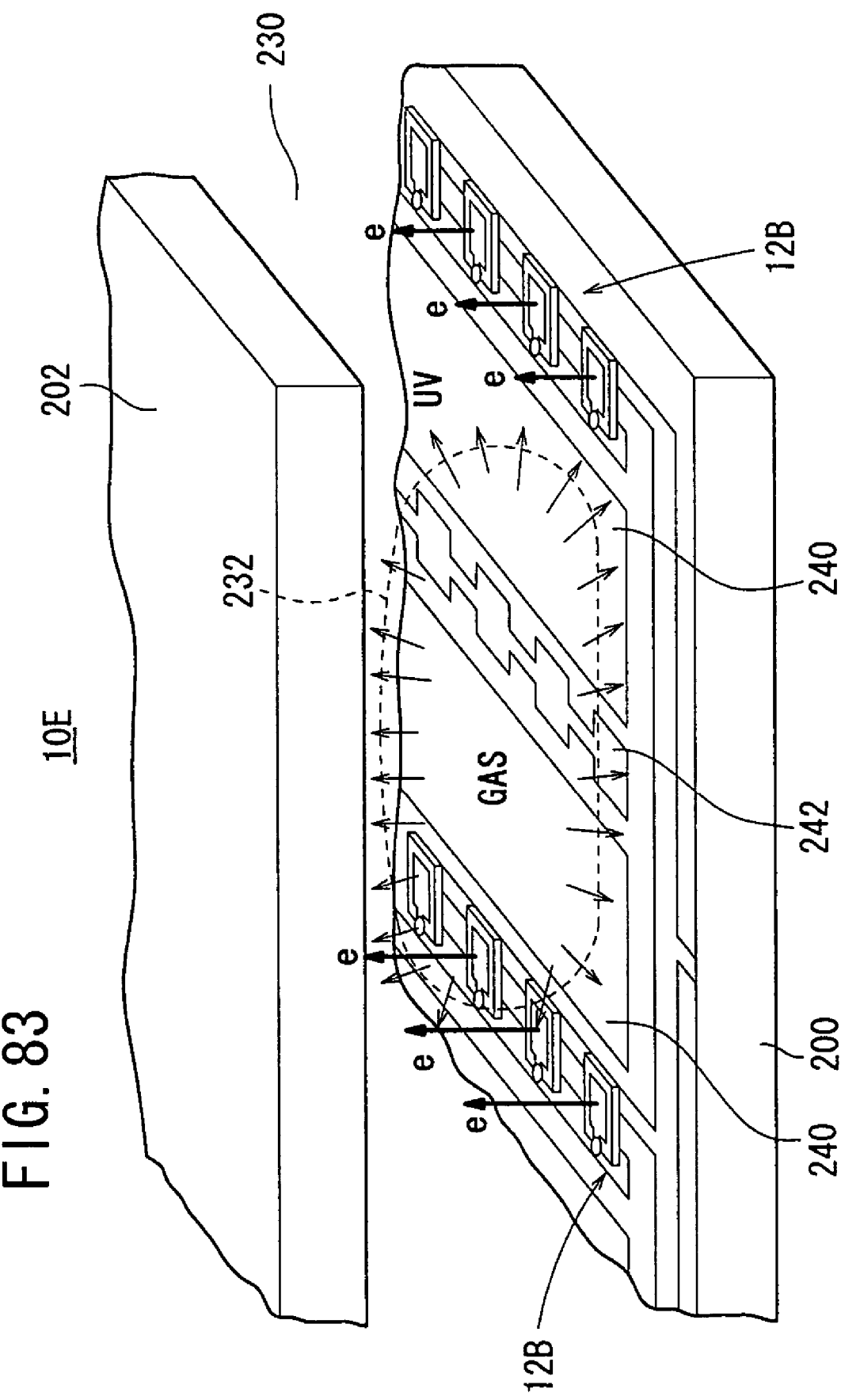
FIG. 83 is a fragmentary perspective view of a light source according to a fifth embodiment of the present invention.

As shown in FIG. 83, electrons emitted from the electron emitters 12B arrayed in the first areas Za1 travel toward the anode electrodes 242 disposed in the third areas Za3. Some of the electrons impinge upon gas particles, e.g., mercury particles, of the gas 232, e.g., an Hg gas, exciting the gas particles to generate an ultraviolet radiation UV. The ultraviolet radiation UV hits the white phosphor 240 in the second areas Za2 and the white phosphor (not shown) on the front glass substrate 202, exciting these white phosphors to emit fluorescent light.

If the light source 10E emits pulsed light at an emission frequency of 300 Hz, then each of the emitted light pulses has a rise time ta of 1.7 msec. and a fall time tb of 3.3 msec. (see FIG. 81), as with the light source 10C according to the third embodiment.

The light source 10E according to the fifth embodiment can employ a phosphor for use in fluorescent lamps, and is capable of obtaining, in principle, the same light emission efficiency as with cold-cathode tubes.

The light source 10C according to the third embodiment and the light source 10E according to the fifth embodiment can be used as an alternative to a cold-cathode tube, an LED, or a hot-cathode tube for use as a back light source in a liquid crystal display panel, for example.

Liquid crystal display panels for use on motor vehicles are required to have a back light source that should be able to withstand a temperature range from −40 to +95° C. when in storage and a temperature range from −30 to +85° C. (at the panel) when in operation. The light source 10C according to the third embodiment and the light source 10E according to the fifth embodiment (particularly if no mercury gas is employed) can be used in the above temperature ranges.

Although certain preferred embodiments of the present invention have been shown and described in detail, it should be understood that various changes and modifications may be made therein without departing from the scope of the appended claims.

What is claimed is:

1. A light source of a discharge lamp type, wherein
   electrons ignite or assist in an electric discharge;
   a source of said electrons comprises an electron emitter; and
   said electron emitter comprises an emitter of a dielectric material and a first electrode and a second electrode which a drive voltage is applicable to emit electrons from said emitter;
   said first electrode being disposed on a first surface of said emitter;
   said second electrode being disposed on a second surface of said emitter;
   at least said first electrode having a plurality of through regions through which said emitter is exposed; and
   each of said through regions has a peripheral portion having a surface facing said emitter and spaced from said emitter.

2. A light source according to claim 1, wherein said first electrode emits electrons toward said emitter to charge said emitter in a first stage; and
   said emitter emits electrons in a second stage.

3. A light source according to claim 1, wherein electrons depending on an amount of charges on said emitter in a first stage are emitted from said emitter in a second stage.

4. A light source according to claim 1, wherein an amount of charges on said emitter in a first stage is maintained until electrons are emitted from said emitter in a second stage.

5. A light source according to claim 1, wherein said emitter is made of a piezoelectric material, an anti-ferroelectric material, or an electrostrictive material.

6. A light source according to claim 1, including:
   means for applying AC pulses between said first electrode and said second electrode to cause at least said portion of said emitter to have its polarization inverted or changed;
   wherein electrons are intermittently emitted from said emitter.

7. A light source according to claim 6, wherein before light emitted by a first emission of electrons is extinguished, next electrons are emitted to emit light continuously.

8. A light source according to claim 1, including:
   a plurality of said electron emitters, said electron emitters being arranged in a two-dimensional array.

9. A light source according to claim 1, including:
   means for modulating said drive voltage based on a control signal to control an amount of electrons emitted from said electron emitter for controlling emitted light.

10. A light source for emitting light by exciting a phosphor with an ultraviolet radiation generated from a gas sealed in a space in said light source, wherein
    electrons assist in generating said ultraviolet radiation from said gas;
    a source of said electrons comprises an electron emitter; and
    said electron emitter comprises an emitter of a dielectric material and a first electrode and a second electrode to which a drive voltage is applicable to emit electrons from said emitter;
    said first electrode being disposed on a first surface of said emitter;
    said second electrode being disposed on a second surface of said emitter;
    at least said first electrode having a plurality of through regions through which said emitter is exposed; and
    each of said through regions has a peripheral portion having a surface facing said emitter and spaced from said emitter.

11. A light source according to claim 10, wherein said first electrode emits electrons toward said emitter to charge said emitter in a first stage; and
    said emitter emits electrons in a second stage.

12. A light source according to claim 10, wherein electrons depending on an amount of charges on said emitter in a first stage are emitted from said emitter in a second stage.

13. A light source according to claim 10, wherein an amount of charges on said emitter in a first stage is maintained until electrons are emitted from said emitter in a second stage.

14. A light source according to claim 10, wherein said emitter is made of a piezoelectric material, an anti-ferroelectric material, or an electrostrictive material.

15. A light source according to claim 10, including:
    a plurality of said electron emitters, said electron emitters being arranged in a two-dimensional array.

16. A light source according to claim 10, including:
means for modulating said drive voltage based on a control signal to control an amount of electrons emitted from said electron emitter for controlling emitted light.

17. A light source according to claim 10, including:
means for applying AC pulses between said first electrode and said second electrode to cause at least said portion of said emitter to have its polarization inverted or changed;
wherein electrons are intermittently emitted from said emitter.

18. A light source according to claim 17, wherein before light emitted by a first emission of electrons is extinguished, next electrons are emitted to emit light continuously.

19. A light source for emitting light from a phosphor by having electrons and/or ions impinge upon the phosphor, said electrons and/or ions being produced when electrons impinge upon molecules of a gas sealed in a space in said light source and ionize said molecules of the gas, wherein
a source of said electrons comprises an electron emitter; and
said electron emitter comprises an emitter of a dielectric material and a first electrode and a second electrode to which a drive voltage is applicable to emit electrons from said emitter;
said first electrode being disposed on a first surface of said emitter;
said second electrode being disposed on a second surface of said emitter;
at least said first electrode having a plurality of through regions through which said emitter is exposed; and
each of said through regions has a peripheral portion having a surface facing said emitter and spaced from said emitter.

20. A light source according to claim 19, wherein said first electrode emits electrons toward said emitter to charge said emitter in a first stage; and
said emitter emits electrons in a second stage.

21. A light source according to claim 19, wherein electrons depending on an amount of charges on said emitter in a first stage are emitted from said emitter in a second stage.

22. A light source according to claim 19, wherein an amount of charges on said emitter in a first stage is maintained until electrons are emitted from said emitter in a second stage.

23. A light source according to claim 19, wherein said emitter is made of a piezoelectric material, an anti-ferroelectric material, or an electrostrictive material.

24. A light source according to claim 19, including:
a plurality of said electron emitters, said electron emitters being arranged in a two-dimensional array.

25. A light source according to claim 19, including:
means for modulating said drive voltage based on a control signal to control an amount of electrons emitted from said electron emitter for controlling emitted light.

26. A light source according to claim 19, including:
means for applying AC pulses between said first electrode and said second electrode to cause at least the portion of said emitter to have its polarization inverted or changed;
wherein electrons are intermittently emitted from said emitter.

27. A light source according to claim 26, wherein before light emitted by a first emission of electrons is extinguished, next electrons are emitted to emit light continuously.

* * * * *